US012632583B2

(12) United States Patent
Roper, Jr. et al.

(10) Patent No.: US 12,632,583 B2
(45) Date of Patent: *May 19, 2026

(54) SECURITY ARCHITECTURE FOR INTERCONNECTED DIGITAL ENGINEERING AND CERTIFICATION ECOSYSTEM

(71) Applicant: Istari Digital Inc., Charleston, SC (US)

(72) Inventors: William Roper, Jr., Charleston, SC (US); Christopher Benson, Arlington, VA (US); Sriram Krishnan, Cambridge, MA (US); Baha aldeen E.A. Abunojaim, Roslindale, MA (US); Ellie Daw, Kirkland, WA (US); Omar Valverde, Fairfax, VA (US); Mohammad M.Y. Zahra, Amman (JO); Peter Galvin, Watertown, MA (US); Danne Stayskal Huffaker, Charleston, SC (US)

(73) Assignee: Istari Digital, Inc., Charleston, SC (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/821,647

(22) Filed: Aug. 30, 2024

(65) Prior Publication Data

US 2024/0419833 A1 Dec. 19, 2024

Related U.S. Application Data

(63) Continuation of application No. 18/600,073, filed on Mar. 8, 2024, now Pat. No. 12,105,826.

(Continued)

(51) Int. Cl.
| | |
|---|---|
| *H04L 29/06* | (2006.01) |
| *G06F 21/62* | (2013.01) |
| *H04L 9/40* | (2022.01) |

(52) U.S. Cl.
CPC .......... *G06F 21/6218* (2013.01); *H04L 63/10* (2013.01)

(58) Field of Classification Search
CPC ..... G06F 21/6218; G06F 21/78; H04L 63/10; H04L 63/1433; H04L 63/20; H04L 63/107
See application file for complete search history.

(56) References Cited

U.S. PATENT DOCUMENTS

| | | | |
|---|---|---|---|
| 7,787,888 B2 * | 8/2010 | Haran | H04W 4/02 455/433 |
| 8,229,984 B2 | 7/2012 | Khader et al. | |

(Continued)

FOREIGN PATENT DOCUMENTS

| | | |
|---|---|---|
| EP | 3920051 A1 | 12/2021 |
| EP | 4178155 A1 | 5/2023 |

(Continued)

OTHER PUBLICATIONS

US 11,061,891 B2, 07/2021, Yan (withdrawn)

(Continued)

*Primary Examiner* — Longbit Chai
(74) *Attorney, Agent, or Firm* — Fish & Richardson P.C.

(57) ABSTRACT

Methods, systems, and apparatus, including computer programs encoded on computer storage media, for securely certifying products in an ecosystem. In some implementations, a digital platform receives a user request to access digital models. The digital platform determines whether the user is authorized to access the digital models. In response, the digital platform generates a transaction request to send to a location of the digital models, wherein the transaction request comprises data identifying operations to perform using the digital models. The digital platform transmits, to the location of the digital models, the generated transaction request that causes execution of the operations. The digital (Continued)

platform receives data representative of a result of the operations performed. The digital platform provides, to a user interface of the user device, the data representative of the result. The digital platform audits the data related to the transaction request and the data representative of the result.

20 Claims, 21 Drawing Sheets

Related U.S. Application Data

(60) Provisional application No. 63/489,401, filed on Mar. 9, 2023.

(56) References Cited

U.S. PATENT DOCUMENTS

| | | | |
|---|---|---|---|
| 8,296,563 B2 | 10/2012 | Tu et al. | |
| 8,315,794 B1 | 11/2012 | Strelow et al. | |
| 8,627,484 B2 | 1/2014 | Beckley et al. | |
| 9,524,648 B1 | 12/2016 | Gopalakrishnan et al. | |
| 9,689,686 B1 | 6/2017 | Carmack et al. | |
| 9,725,171 B1 | 8/2017 | Carmack et al. | |
| 9,764,837 B2 | 9/2017 | Phan et al. | |
| 9,847,033 B1 | 12/2017 | Carmack et al. | |
| 9,849,978 B1 | 12/2017 | Carmack et al. | |
| 10,198,011 B2 | 2/2019 | DeBitetto et al. | |
| 10,437,953 B2 | 10/2019 | Irissou et al. | |
| 10,452,802 B2 | 10/2019 | Irissou et al. | |
| 10,708,068 B2 | 7/2020 | Cheng et al. | |
| 10,747,201 B2 | 8/2020 | Biernat et al. | |
| 10,764,160 B1 | 9/2020 | Shtrauch et al. | |
| 10,796,266 B2 | 10/2020 | Lamkin et al. | |
| 10,853,536 B1 | 12/2020 | Steingrimsson et al. | |
| 10,928,803 B2 | 2/2021 | Biernat et al. | |
| 10,984,016 B2 | 4/2021 | Gunther | |
| 11,055,279 B2 | 7/2021 | Yan | |
| 11,139,980 B2 | 10/2021 | Herrin et al. | |
| 11,144,540 B2 | 10/2021 | Yan | |
| 11,250,336 B2* | 2/2022 | Guim Bernat | G06N 5/04 |
| 11,329,995 B2 | 5/2022 | Zhang | |
| 11,356,275 B2 | 6/2022 | Valdez et al. | |
| 11,429,565 B2 | 8/2022 | Kaguma et al. | |
| 11,468,048 B2 | 10/2022 | Yan | |
| 11,468,528 B2 | 10/2022 | Salvo et al. | |
| 11,475,176 B2 | 10/2022 | Glunz | |
| 11,481,651 B2 | 10/2022 | Donoho et al. | |
| 11,496,291 B2 | 11/2022 | Chakra et al. | |
| 11,544,291 B2 | 1/2023 | Iftemi | |
| 11,775,707 B1 | 10/2023 | Roper et al. | |
| 11,855,971 B2* | 12/2023 | Harris | H04W 12/67 |
| 12,105,826 B1 | 10/2024 | Roper, Jr. et al. | |
| 2003/0233418 A1 | 12/2003 | Goldman | |
| 2004/0217850 A1 | 11/2004 | Perttunen et al. | |
| 2005/0251494 A1 | 11/2005 | Maria Jansen | |
| 2010/0257581 A1 | 10/2010 | Leconte et al. | |
| 2011/0023016 A1 | 1/2011 | Khader et al. | |
| 2011/0032870 A1 | 2/2011 | Kumar | |
| 2012/0167207 A1 | 6/2012 | Beckley et al. | |
| 2013/0002477 A1 | 1/2013 | Dehnie et al. | |
| 2013/0176519 A1 | 7/2013 | Hayama et al. | |
| 2016/0091894 A1 | 3/2016 | Zhang et al. | |
| 2016/0188686 A1 | 6/2016 | Hopkins et al. | |
| 2016/0299233 A1 | 10/2016 | Levien et al. | |
| 2017/0214701 A1 | 7/2017 | Hasan | |
| 2017/0353314 A1 | 12/2017 | Steeves et al. | |
| 2018/0011948 A1 | 1/2018 | Irissou et al. | |
| 2018/0011958 A1 | 1/2018 | Irissou et al. | |
| 2018/0060573 A1 | 3/2018 | Roger et al. | |
| 2018/0373866 A1 | 12/2018 | Sweeney et al. | |
| 2019/0196737 A1 | 6/2019 | Jahn et al. | |
| 2019/0199756 A1 | 6/2019 | Correnti et al. | |
| 2019/0340269 A1 | 11/2019 | Biernat et al. | |
| 2020/0169408 A1 | 5/2020 | Herrin et al. | |
| 2020/0213110 A1 | 7/2020 | Cage et al. | |
| 2020/0286049 A1 | 9/2020 | Basu et al. | |
| 2020/0380080 A1 | 12/2020 | Glunz | |
| 2020/0382961 A1 | 12/2020 | Shattil et al. | |
| 2021/0075825 A1 | 3/2021 | Davis | |
| 2021/0103603 A1 | 4/2021 | Iftemi | |
| 2022/0038260 A1 | 2/2022 | Chakra et al. | |
| 2022/0092450 A1 | 3/2022 | Donoho et al. | |
| 2023/0008331 A1* | 1/2023 | Gupta | H04L 63/0861 |
| 2023/0017142 A1 | 1/2023 | Dunn et al. | |
| 2023/0132505 A1 | 5/2023 | Lee et al. | |
| 2024/0076056 A1 | 3/2024 | Roper, Jr. et al. | |
| 2024/0303361 A1 | 9/2024 | Roper, Jr. et al. | |

FOREIGN PATENT DOCUMENTS

| | | |
|---|---|---|
| GB | 2595984 A | 12/2021 |
| JP | 2022-531919 A | 7/2022 |
| WO | WO 2018163044 A1 | 9/2018 |
| WO | WO 2019217323 A1 | 11/2019 |

OTHER PUBLICATIONS

[No Author Listed], "Department of Defense Handbook, Airworthiness Certification Criteria," MIL-HDBK-516C 4.1.4 & 5.2 failure conditions, Dec. 12, 2014, 527 pages.

[No Author Listed], "Department of Defense Joint Service Specification Guide, Aircraft Structures," JSSG-2006, Oct. 30, 1998, 497 pages.

[No Author Listed], "EN 1090-part 1-5, Execution of steel structures and aluminum structures," European Standards, 2012, 7 pages (abstract only).

[No Author Listed], "IEC 60601-1-11:2015, Medical electrical equipment," International Organization for Standardization, Jan. 2015, 109 pages (abstract only).

[No Author Listed], "IEC 62304:2006, Medical device software, Software life cycle processes," International Organization for Standardization, May 2006, 151 pages (abstract only).

[No Author Listed], "ISO 10204:2017, Iron ores, Determination of magnesium, Flame atomic absorption spectrometric method," International Organization for Standardization, Jul. 2017, 14 pages (abstract only).

[No Author Listed], "ISO 10993-1:2018, Biological evaluation of medical devices, Part 1: Evaluation and testing within a risk management process," International Organization for Standardization, Oct. 2018, 41 pages (abstract only).

[No Author Listed], "ISO 11135:2014, Sterilization of health-care products, Ethylene oxide, Requirements for the development, validation and routine control of a sterilization process for medical devices," International Organization for Standardization, Jul. 2014, 78 pages (abstract only).

[No Author Listed], "ISO 11137-1:2006, Sterilization of health care products, Radiation," International Organization for Standardization, Apr. 2006, 37 pages (abstract only).

[No Author Listed], "ISO 11607-1:2019, Packaging for terminally sterilized medical devices," International Organization for Standardization, Feb. 2019, 44 pages (abstract only).

[No Author Listed], "ISO 13485:2016, Medical devices, Quality management systems, Requirements for regulatory purposes," International Organization for Standardization, Mar. 2016, 36 pages (abstract only).

[No Author Listed], "ISO 14004:2016 Environmental management systems, General guidelines on implementation," International Organization for Standardization, Mar. 2016, 59 pages (abstract only).

[No Author Listed], "ISO 14971:2019, Medical devices, Application of risk management to medical devices," International Organization for Standardization, Dec. 2019, 36 pages (abstract only).

[No Author Listed], "ISO 15223-1:2021, Medical devices, Symbols to be used with information to be supplied by the, manufacturer, Part 1: General requirements," International Organization for Standardization, Feb. 2022, 36 pages (abstract only).

(56) References Cited

OTHER PUBLICATIONS

[No Author Listed], "ISO 9001:2015, Quality management systems, Requirements," International Organization for Standardization, Sep. 2015, 29 pages (abstract only).

[No Author Listed], "ISO 9013:2017, Thermal cutting, Classification of thermal cuts, Geometrical product specification and quality tolerances," International Organization for Standardization, Feb. 2017, 28 pages (abstract only).

Cdsco.gov.in [online], "Central Drugs Standard Control Organization," available on or before Aug. 1, 2018, retrieved on Apr. 4, 2024, retrieved from URL<https://cdsco.gov.in/opencms/opencms/en/Home>, 1 page.

Cpsc.gov [online], "General Certificate of Conformity," available on or before Jan. 20, 2014, retrieved on Apr. 4, 2024, retrieved from URL<https://www.cpsc.gov/Business--Manufacturing/Testing-Certification/General-Certificate-of-Conformity>, 4 pages.

Daubert et al., "HoneyDrone: A Medium Interaction Unmanned Aerial Vehicle Honeypot," NOMS 2018—2018 IEEE/IFIP Network Operations and Management Symposium, Apr. 2018, 6 pages.

Iecee.org [online], "CB scheme," available on or before Feb. 21, 2023, retrieved on Apr. 4, 2024, retrieved from URL<https://www.iecee.org/who-we-are/cb-scheme>, 3 pages.

International Search Report and Written Opinion in International Appln. No. PCT/US2023/73513, mailed on Nov. 20, 2023, 16 pages.

International Search Report and Written Opinion in International Appln. No. PCT/US2024/019234, mailed on Jun. 21, 2024, 16 pages.

Medium.datadriveninvestor.com [online], "GPT Zero Is Designed To Recognize Texts Written By AI," Jan. 12, 2023, retrieved on Mar. 15, 2024, retrieved from URL<https://medium.datadriveninvestor.com/gpt-zero-is-designed-to-recognize-texts-written-by-ai-ab7ff4d11fd6>, 7 pages (preview only).

International Preliminary Report on Patentability in International Appln. No. PCT/US2024/019234, mailed on Sep. 18, 2025, 6 pages.

* cited by examiner

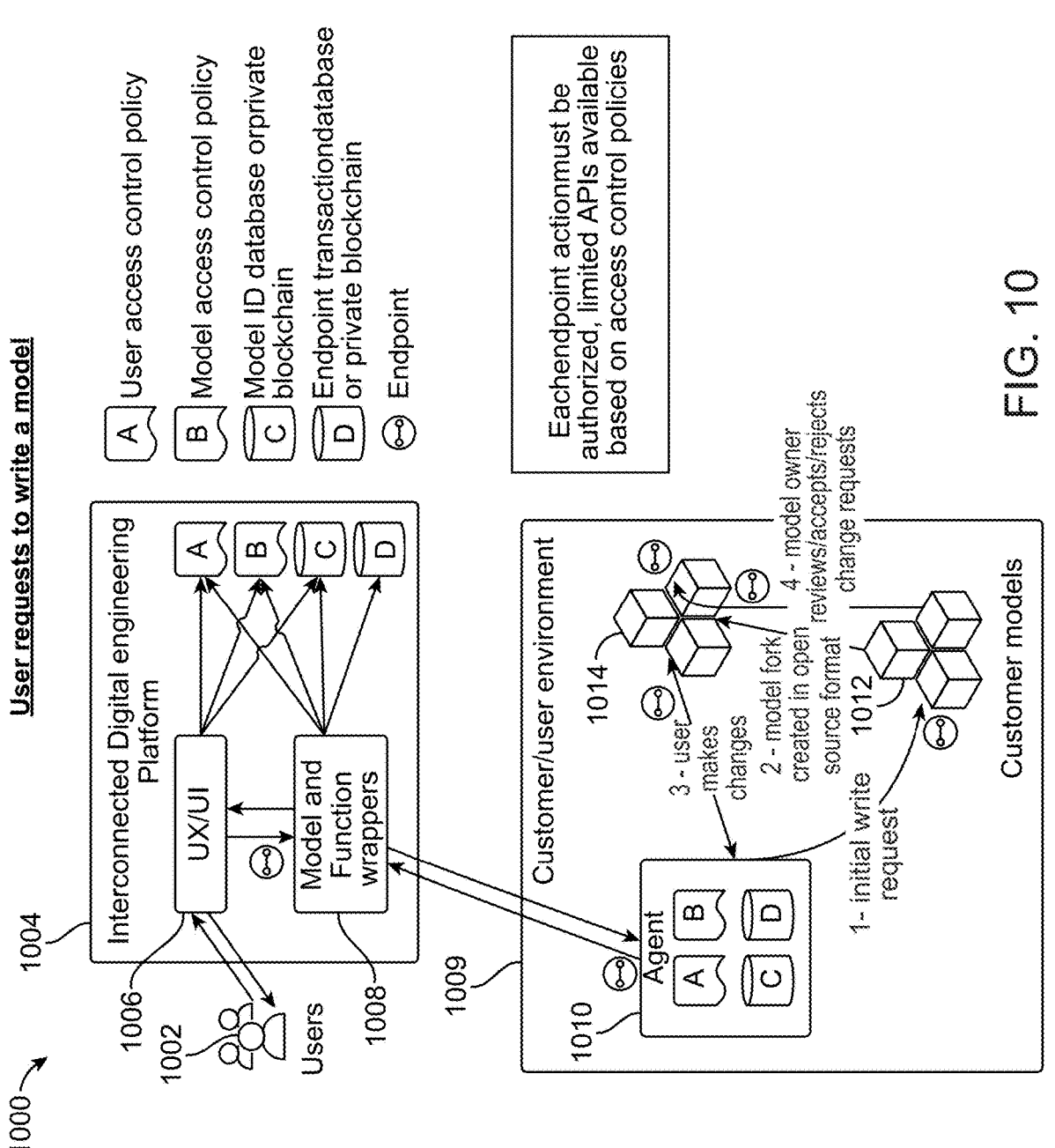

User requests to write a model

A — User access control policy

B — Model access control policy

C — Model ID database or private blockchain

D — Endpoint transaction database or private blockchain

⊙ — Endpoint

Each endpoint action must be authorized, limited APIs available based on access control policies Interconnected Digital engineering Platform

UX/UI

Model and Function wrappers

Users

1004

1006

1002

1008

1009

Customer/user environment

Agent

1010

1 - initial write request

2 - model fork/ created in open source format

3 - user makes changes

4 - model owner reviews/accepts/rejects change requests

1014

1012

Customer models

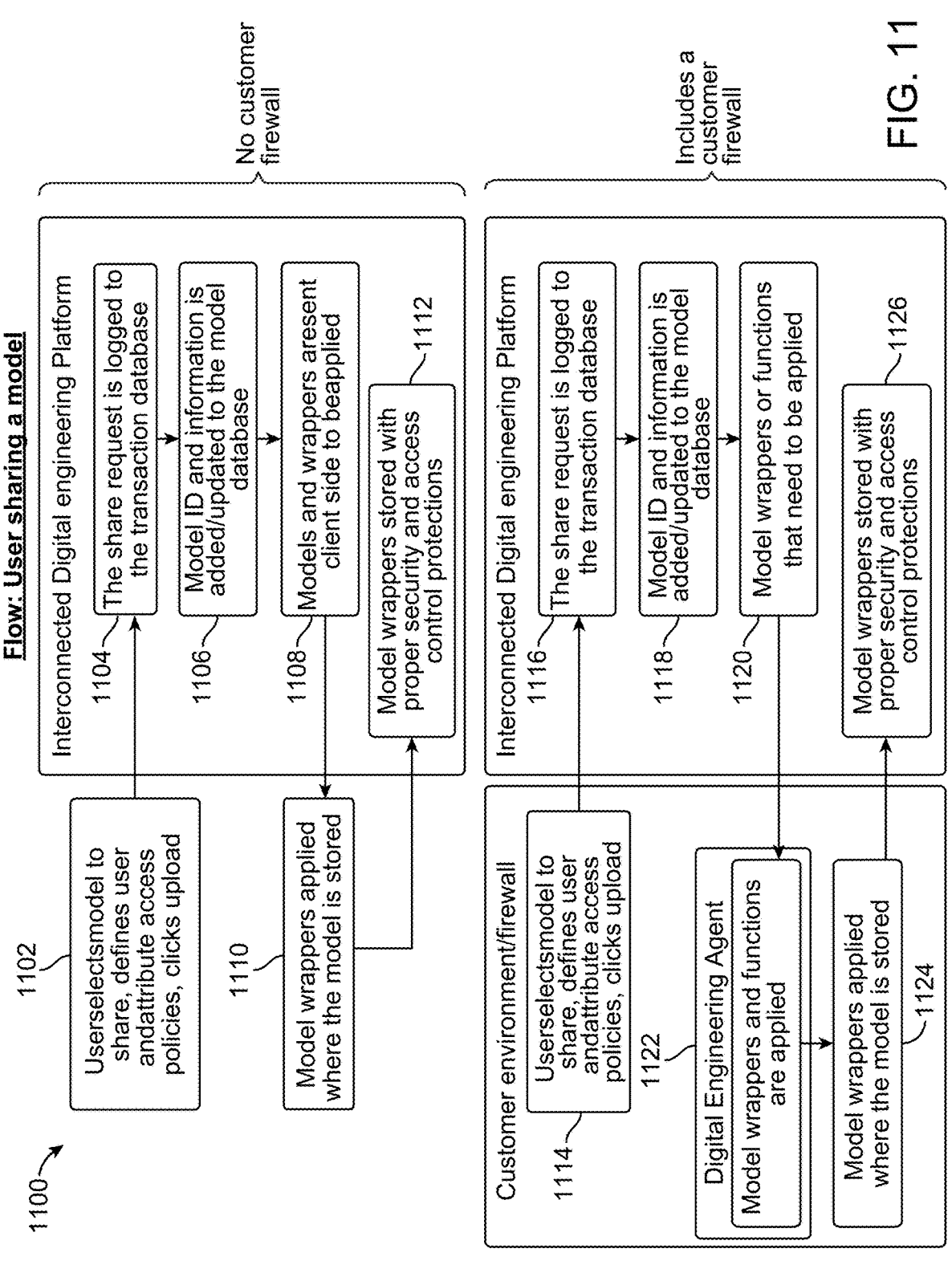

Flow: User sharing a model

1100

1102 — User selects model to share, defines user and attribute access policies, clicks upload

Interconnected Digital engineering Platform

1104 — The share request is logged to the transaction database

1106 — Model ID and information is added/updated to the model database

1108 — Models and wrappers are sent client side to be applied

1110 — Model wrappers applied where the model is stored

1112 — Model wrappers stored with proper security and access control protections No customer firewall

Customer environment/firewall

1114 — User selects model to share, defines user and attribute access policies, clicks upload

Interconnected Digital engineering Platform

1116 — The share request is logged to the transaction database

1118 — Model ID and information is added/updated to the model database

1120 — Model wrappers or functions that need to be applied

Digital Engineering Agent

1122 — Model wrappers and functions are applied

1124 — Model wrappers applied where the model is stored

1126 — Model wrappers stored with proper security and access control protections Includes a customer firewall

FIG. 11

Flow: User reading or writing to a model

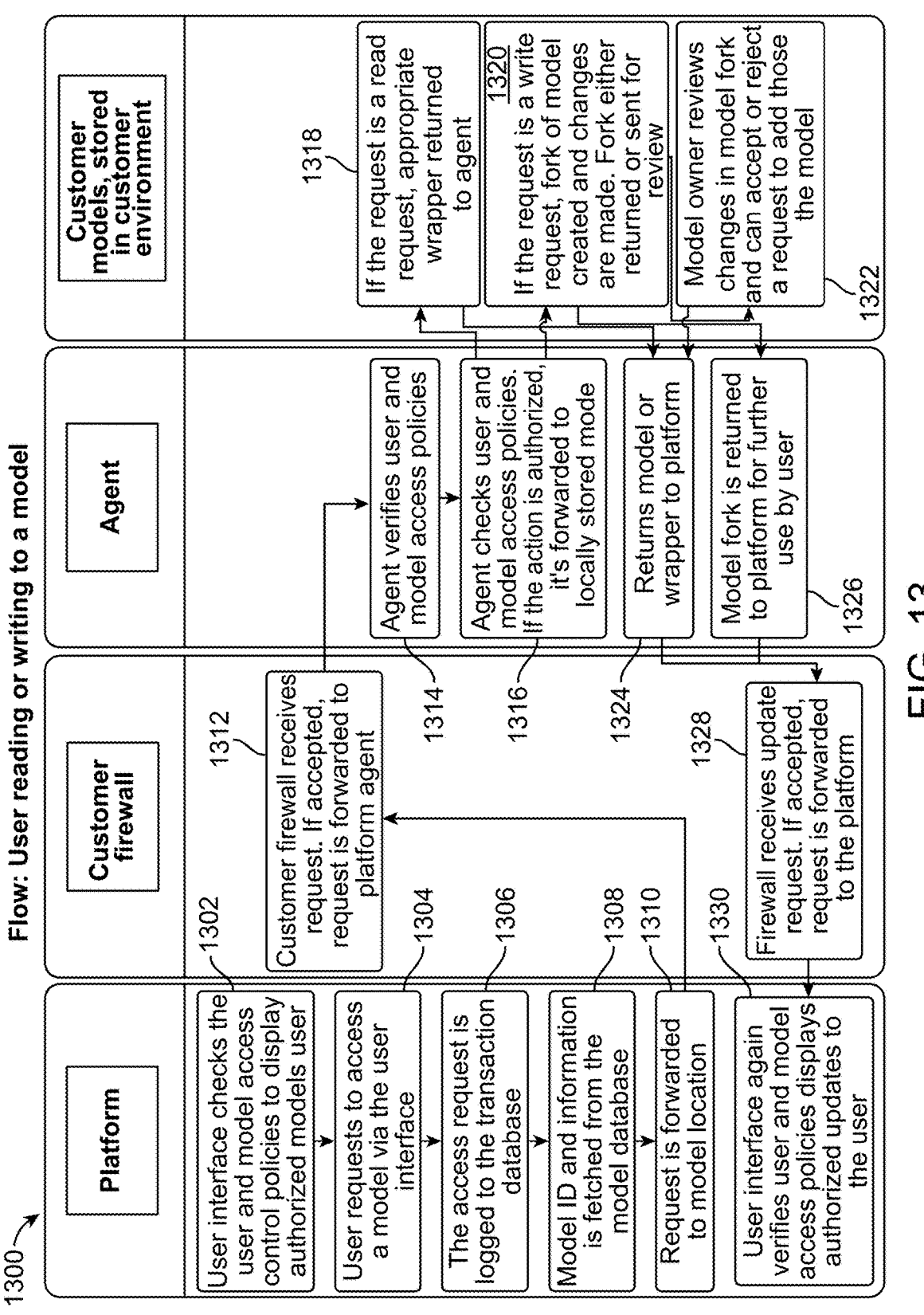

Platform

1302 User interface checks the user and model access control policies to display authorized models user 1304 User requests to access a model via the user interface 1306 The access request is logged to the transaction database 1308 Model ID and information is fetched from the model database 1310 Request is forwarded to model location 1330 User interface again verifies user and model access policies displays authorized updates to the user

Customer firewall

1312 Customer firewall receives request. If accepted, request is forwarded to platform agent 1328 Firewall receives update request. If accepted, request is forwarded to the platform

Agent

1314 Agent verifies user and model access policies

1316 Agent checks user and model access policies. If the action is authorized, it's forwarded to locally stored mode 1324 Returns model or wrapper to platform 1326 Model fork is returned to platform for further use by user

Customer models, stored in customer environment

1318 If the request is a read request, appropriate wrapper returned to agent

1320 If the request is a write request, fork of model created and changes are made. Fork either returned or sent for review 1322 Model owner reviews changes in model fork and can accept or reject a request to add those the model

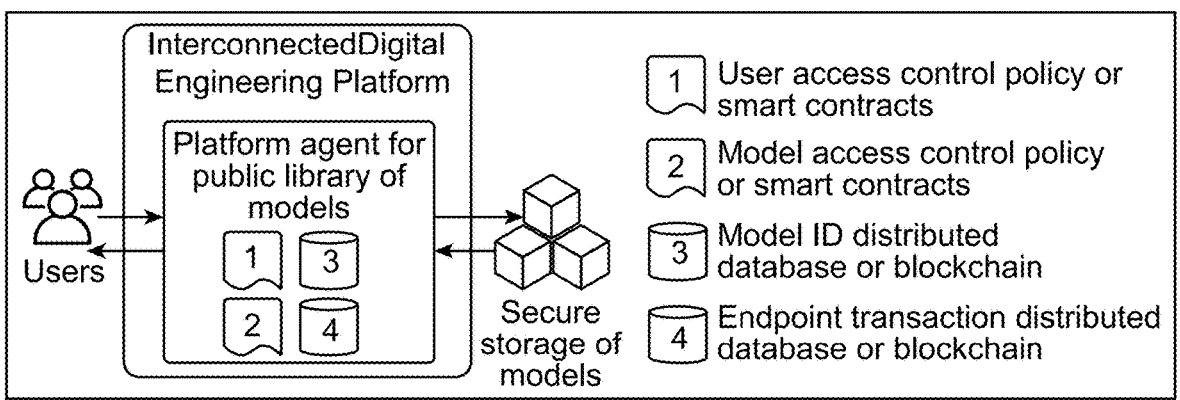
1501
**Embodiment with SECURE DISTRIBUTED DATABASE FOR IDENTITY/
TRANSACTIONS**
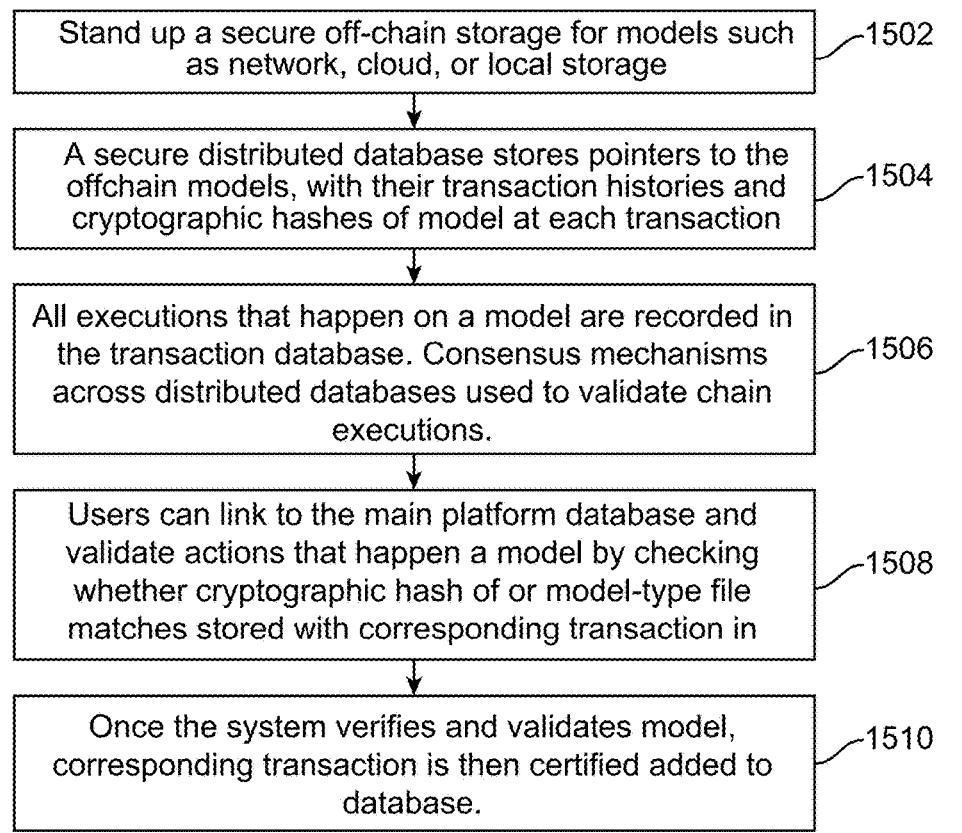
FIG. 15

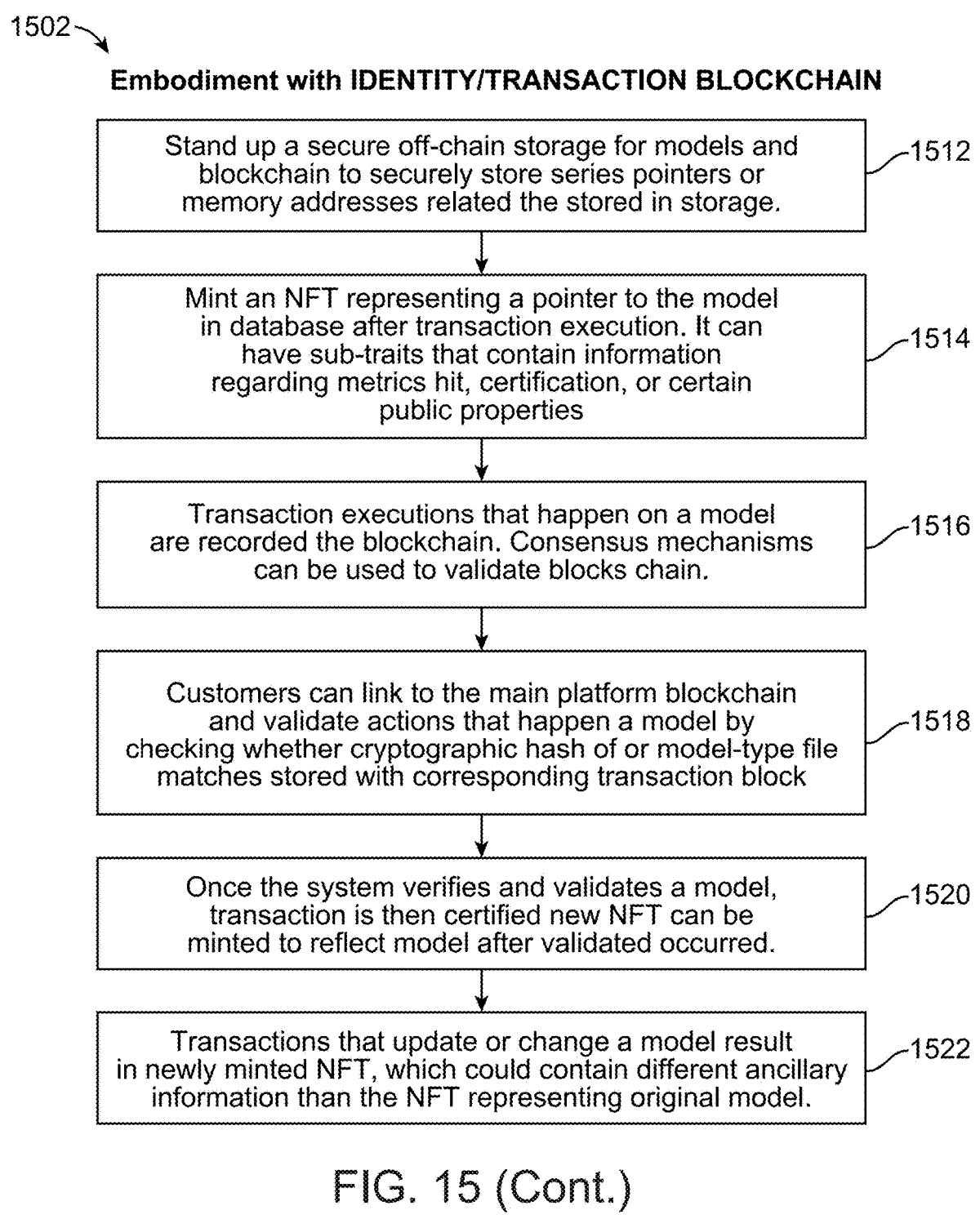

1502

Embodiment with IDENTITY/TRANSACTION BLOCKCHAIN

Stand up a secure off-chain storage for models and
blockchain to securely store series pointers or
memory addresses related the stored in storage.
— 1512

Mint an NFT representing a pointer to the model
in database after transaction execution. It can
have sub-traits that contain information
regarding metrics hit, certification, or certain
public properties
— 1514

Transaction executions that happen on a model
are recorded the blockchain. Consensus mechanisms
can be used to validate blocks chain.
— 1516

Customers can link to the main platform blockchain
and validate actions that happen a model by
checking whether cryptographic hash of or model-type file
matches stored with corresponding transaction block
— 1518

Once the system verifies and validates a model,
transaction is then certified new NFT can be
minted to reflect model after validated occurred.
— 1520

Transactions that update or change a model result
in newly minted NFT, which could contain different ancillary
information than the NFT representing original model.
— 1522

FIG. 15 (Cont.)

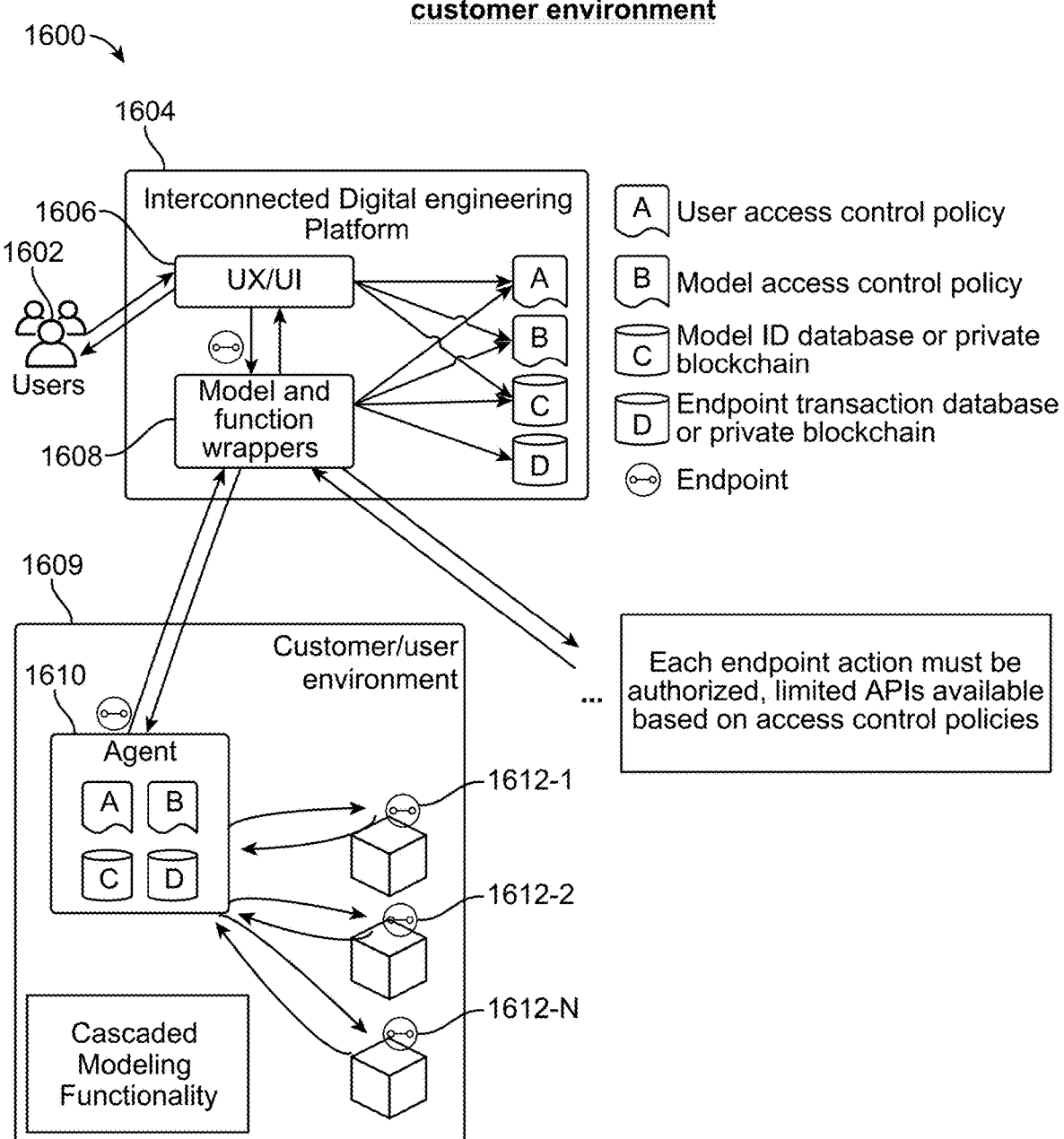

Secure sharing and collaboration ofmultiple modelsin a single customer environment

1600

1604

1606

1602

Interconnected Digital engineering Platform

UX/UI

Users

1608

Model and function wrappers

A — User access control policy

B — Model access control policy

C — Model ID database or private blockchain

D — Endpoint transaction database or private blockchain

⊶ Endpoint

1609

1610

Customer/user environment

Agent

A B
C D

Cascaded Modeling Functionality

...

Each endpoint action must be authorized, limited APIs available based on access control policies 1612-1

SECURITY ARCHITECTURE FOR INTERCONNECTED DIGITAL ENGINEERING AND CERTIFICATION ECOSYSTEM

CROSS-REFERENCE TO RELATED APPLICATION

This application claims the benefit of U.S. application Ser. No. 18/600,073, filed on Mar. 8, 2024, which claims the benefit of U.S. Provisional Application No. 63/489,401, filed on Mar. 9, 2023, entitled "SECURITY ARCHITECTURE FOR INTERCONNECTED DIGITAL ENGINEERING AND CERTIFICATION ECOSYSTEM", the contents of which are incorporated by reference herein.

TECHNICAL FIELD

This disclosure relates to the secure provision and usage of tools for digital engineering (including modeling and simulation applications) and certification of digitally engineered products.

BACKGROUND

Digital engineering tools, including modeling and simulation tools that accurately virtualize physical systems or processes for real-world decisions, enable agile development of components and/or systems. Certification of these components and/or systems still largely occurs in the physical world using physical manifestations of digitally engineered components and/or systems (sometimes referred to generally herein as "products").

SUMMARY

This document describes an interconnected digital engineering and certification ecosystem having several advantages over existing techniques for designing, engineering, testing, and certifying products.

In recent years, digital engineering tools such as modeling and simulation (M&S) tools, computer-aided design (CAD) tools, model-based systems engineering (MBSE) tools, augmented reality (AR) tools, product lifecycle management (PLM) tools, and simulation engines can be utilized to access corresponding digital engineering models. The digital engineering models can include, for example, requirements models, electronics models, test-plan models, cost-models, schedule models, software modeling, supply-chain models, manufacturing models, cyber security models, multi-attribute trade-space tools, mission effects models, etc., The proliferation of the digital engineering tools and the digital engineering models have increased the agility of hardware development and manufacturing by virtualizing physical systems and/or processes for real-world decisions. However, a number of challenges remain given the current state of these digital engineering tools and digital engineering models.

First, a large number and variety of digital engineering tools and models exist (often designed by different parties), which presents challenges for interoperability and can result in vendor lock-in issues. In particular, direct integration of individual digital engineering tools with one another is costly in terms of both time and money, with the number of interfaces between digital engineering tools scaling with the square of the number of distinct digital engineering tools (i.e., $N^2$ complexity). The large number and variety of digital engineering tools that exist can also present challenges for implementing scalable applications, automations, machine learning, and/or artificial intelligence across digital engineering tools. Better interoperability between digital engineering tools can play an important role for developing, testing, and certifying products via processes that may involve a number of distinct digital engineering tools used in parallel or in sequence. Seamless interoperability between digital engineering tools are therefore desirable for implementing such processes by enabling the development of "digital threads" or pipelines that string together the inputs and outputs of multiple digital engineering tools for particular tasks.

Second, because of the highly technical nature of many digital engineering tools and models, operating such tools effectively often requires a highly specialized skillset, which limits the number of individuals qualified to make use of these digital engineering tools. Moreover, individuals skilled at utilizing one digital engineering tool (e.g., a CAD tool produced by a first software company) may not be qualified to use a different kind of digital engineering tool (e.g., a MBSE tool) or even a similar digital engineering tool produced by a different company (e.g., a CAD tool produced by a second software company). This applies not only to using the tools via their custom graphical user interfaces, but also via their tool-specific or vendor-specific APIs, which can also require a highly specialized skillset.

Third, products and solutions designed using one digital engineering tool may not only be non-shareable between digital engineering tools (e.g., due to lack of interoperability), but in some cases, previously designed products and solutions may not be shareable with or searchable by others using the same digital engineering tool to solve a similar problem. For example, no repository of previously designed products, solutions, etc. may exist to share information about said products, solutions, etc. between individuals within the same team, company, technical field, etc. Moreover, even if such a repository of previously designed products and solutions do exist, it is unlikely to include information about how and why the previously designed products and solutions were arrived at, or to include simple ways to reuse the prior engineering work from the models which can potentially limit duplicative efforts and/or provide useful suggestions to an individual working on a similar, but slightly different product or problem. This can result in many engineering problems needing to be redeveloped from scratch, rather than building upon the work of past efforts.

Fourth, products and solutions designed using digital engineering often require the use of many different tools that not all people will know how to use. For example, a digital engineering model may be built using a particular MBSE tool, i.e., digital engineering tool, and someone who needs to access the model (or data generated from the model) may not know how to use this tool. This problem compounds with the fact that many complex systems use many different kinds of tools, meaning that in order to understand such systems, an individual may have to know how to use many different tools, which can be quite rare. This problem is compounded even further by the fact that the people who review information for certification of a product may not be familiar with some or all of the digital engineering tools, and may seek to review all of the data in a legacy format (e.g. PDF report). This poor case-of-use between different modeling tools can cause significant delays and cost increases when developing new products, as models cannot be easily shared between different people or organizations, especially if those people or organizations have different technical skill sets.

For the reasons provided above, most digital engineering tools today are still built by people, for people in a world that increasingly operates with machine-to-machine autonomy. For example, in designing a complex system such as an aircraft, various regulatory standards may need to be adhered to, which may require a host of distinct models and simulations to assess (and consequently, the use of a host of distinct digital engineering tools). Today, such efforts require collaboration between a large number of highly specialized subject matter experts consulting a host of regulatory standard documents, necessarily involving many slow and expensive human steps in the design and engineering process. Moreover, current certification processes typically require producing physical manifestations of digitally engineered components and/or systems for evaluation in the physical world (e.g., for physical testing), which can slow down the iterative design and engineering process.

The interconnected digital engineering and certification ecosystem described herein (sometimes referred to as a "digital engineering metaverse") addresses each of these issues, and more. Among other things, the interconnected digital engineering and certification ecosystem can include a computing system (e.g., including network-connected centralized or distributed computing subsystems or components) that interfaces with various centralized or distributed digital engineering tools (e.g., via an application programming interface (API) and/or software development kit (SDK)), which can be separate from the computing system or can themselves be considered part of the computing system. The digital engineering tools can be interfaced with by an API, and/or an SDK can allow for users of the ecosystem (including digital engineering tool providers) to develop their own APIs for their tools or models to enable them to interact with the system. For example, a new company can create a new MBSE tool, then use the SDK to add their tool to the ecosystem, thus allowing it to be automatically interoperable with the rest of the tools within the ecosystem via an API. The new company can then maintain that API over time such that the manager of the overall ecosystem does not have to maintain all of the different APIs for all of the different tools. This architecture can have the advantage of increasing the case of interoperability between digital engineering tools. For example, rather than requiring each individual digital engineering tool to be integrated with every other individual digital engineering tool in the ecosystem, the computing system can enable the interoperable use of multiple digital engineering tools implemented in multiple other computing systems (or, in some cases, within the same computing system) as long as each of the tools is integrated with the computing system. Furthermore, rather than requiring a user of the digital engineering tools to interact separately with the various digital engineering tools to perform modeling and simulations, the computing system can enable the user to interface with and utilize a single user interface of the ecosystem's computing system which, in turn, interfaces with a host of digital engineering tools. This can result in a more gradual learning curve for the user, who only has to become familiar with a single user interface (e.g., a user interface associated with the computing system) rather than several distinct user interfaces (e.g., associated with the various digital engineering tools). It can also simplify the number of interfaces between digital engineering tools from $N^2$ to N complexity, where N represents the number of digital engineering tools included in the ecosystem. This, in turn, can simply create scalable applications, automations, and/or machine learning and artificial intelligence across a variety of digital engineering tools.

The interconnected digital engineering and certification ecosystem also has the advantage of including digitized regulatory and certification standards, compliances, calculations, and tests (e.g., for the development, testing, and certification of products and/or solutions), which can enable users to incorporate relevant regulatory and certification standards, compliances, calculations, and test data directly into their digital engineering workflow. Regulatory and certification standards, compliances, calculations, and tests are sometimes referred to herein as "common validation and verification (V&V) products." In some implementations, the computing system of the ecosystem can interface with regulatory and/or certification authorities (e.g., via websites operated by the authorities) to retrieve digitized common V&V products published by the regulatory authorities that may be relevant for a product that a user is designing. In some implementations, the user can upload digitized common V&V products to the ecosystem themselves. The inclusion of digitized common V&V products in the ecosystem can be particularly beneficial for the completion of complex systems engineering projects, where many regulatory requirements may need to be satisfied using a number of different digital engineering tools. By connecting both digital engineering tools and digitized common V&V products, the entire product design and engineering process (or part of it) can be digitized, removing or reducing time-intensive and costly steps (e.g., human review of regulatory standards to identify regulatory requirements, human determination of what digital engineering tools are needed, human evaluation of whether the regulatory requirements are satisfied, etc.). For example, the computing system of the digital engineering and certification ecosystem can be configured to process regulatory and/or certification data corresponding to the digitized common V&V products, and engineering-related data outputs received from one or more digital engineering tools to automatically evaluate whether one or more regulatory and/or certification requirements specified in a common V&V product are satisfied. The computing system can generate a report, which can be presented to the user in an easily readable format, and can even include recommendations for improvements to a user's digital prototype of a product (e.g., to satisfy a failed regulatory and/or certification requirement). Importantly, all of this can be done without the need for any physical manifestation of the product to be manufactured, and without physical testing. As digital models and simulations continue to become more and more high fidelity, certification of products such as unmanned aerial vehicles or other aircraft can also be performed digitally, saving time, cost, and materials associated with the physical evaluation and certification of products. Although unmanned aerial vehicles and other aircraft are mentioned as example products throughout this description, the ecosystem can be readily used for the design, engineering, testing and/or certification of any product or solution (e.g., automobiles, drugs, medical devices, processes, etc.) that can be developed using digital engineering tools and/or that is subject to regulatory and/or certification requirements.

The interconnected digital engineering and certification ecosystem also has the advantage of providing a single computing system (which may be a centralized or distributed computing system) through which various kinds of data flow throughout the design, engineering, testing, and/or certification process. Further, this unlocks collaborative computing techniques even when models or model-like files are maintained at the edge, such as a client device. The security architecture provides zero trust access to digital models on a one-off basis for individual models, and also provides greater security through machine learning and data analytics on security related implementations of other models and model transactions in the digital engineering ecosystem. For example, data related to prototypes, common V&V products, the use of digital engineering tools to satisfy particular common V&V products, the successes or failures of particular digital engineering models and simulations, and various design iterations of a product can all be configured to securely flow through, and be corroborated by, the computing system of the ecosystem (e.g., using zero trust security). In some implementations, these data can be tracked and stored. This stored data can be audited for various purposes (e.g., to prevent a security breach or to perform data quality control). The stored data can also be explored to identify patterns in the data (e.g., using a machine-learning engine). For example, after many uses of the digital engineering and certification ecosystem by subject matter experts, patterns in the stored data can be used to determine what digital engineering tools will be most useful for satisfying certain regulatory requirements, to suggest adjustments to inputs or parameters for effectively running models and simulations, to perform sensitivity analyses on a particular design, to design or partially design systems using machine learning and artificial intelligence, etc. This can have the advantage of making the digital engineering and certification ecosystem increasingly user-friendly for non-subject matter experts, who can be assisted by the computing system throughout the design and engineering process based on data collected from more specialized and/or experienced users, as well as accelerating the entire engineering and certification process.

The interconnected digital engineering and certification ecosystem can further have the advantage of enabling the development of a repository of previous designs and/or solutions that have already been evaluated in relation to one or more common V&V products that can be easily re-used with minimal additional engineering effort. Such designs and/or solutions can be suggested to users (e.g., both human and artificial intelligence users) for use as is, or as a starting point for modifications, thereby reducing duplicative work and streamlining the design, engineering, testing, and certification process. In some implementations, the repository can be searchable by the user to identify previous designs and/or solutions generated by others. In some implementations, the repository (or certain elements within the repository) can also be specific to users with particular credentials (e.g., users associated with a particular company, team, technical field, etc.) to avoid the disclosure of confidential materials while still promoting effective collaboration. In some cases, user credentials can additionally or alternatively be used in the interconnected digital engineering and certification ecosystem for other purposes such as moderating the kinds of digital engineering tools (or functionalities within the digital engineering tools) that a user may access. For example, the user credentials may correspond to a skill level of a user, and can be checked to ensure that a user is not overwhelmed with the functionalities of a digital engineering tool beyond their skillset.

The interconnected digital engineering and certification ecosystem can further have the advantage of allowing highly valuable digital models, such as digital engineering models, to be shared while still protecting the intellectual property contained within the models. Many modern technology development projects include multiple entities working together (e.g., a customer, a prime integrator, a supplier, etc.), requiring access to one another's models, but with different access permissions to the data. This system allows for the detailed specification of exactly which data within a model is to be shared with each individual entity, without exposing all of the data to all of the entities. This selective sharing of information allows for the measurement and tracking of which data is consumed by each entity (e.g., only sharing the inputs and outputs of a hydrodynamic pressure model) and how much data is consumed (e.g., how many runs of the hydrodynamics model are performed). This measuring and tracking allows for new business models based upon the creation of models and data that can be monitored and monetized. In some implementations, this measurement and tracking go beyond the first sharing of the data, but can also be applied to measuring and/or tracking subsequent or derivative uses of the data by third parties not engaged in the initial sharing agreement. For example, a prime contractor can share data with a first government organization, who is then free to share the data with a second government organization, and the prime contractor can have the ability to allow/disallow, track, and potentially monetize this further sharing. Such implementations have the advantage of enabling extremely close capturing and traceability of model data.

Maintaining the security of assets within the interconnected digital engineering ecosystem (e.g. models, model inputs, model outputs, user information, data flows throughout the interconnected digital engineering ecosystem, etc.) is important to avoid liability and to maintain the trust of parties (e.g., users, model providers, regulatory authorities, certification authorities, etc.) who may interact with the interconnected digital engineering ecosystem. Thus, the present document discloses various implementations of security architectures and security-related processes for the interconnected digital engineering ecosystem, which are particularly well suited for the structure and purpose of the interconnected digital engineering ecosystem, compared to existing security solutions. These security architectures and security-related processes aim to protect digital models and their data in addition to traditional zero trust security measures for users and computer networks. The zero trust security architecture includes policy, embodiments, and example implementations of a secure storage environment, restricted access to models, attribute-based access control, handling of read vs. write queries, traceability and auditability, and model trust policy.

In some implementations, the security architectures and security-related processes described herein can have the advantage of implementing zero trust not only for users and networks within the interconnected digital engineering ecosystem, but also for the models themselves. In other words, the security architecture and security-related processes are able to ensure (i) the right authenticated users are able to access the right authenticated models (and only the right authenticated parts of models) for specific types of data, (ii) models are credibly authentic because access to read and write must be explicitly granted, and (iii) complex computations involving multiple models can be executed securely because access must be explicitly granted for each step at the user, network, model, and model splice levels.

The security architecture and security-related processes described herein can also have the advantage of least privilege. In some implementations, the security architecture and secure-related processes can extend the traditional implementation of least privilege where the smallest amount of access is granted to include an extension where the smallest amount of data exists within the digital engineering platform itself because models remain in the customer's (e.g., a model owner's or a model developer's) own storage. This decreases potential compromise of intellectual property, decreases the amount of legal process required to share models (e.g., sharing parties signing NDAs), and, when used in the security architecture described throughout this specification, it allows for models to assess integrations without leaving each customer's environment.

The security architecture and security-related processes described herein can additionally have the advantages of traceability, auditability, and model integrity. In some examples, the endpoint transactions can be logged so there is comprehensive traceability of all actions on models connected via the digital engineering ecosystem. Further, outputs from approved actions may produce updated models, hashes of which are stored in the endpoint transaction database, which can be implemented in various embodiments including a secure database, a distributed database, or a ledger, to name a few examples. This ensures the integrity of the models being used in further actions without requiring customers (e.g., model owners or model developers) to entrust their full model to the digital engineering platform.

In one general aspect, a method is performed by a server. The method includes: receiving, from a user device and by a digital platform, a request to access a stored digital engineering model; extracting, from the received request and by the digital platform, data that identifies the stored digital engineering model a user seeks to access; retrieving, by the digital platform, a location of the stored digital engineering model based on the extracted data from the request; providing, by the digital platform, the request to the location of the stored digital engineering model; receiving, by a digital agent at the location of the stored digital engineering model, the request to access the stored digital engineering model; determining, by the digital agent, the request is authenticated to access the stored digital engineering model; in response to determining the request is authenticated to access the stored digital engineering model, determining, by the digital agent, a type of the request to access the stored digital engineering model; in response to determining the type of the request to access the stored digital engineering model is to update the stored digital engineering model, generating, by the digital agent, a copy of the stored digital engineering model; performing, by the digital agent, an action associated with the type of the request to the copy of the digital engineering model; providing, by the digital agent, a revised copy of the digital engineering model to the digital platform; and providing, by the digital platform and to a user interface of the user device, the revised copy of the digital engineering model for user review.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: storing, by the digital agent, one or more digital engineering tools in a tools database, the one or more digital engineering tools comprise model-based systems engineering (MBSE) tools, augmented reality (AR) tools, computer aided design (CAD) tools, data analytics tools, modeling and simulation (M&S) tools, product lifecycle management (PLM) tools; and storing one or more digital engineering models, the one or more digital engineering models comprise simulation engines, requirements models, electronics models, test-plan models, cost-models, schedule models, software modeling, supply-chain models, manufacturing models, cyber security models, multi-attribute trade-space tools, and mission effects models.

In some implementations, determining the type of the request to access the stored digital engineering model includes at least one of reading data from the stored digital engineering model or writing data to the stored digital engineering model.

In some implementations, the method includes: obtaining, by the digital platform, one or more credentials of the user using the user device prior to accessing the stored digital engineering model; and determining, based on the one or more obtained credentials, that the user is qualified to access the stored digital engineering model.

In some implementations, the digital platform and the digital agent communicate in a bi-directional manner through one or more firewalls.

In some implementations, the method includes: in response to determining the type of the request to access the stored digital engineering model is to read data from the stored digital engineering model, retrieving, by the digital agent, a splicer that enables access to one or more functions of the stored digital model; providing, by the digital agent, the retrieved splicer to the digital platform; and providing, by the digital platform and to a user interface of the user device, the retrieved splicer of the stored digital model for user review.

In some implementations, the retrieved splicer is configured to restrict user access to a subset of functionalities of the stored digital engineering model.

In some implementations, the retrieved splicer is configured to redact a portion of the stored digital engineering model.

In some implementations, the retrieved splicer is configured to secure the subset of functionalities of the stored digital engineering model on the user device.

In some implementations, performing the action associated with the type of the request to the copy of the digital engineering model includes performing the action associated with the type of the request to the copy of the digital engineering model without modifying the stored digital engineering model.

In one general aspect, a method is performed by a server. The method includes: receiving, via a user device and by a digital platform, a user request to access one or more digital models; determining, by the digital platform, whether a user of the user device is authorized to access the one or more digital models; in response to determining the user is authorized to access the one or more digital models, generating, by the digital platform, a transaction request to send to a location of the one or more digital models, wherein the transaction request comprises data identifying one or more operations to perform using the one or more digital models; transmitting, by the digital platform and to the location of the one or more digital models, the generated transaction request that causes execution of the one or more operations using the one or more digital models; receiving, by the digital platform, data representative of a result of the one or more operations performed using the one or more digital models; providing, by the digital platform and to a user interface of the user device, the data representative of the result of the one or more operations performed using the one or more digital models; and auditing, by the digital platform, the data related to the transaction request and the data representative of the result of the one or more operations performed using the digital models.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: transmitting, by the digital platform and to the location of the one or more digital models, the generated transaction request includes transmitting, by the digital platform and to a cloud network, the generated transaction request that causes execution of the one or more operations using the one or more digital models.

In some implementations, the method includes: transmitting, by the digital platform and to the location of the one or more digital models, the generated transaction request includes transmitting, by the digital platform and to a digital agent, the generated transaction request that causes the digital agent to perform the one or more operations using the one or more digital models.

In some implementations, the method includes: storing, by the digital agent, one or more digital tools in a tools database, the one or more digital tools comprise model-based systems engineering (MBSE) tools, augmented reality (AR) tools, computer aided design (CAD) tools, data analytics tools, modeling and simulation (M&S) tools, product lifecycle management (PLM) tools; and storing the one or more digital models, the one or more digital models comprise simulation engines, requirements models, electronics models, test-plan models, cost-models, schedule models, software modeling, supply-chain models, manufacturing models, cyber security models, multi-attribute trade-space tools, and mission effects models.

In some implementations, the digital platform and the digital agent communicate in a bi-directional manner through one or more firewalls.

In some implementations, the method includes transmitting the generated transaction request that causes the digital agent to perform the one or more operations against the one or more digital models includes transmitting the generated transaction request that causes the digital agent to copy the one or more digital models and subsequently perform a write action against the copied version of the one or more digital models without modifying an original version of the one or more digital models.

In some implementations, the one or more operations to perform using the one or more digital models includes at least one of reading data from the one or more digital models, writing data to the one or more digital models, accessing one or more digital artifacts out of the one or more digital models, or accessing the one or more digital models.

In some implementations, determining whether the user is authorized to access the one or more digital models includes: obtaining, by the digital platform, one or more credentials of the user using the user device prior to receiving the user request to access the one or more digital models; and determining, based on the one or more obtained credentials and a permissions model, that the user is authenticated to access the digital platform.

In some implementations, the method includes: determining, by the digital platform, a type of the one or more operations to perform against the one or more digital models; in response to determining the type of the one or more operations to perform against the one or more digital models, transmitting, by the digital platform and to the location of the one or more digital models, the generated transaction request; receiving, by the digital platform, a splicer that enables access to one or more functions of the one or more digital models; and providing, by the digital platform and to the user interface of the user device, the received splicer for user interaction to the one or more functions of the one or more digital models.

In some implementations, the received splicer is configured to restrict user access to a subset of functionalities of the one or more digital models.

In some implementations, the received splicer is configured to redact a portion of the one or more digital models.

In some implementations, the received splicer is configured to secure a subset of functionalities of the one or more digital models on the user device.

In some implementations, the method includes: extracting, from the received user request and by the digital platform, data that identifies the one or more digital models the user seeks to access; and retrieving, by the digital platform, the location of the one or more digital models based on the extracted data from the received user request.

In some implementations, the method includes determining, by the digital platform, the user is authorized to access the digital platform prior to receiving the user request to access the one or more digital models.

In some implementations, the method includes providing the data representative of the result of the one or more operations performed against the one or more digital models includes providing, to the user interface of the user device and by the digital platform, at least one of the one or more digital models, a copy of the one or more digital models, or a wrapper to the one or more digital models, for the user to review.

In some implementations, auditing the data further includes: storing, by the digital platform, data related to the transaction request and the data representative of the result of the one or more operations performed using the digital models; and auditing, by the digital platform, the stored data for at least one of a security breach, data quality control, or improving the one or more operations performed using the digital models.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 9 and 10 show embodiments of security implementation where the user request is either a read query or a write query.

FIG. 11 and FIG. 12 are flow charts showing the security implementation steps for sharing a digital model, or to share a redacted part of a digital model.

FIG. 13 and FIG. 14 are flow charts showing a sequence of steps that occur when a user interacts with a digital model, where specific actions happen in either the digital engineering ecosystem or the customer-computing environment, or a model storage environment.

FIG. 15 is a diagram showing a flowchart for accessing models in a zero trust manner, where models are hosted in secure storage, not linked to any specific customer or user.

FIG. 16 is a diagram showing a security implementation that extends to access and collaboration with multiple models in a computing environment.

DETAILED DESCRIPTION

This disclosure describes an interconnected digital engineering and certification ecosystem that can enable new capabilities and improve the process for digital product development, including the digital design, digital engineering, digital testing, and digital certification of products. For the purposes of this disclosure the terms "design" and "engineer" are used largely synonymously and are broadly defined to encapsulate the process of intelligently developing a product to solve a particular problem (e.g., to improve performance, increase aesthetic appeal, satisfy one or more regulatory requirements, etc.).

Figure 1:
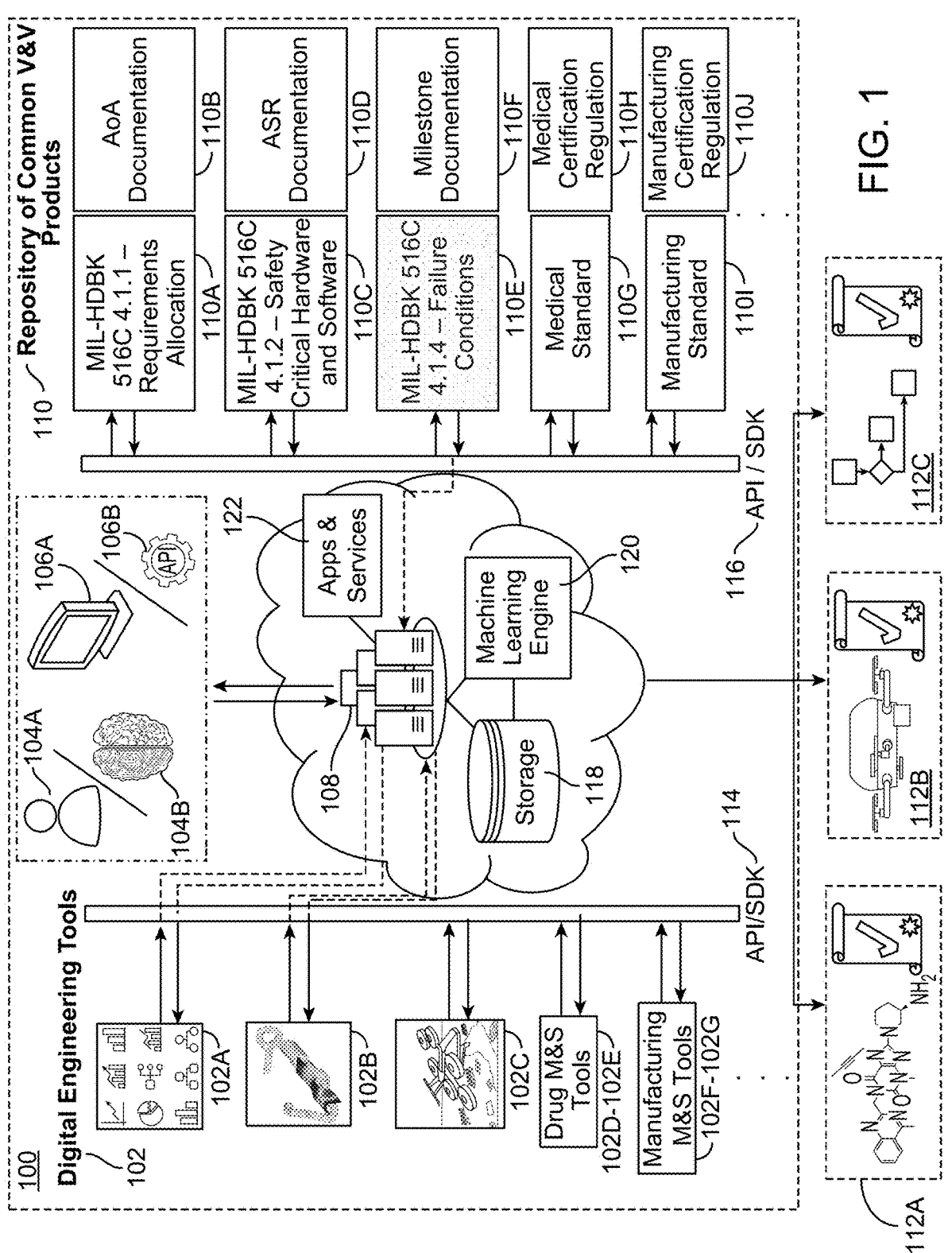
FIG. 1 is a diagram showing an example interconnected digital engineering and certification ecosystem, and digitally certified products.

FIG. 1 shows an example interconnected digital engineering and certification ecosystem 100 and examples of digitally certified products 112A-112C (collectively referred to as digitally certified products 112). For example, in some implementations, the digitally certified product 112A can be an unmanned aerial vehicle (UAV) or other aircraft, the digitally certified product 112B can be a drug or other chemical or biologic compound, and the digitally certified product 112C can be a process such as a manufacturing process. In general, the digitally certified products 112 can include any product, process, or solution that can be developed, tested, or certified (partially or entirely) using digital engineering tools (e.g., the digital engineering tools 102). In some implementations, the digitally certified products 112 may not be limited to physical products, but can include non-physical products as well (e.g., processes, software, etc.). While physical and physically-interacting systems often require multiple digital engineering tools to assess for compliance with common V&V products simply by virtue of the need for M&S, many complex non-physical systems may also require multiple digital engineering tools for product development, testing, and/or certification. With this in mind, various other possibilities for digitally certified products will be recognized by one of ordinary skill in the art.

The digitally certified products 112 can be designed and/or certified using the interconnected digital engineering and certification ecosystem 100. The interconnected digital engineering and certification ecosystem 100 can include a user device 106A or API 106B (or other similar machine-to-machine communication interface) operated by a user (e.g., human users 104A of various skill levels, or artificial users 104B such as algorithms, artificial intelligence, or other software), and a computing system 108 connected to (and/or including) a data storage unit 118, a machine learning engine 120, and an application and service layer 122. For the purposes of clarity, any user selected from the various potential human users 104A or artificial users 104B are referred to herein simply as the user 104. In some implementations, the computing system 108 can be a centralized computing system, while in other implementations, the computing system 108 can be a distributed computing system. In some cases, the user 104 can be considered part of the ecosystem 100, while in other implementations, the user 104 can be considered separate from the ecosystem 100. The ecosystem 100 also includes one or more digital engineering tools 102 (e.g., data analysis tool 102A, CAD and finite element analysis tool 102B, simulation tool 102C, drug M&S tools 102D-102E, manufacturing M&S tools 102F-102G, etc.) and a repository of common V&V products 110 (e.g., regulatory standards 110A-110F related to the development and certification of a UAV, medical standard 110G [e.g., CE marking (Europe), FCC Declaration of Conformity (USA), IECEE CB Scheme (Europe, North America, parts of Asia and Australia), CDSCO (India), FDA (USA), etc.], medical certification regulation 110H [e.g., ISO 13485, ISO 14971, ISO 9001, ISO 62304, ISO 10993, ISO 15223, ISO 11135, ISO 11137, ISO 11607, IEC 60601, etc.], manufacturing standard 110I [e.g., ISO 9001, ISO 9013, ISO 10204, EN 1090, ISO 14004, etc.], manufacturing certification regulation 110J [e.g., General Certification of Conformity (GCC), etc.], etc.).

The computing system 108 of the ecosystem 100 is centrally disposed within the architecture of the ecosystem 100 and is configured to communicate with (e.g., receive data from and transmit data to) the user device 106A or the API 106B (e.g., an API associated with an artificial user 104B), the digital engineering tools 102 (e.g., via an application programming interface [API]/software development kit [SDK] 114), and the repository of common V&V products 110 (e.g., via the API/SDK 116). For example, the computing system 108 can be configured to communicate with the user device 106A and/or the API 106B to send or receive data corresponding to a prototype of a design, information about a user (e.g., user credentials), engineering-related inputs/outputs associated with the digital engineering tools 102, digitized common V&V products, an evaluation of a product design, user instructions (e.g., search requests, data processing instructions, etc.), and more. The computing system 108 can also be configured to communicate with one or more digital engineering tools 102 to send engineering-related inputs for executing analyses, digital models, e.g., digital engineering models, simulations, tests, etc. and to receive engineering-related outputs associated with the results. The computing system 108 can also be configured to communicate with the repository of common V&V products 110 to retrieve data corresponding to one or more digitized common V&V products 110 and/or upload new common V&V products (e.g., those received from the user 104) to the repository of common V&V products 110. All communications can be transmitted and corroborated securely, for example, using methods relying on zero trust security.

In some implementations, the computing system 108 can employ zero trust security for various components within the digital engineering and certification ecosystem. Specifically, the computing system 108 can employ zero trust security under the various industries that can utilize the computing system 108. For example, these industries can include automotive industries, aerospace industries, and medical device industries. The computer system 108 can include secure storage of various models within customer environments (e.g., environments owned, accessible, or operated by customers such as model developers or owners) or in a secure storage environment from the digital engineering platform. The computer system 108 can offer restricted access to models through attribute-based access control, handling of read requests versus write requests, traceability and auditability through digitally signed endpoint transactions, and a model trust policy that assesses model truth and user credibility. The zero trust security aspect related to the computing system 108 is further described below.

In some implementations, the computing system 108 can utilize security architecture policies to employ the zero trust security feature. The security architecture policies can include, for example, a model storage policy, a model access policy, a data restrictions policy, a traceability and auditability policy, and an authenticity policy. In some cases, the computing system 108 can employ a model storage policy for the zero trust policy. The model storage policy can ensure the secure storage of models within customer environments or in a secure storage environment separate from the digital engineering platform. Moreover, the models may be linked to the platform through private model storage. By implementing the model storage policy, the computing system 108 can ensure the confidentiality and integrity of the models themselves, and the data of those models.

In some implementations, the computing system 108 can employ a model access policy for the zero-trust policy. The model access policy can restrict access to a specific subset of API functions through a model wrapper or a model splicer. For example, the model wrapper and wrapping of the models can be used interchangeably with a model splicer and splicing of the models. The restricted access can be based on an authentication level of the user, for example. Moreover, the model access policy can enable model authentication and user authentication from various endpoints. In some cases, a customer (e.g., a model owner or model developer) may provide additional access control policies that can be implemented at the various endpoints. For example, the additional access control policies can include read access from the models and write access to the models. In some examples, the authentication of models and users can be achieved through attribute-based access control. As further described below, the models may be digitally watermarked (e.g., with digitally signed endpoint transactions) to improve the overall traceability and auditability of the models.

In some implementations, the computing system 108 can employ a data restrictions policy for the zero trust policy. The data restrictions policy can enable and allow customers to set policies for the handling of the data of the respective models. In this implementation, customers can determine how to secure their digital models. For example, customers can implement policies that include data restrictions such as encryption, security controls, and zero-knowledge approaches. Moreover, customers can configure the digital engineering ecosystem to provide verification of transactions and consensus mechanisms to validate outputs from the models for open-access storage models. Consensus mechanisms can enable a group of nodes, which comprise different digital engineering tools to evaluate or verify a specific digital model or multiple digital models within open-access storage, to agree on the output from the specific model. The consensus mechanisms may include methods such as Proof of Stake (POS), or Proof of Reputation (POR) approaches. These consensus mechanisms can ensure that all nodes in a network of open-access storage digital engineering models have the same view of the specific model's data, even in the presence of faulty or malicious nodes. For example, the PoR approach can include a blockchain consensus mechanism that depends on the reputation of the participants to keep the network secure. The PoS approach can include a consensus mechanism for blockchain networks, where cryptocurrency holders can validate block transactions by staking transactions.

In some implementations, the computing system 108 can employ a traceability and auditability policy for the zero trust policy. The traceability and auditability policy can ensure the recorded transactions at endpoints are in a standard format within a secure database, on a cloud network, on a blockchain network, or some combination of the aforementioned networks. Moreover, the computing system 108 can utilize various data analytics approaches to support threat detection, alerts, threat mitigation, and threat debugging. Moreover, the traceability and auditability policy can help aid the computing system 108 in meeting specific standards, such as those established by standards organizations such as NIST, or various customer needs or criteria.

In some implementations, the computing system 108 can employ an authenticity policy for the zero trust policy. The authenticity policy ensures the right or correct authenticated user has access to the right authenticated model attributes. The right authenticated model attributes can include the models in which the users are authenticated to access and perform updates with respect to the authenticated models. The authenticity policy ensures the correct authenticated user accesses the right authenticated model attributes by addressing the issues of (i) user identity, (ii) continuity, and (iii) accord, to assess model truth and user credibility. In some examples, the computing system 108 can employ the authenticity policy to help ensure the validity and reliability of models, along with the validity and reliability of the data used by the models.

In some implementations, the authenticity policy addresses user identity by ensuring the right authenticated user can access the models and the right authenticated user can access the specific data from the right authenticated model. The authenticity policy ensures the user accessing the authenticated model is a credible user. Moreover, continuity is addressed by assessing user credibility within a digital engineering platform, such as the digital engineering platform of computing system 108. Moreover, the authenticity policy addresses accord by determining how to assess model truth. Specifically, model truth can be addressed when the model owner owns ground truth or when the model owner does not own ground truth of the model data.

The computing system 108 can process and/or store the data that it receives, and in some implementations (e.g., using the storage 118), can access a machine learning engine 120 and/or an application and service layer 122 (either included as part of the computing system 108 or external to it) to identify useful insights based on the data, as further described herein. The central disposition of the computing system 108 within the architecture of the ecosystem 100 has many advantages including reducing the technical complexity of integrating the various digital engineering tools 102; improving the product development experience of the user 104; intelligently connecting common V&V products (e.g., standards 110A-110F) to the digital engineering tools 102 most useful for satisfying requirements associated with the common V&V products; and enabling the monitoring, storing, and analysis of the various data that flows between the elements of the ecosystem 100 throughout the product development process. In some implementations, the data flowing through (and potentially stored by) the computing system 108 can also be auditable to prevent a security breach, to perform data quality control, etc.

Referring to one particular example shown in FIG. 1, the user 104 can use the digital engineering and certification ecosystem 100 to produce a digitally certified UAV 112B. For example, the user 104 may be primarily concerned with certifying the UAV as satisfying the requirements of a particular regulatory standard 110E relating to failure conditions of the UAV (e.g., "MIL-HDBK 516C 4.1.4—Failure Conditions"). In this usage scenario, the user 104 can develop a digital prototype of the UAV on the user device 106A or using the API 106B and can transmit the prototype data (e.g., as at least one of a CAD file, a MBSE file, etc.) to the computing system 108. Along with the prototype data, the user 104 can transmit, via the user device 106A, additional data including an indication of the common V&V product for which the user 104 is interested in certifying the product (e.g., regulatory standard 110E), user credential information for accessing one or more capabilities of the computing system 108, and/or instructions for running one or more digital models, tests, and/or simulations using a subset of the digital engineering tools 102.

Referring to another example shown in FIG. 1, the user 104 can use the digital engineering and certification ecosystem 100 to produce a digitally certified drug, chemical compound, or biologic 112A. For example, the user 104 may be primarily concerned with certifying the drug, chemical compound, or biologic 112A as satisfying the requirements of a particular medical standard 110G and medical certification regulation 110H. In this usage scenario, the user 104 can develop a digital prototype of the drug, chemical compound, or biologic on the user device 106A or using the API 106B and can transmit the prototype data (e.g., as a molecular modeling file) to the computing system 108. Along with the prototype data, the user 104 can transmit, via the user device 106A, additional data including an indication of the common V&V products for which the user 104 is interested in certifying the product (e.g., medical standard 110G and medical certification regulation 110H), user credential information for accessing one or more capabilities of the computing system 108, and/or instructions for running one or more digital models, tests, and/or simulations using a subset of the digital engineering tools 102 (e.g., drug M&S tools 102D-102E).

Referring to yet another example shown in FIG. 1, the user 104 can use the digital engineering and certification ecosystem 100 to produce a digitally certified manufacturing process 112C. For example, the user 104 may be primarily concerned with certifying the manufacturing process 112C as satisfying the requirements of a particular manufacturing standard 110I and manufacturing certification regulation 110J. In this usage scenario, the user 104 can develop a digital prototype of the manufacturing process on the user device 106A or using the API 106B and can transmit the prototype data to the computing system 108. Along with the prototype data, the user 104 can transmit, via the user device 106A, additional data including an indication of the common V&V products for which the user 104 is interested in certifying the process (e.g., manufacturing standard 110I and manufacturing certification regulation 110J), user credential information for accessing one or more capabilities of the computing system 108, and/or instructions for running one or more digital engineering models, tests, and/or simulations using a subset of the digital engineering tools 102 (e.g., manufacturing M&S tools 102F-102G).

In any of the above examples, the computing system 108 can receive the data transmitted from the user device 106A and/or the API 106B and can process the data to evaluate whether the common V&V product of interest (e.g., regulatory standard 110E, medical standard 110G, medical certification regulation 110H, manufacturing standard 110I, manufacturing certification regulation 110J, etc.) is satisfied by the user's digital prototype. For example, this can involve communicating with the repository of common V&V products 110 (via the API/SDK 116) to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, the repository of common V&V products 110 can be hosted by a regulatory and/or certification authority (or another third party), and retrieving the regulatory and/or certification data can involve using the API/SDK 116 to interface with one or more data resources maintained by the regulatory and/or certification authority (or the another third party). In some implementations, the regulatory and/or certification data can be provided directly by the user 104 via the user device 106A and/or the API 106B (e.g., along with the prototype data).

Evaluating whether the common V&V product of interest (e.g., regulatory standard 110E, medical standard 110G, medical certification regulation 110H, manufacturing standard 110I, manufacturing certification regulation 110J, etc.) is satisfied by the user's digital prototype can also involve processing the prototype data received from the user device 106A or the API 106B to determine if the one or more identified requirements are actually satisfied. In some implementations, the computing system 108 can include one or more plugins, local applications, etc. to process the proto-
type data directly at the computing system 108. In some
implementations, the computing system can simply pre-
process the received prototype data (e.g., to derive inputs for
the digital engineering tools 102) and can then transmit
instructions and/or input data to a subset of the digital
engineering tools 102 via the API/SDK 114 for further
processing.

Not all digital engineering tools 102 are necessarily
required for the satisfaction of particular regulatory and/or
certification standards. Therefore, in the UAV example pro-
vided in FIG. 1, the computing system 108 may determine
that only a data analysis tool 102A and a finite element
analysis tool 102B are required to satisfy the regulatory
standard 110E for failure conditions. In the drug, chemical
compound, or biologic example provided in FIG. 1, the
computing system 108 may determine that only drug M&S
tools 102D-102E are required to satisfy the medical standard
110G and medical certification regulation 110H. In the
manufacturing process example provided in FIG. 1, the
computing system 108 may determine that only manufac-
turing M&S tools 102F-102G are required to satisfy the
manufacturing standard 110I and manufacturing certifica-
tion regulation 110J. In other implementations, the user 104
may themselves identify the particular subset of the digital
engineering tools 102B that should be used to satisfy the
common V&V product of interest, provided the user 104 is
a qualified subject matter expert. In other implementations,
the user 104 may input to the computing system 108 some
suggested digital engineering tools 102 to satisfy a common
V&V product of interest, and the computing system 108 can
recommend to the user 104 a modified subset of the digital
engineering tools 102 for final approval by the user 104,
provided the user 104 is a qualified subject matter expert.
After a subset of the digital engineering tools 102 has been
identified, the computing system 108 can then transmit
instructions and/or input data to the identified subset of the
digital engineering tools 102 to run one or more digital
models, tests, and/or simulations. The results (or "engineer-
ing-related data outputs") of executing these models, tests,
and/or simulations can be transmitted back and received at
the computing system 108.

In some implementations, the user 104 may input a
required digital engineering tool (e.g., digital engineering
tool 102F) for meeting a common V&V product 110I, and
the computing system 108 can determine that another digital
engineering tool (e.g., digital engineering tool 102G) is also
required to satisfy the common V&V product 110I. The
computing system can then transmit instructions and/or
input data to both digital engineering tools (e.g., digital
engineering tools 102F and 102G), and the outputs of these
digital engineering tools can be transmitted and received at
the computing system 108. In some cases, the input data
submitted to one of the digital engineering tools (e.g., digital
engineering tool 102G) can be derived (e.g., by the com-
puting system 108) from the output of another of the digital
engineering tools (e.g., digital engineering tool 102F).

After receiving engineering-related data outputs from the
digital engineering tools 102, the computing system 108 can
then process the received engineering-related data outputs to
evaluate whether the requirements identified in the common
V&V product of interest (e.g., regulatory standard 110E,
medical standard 110G, medical certification regulation
110H, manufacturing standard 110I, manufacturing certifi-
cation regulation 110J, etc.) are satisfied. In some imple-
mentations, the computing system 108 can generate a report
summarizing the results of the evaluation and can transmit the report to the user device 106A or the API 106B for
review by the user 104. If all of the requirements are
satisfied, then the prototype can be certified, resulting in the
digitally certified product 112 (e.g., the digitally certified
drug, chemical compound, or biologic 112A; the digitally
certified UAV 112B; the digitally certified manufacturing
process 112C, etc.). However, if some of the regulatory
requirements are not satisfied, additional steps may need to
be taken by the user 104 to certify the prototype of the
product. In some cases, when some of the regulatory
requirements are not satisfied, the prototype may be partially
certified. In some implementations, the report that is trans-
mitted to the user can include recommendations for these
additional steps (e.g., suggesting one or more design
changes, suggesting the replacement of one or more com-
ponents with a previously designed solution, suggesting one
or more adjustments to the inputs of the models, tests, and/or
simulations, etc.). If the requirements of a common V&V
product are partially met, or are beyond the collective
capabilities of the distributed engineering tools 102, the
computing systems 108 may provide the user 104 with a
report recommending partial certification, compliance, or
fulfillment of a subset of the common V&V products (e.g.,
digital certification of a subsystem or a sub-process of the
prototype). The process of generating recommendations for
the user 104 is described in further detail below.

In response to reviewing the report, the user 104 can make
design changes to the digital prototype locally and/or can
send one or more instructions to the computing system 108
via the user device 106A or the API 106B. These instructions
can include, for example, instructions for the computing
system 108 to re-evaluate an updated prototype design, use
one or more different digital engineering tools 102 for the
evaluation process, and/or modify the inputs to the digital
engineering tools 102. The computing system 108 can, in
turn, receive the user instructions, perform one or more
additional data manipulations in accordance with these
instructions, and provide the user 104 with an updated
report. Through this iterative process, the user 104 can
utilize the interconnected digital engineering and certifica-
tion ecosystem 100 to design and ultimately certify (e.g., by
providing certification compliance information) the proto-
type (e.g., the UAV prototype, drug prototype, manufactur-
ing process prototype, etc.) with respect to the common
V&V product of interest. Importantly, since all of these steps
occur in the digital world (e.g., with digital prototypes,
digital models/tests/simulations, and digital certification),
significant time, cost, and materials can be saved in com-
parison to a process that involves the physical prototyping,
evaluation, and/or certification of a similar UAV, drug,
manufacturing process, etc. If the requirements associated
with a common V&V product are partially met, or are
beyond the collective capabilities of the digital engineering
tools 102, the computing system 108 may provide the user
104 with a report recommending partial certification, com-
pliance, or fulfillment of a subset of the common V&V
products (e.g., digital certification of a subsystem or a
sub-process of the prototype).

While the examples described above focus on the use of
the interconnected digital engineering and certification eco-
system 100 by a single user, additional advantages of the
ecosystem 100 can be realized through the repeated use of
the ecosystem 100 by multiple users. As mentioned above,
the central positioning of the computing system 108 within
the architecture of the ecosystem 100 enables the computing
system 108 to monitor and store the various data flows
through the ecosystem 100. Thus, as an increasing number of users utilize the ecosystem 100 for digital product development, data associated with each use of the ecosystem 100 can be stored (e.g., in the storage 118) and analyzed to yield various insights, which can be used to further automate the digital product development process and to make the digital product development process easier to navigate for non-subject matter experts.

In some implementations, user credentials for the user 104 can be indicative of the skill level of the user 104, and can control the amount of automated assistance the user is provided. For example, non-subject matter experts may only be allowed to utilize the ecosystem 100 to browse pre-made designs and/or solutions, to use the digital engineering tools 102 with certain default parameters, and/or to follow a predetermined workflow with automated assistance directing the user 104 through the product development process. Meanwhile, users that are more skilled may still be provided with automated assistance, but may be provided with more opportunities to override default or suggested workflows and settings.

In some implementations, the computing system 108 can host applications and services 122 that automate or partially automate components of common V&V products; expected or common data transmissions, including components of data transmissions, from the user 104; expected or common interfaces and/or data exchanges, including components of interfaces, between various digital engineering tools 102; expected or common interfaces and/or data exchanges, including components of interfaces, with machine learning models implemented on the computing system 108 (e.g., models trained and/or implemented by the machine learning engine 120); and expected or common interfaces and/or data exchanges between the applications and services themselves (e.g., within the applications and services layer 122).

In some implementations, the data from multiple uses of the ecosystem 100 (or a portion of said data) can be aggregated to develop a training dataset. This training dataset can then be used to train machine learning models (e.g., using the machine learning engine 120) to perform a variety of tasks including the identification of which of the digital engineering tools 102 to use to satisfy a particular common V&V product; the identification of specific models, tests, and/or simulations (including inputs to them) that should be performed using the digital engineering tools 102; the identification of the common V&V products that need to be considered for a product of a particular type; the identification of one or more recommended actions for the user 104 to take in response to a failed regulatory requirement; the estimation of model/test/simulation sensitivity to particular inputs; etc. The outputs of the trained machine learning models can be used to implement various features of the interconnected digital engineering and certification ecosystem 100 including automatically suggesting inputs (e.g., inputs to the digital engineering tools 102) based on previously entered inputs, forecasting time and cost requirements for developing a product, predictively estimating the results of sensitivity analyses, and even suggesting design changes, original designs, or design alternatives (e.g. via assistive or generative AI) to a user's prototype to overcome one or more requirements (e.g., regulatory and/or certification requirements) associated with a common V&V product. In some implementations, with enough training data, the machine-learning engine 120 may generate new designs, models, simulations, tests, and/or common V&V products on its own based on data collected from multiple uses of the ecosystem 100.

In addition to storing usage data to enable the development of machine learning models, previous prototype designs and/or solutions (e.g., previously designed components, systems, models, simulations and/or other engineering representations thereof) can be stored within the ecosystem 100 (e.g., in storage 118) to enable users to search for and build upon the work of others. For example, previously designed components, systems, models, simulations and/or other engineering representations thereof can be searched for by the user 104 and/or suggested to the user 104 by the computing system 108 in order to satisfy one or more requirements associated with a common V&V product. The previously designed components, systems, models, simulations, and/or other engineering representations thereof can be utilized by the user 104 as is, or can be utilized as a starting point for additional modifications. This store, or repository, of previously designed components, systems, models, simulations, and/or other engineering representations thereof (whether they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with the user 104 can be checked by the computing system 108 to determine which designs and/or solutions stored in the repository can be accessed by the user 104. In some implementations, usage of the previously designed components, systems, models, simulations, and/or other engineering representations thereof may be available only to other users who pay a fee for a usage.

Figure 2A:
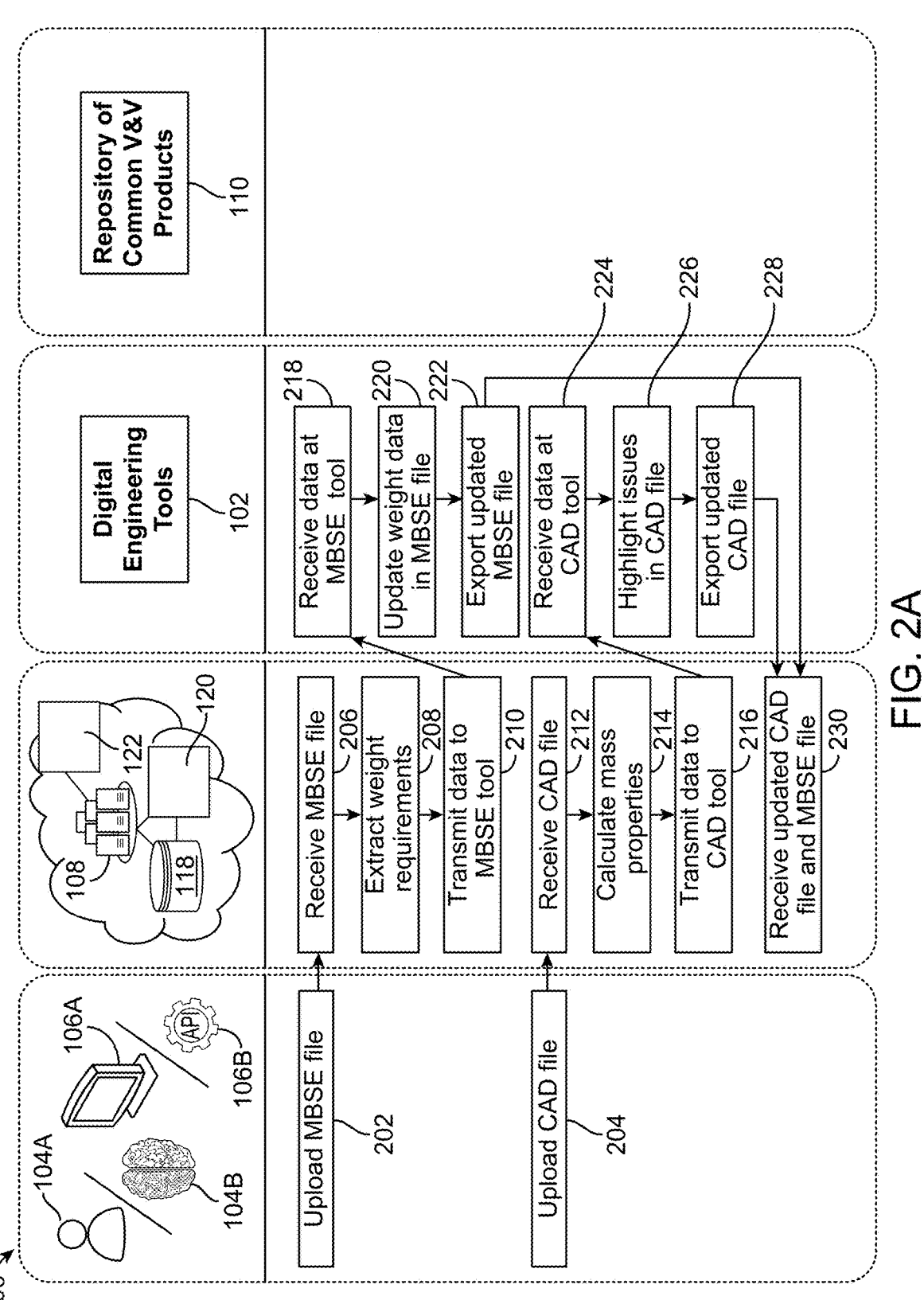
FIGS. 2A-2B are flow charts showing an example workflow involving an interconnected digital engineering and certification ecosystem.
Figure 2B:
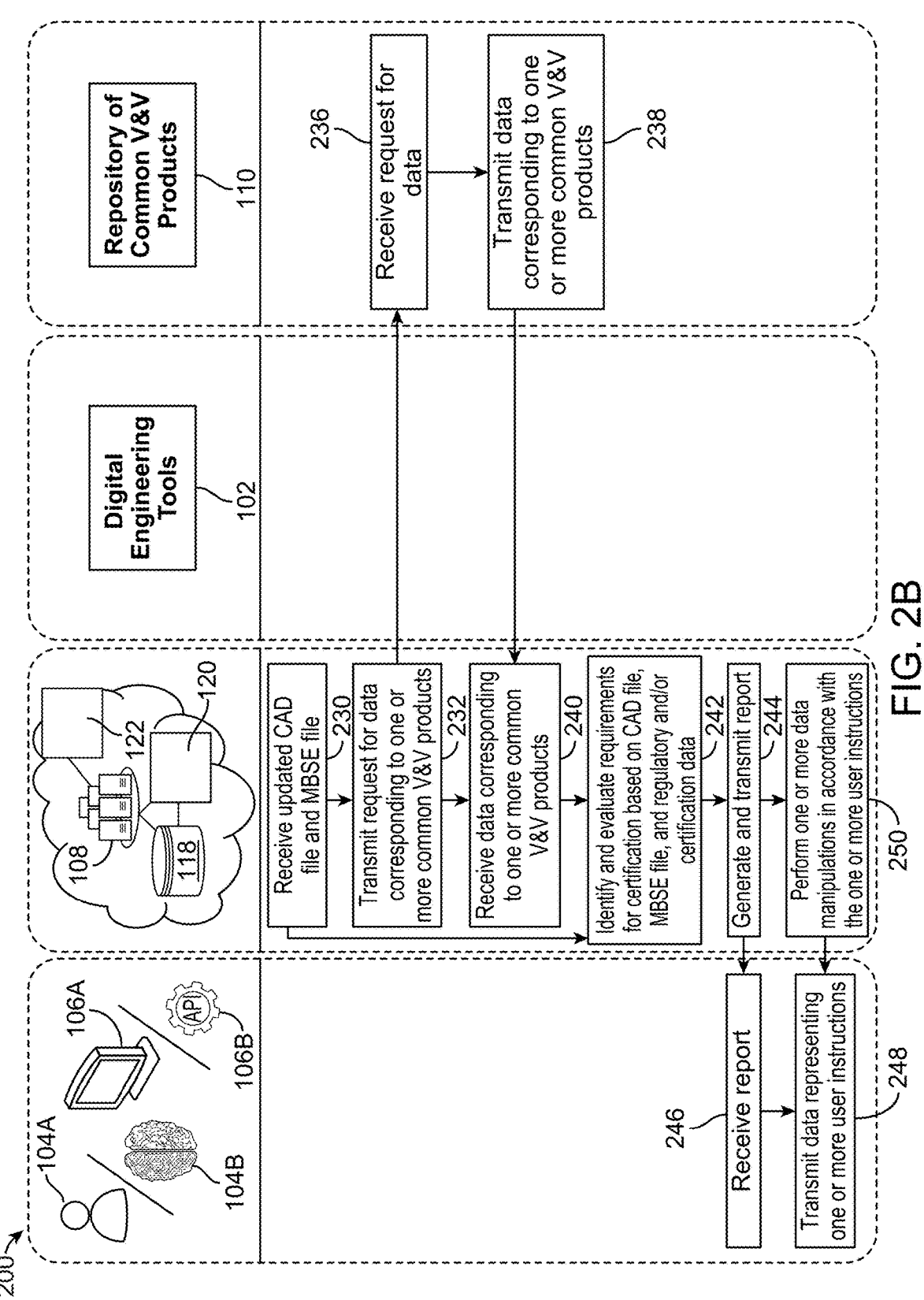

Referring now to FIGS. 2A-2B, an example digital product development and certification workflow 200 is shown, which can be implemented using the integrated digital engineering and certification ecosystem 100 (shown in FIG. 1). While not intended to be limiting, the workflow 200 is used to describe a demonstrative and practical example illustrative of the kinds of workflows enabled by the ecosystem 100 and its various features. In FIGS. 2A-2B, individual steps of the workflow 200 are grouped by the elements of the ecosystem 100 that perform them (i.e., the user device 106A or the API 106B operated by the user 104; the computing system 108 connected to (and/or including) the storage 118, the machine learning engine 120, and the applications and services layer 122; the digital engineering tools 102; and the repository of common V&V products 110).

At step 202, the user 104 can upload a MBSE file corresponding to a digital representation of a product (e.g., a UAV) from the user device 106A or the API 106B to the computing system 108. At step 204, the user 104 can also upload a CAD file corresponding to the digital representation of the product from the user device 106 to the computing system 108.

The computing system 108 can receive the MBSE file (206), process the MBSE file to extract weight requirements (208), and transmit data to a MBSE tool (210). For example, the data transmitted to the MBSE tool can include updated weight data, which the computing system 108 can request the MBSE tool to update the MBSE file. The request can be made, for example, via the API 114 shown in FIG. 1.

Likewise, the computing system 108 can receive the CAD file (212), process the CAD file to calculate (e.g., mass properties (214) of the digital prototype), and can transmit data to a CAD tool (216). For example, the data transmitted to the CAD tool can include identified weight issues, which the computing system 108 can request the CAD tool to update the CAD file with (e.g., by highlighting the identified issues in the CAD file). This request can also be made via the API/SDK 114 shown in FIG. 1.

At step 218, the MBSE tool (e.g., one of the digital engineering tools 102) can receive the data transmitted to the MBSE tool from the computing system 108. The MBSE tool can then update the weight data in the MBSE file (220) and export the updated MBSE file (222) to the computing system 108.

Likewise, at step 224, the CAD tool (e.g., another one of the digital engineering tools 102) can receive the data transmitted to the CAD tool from the computing system 108. The CAD tool can then update the CAD file to highlight issues in the CAD file (226) and export the updated CAD file (228) to the computing system 108.

At step 230, the computing system 108 can receive the updated CAD file and MBSE file exported by the CAD tool and the MBSE tool, respectively.

At step 232, the computing system 108 can transmit a request for data (e.g., regulatory and/or certification data) corresponding to one or more common V&V products (232). For example, the request can be transmitted via the API/SDK 116 shown in FIG. 1 to be processed at the repository of common V&V products 110, which, as described previously, can be hosted by a regulatory and/or certification authority or another third party. While step 232 is shown subsequent to the communication of the computing system 108 with the digital engineering tools 102 in the workflow 200 (e.g., steps 210, 216, 222, 228, and 230), in some implementations, the computing system 108 can retrieve the data corresponding to the one or more common V&V products from the repository of common V&V products 110 prior to communicating with the digital engineering tools 102. In the example shown in FIGS. 2A-2B, the data requested at step 232 can correspond to "MIL HDBK 516c 5.5.2 (JSSG-2006)"—a regulatory standard that sets forth weight and center of gravity requirements for an aircraft to be certified as "airworthy." The repository of common V&V products 110 can receive the request for data corresponding to the one or more common V&V products (236) and transmit the corresponding data (238) to the computing system 108, which can, in turn, receive the data corresponding to the one or more common V&V products (e.g., regulatory and/or certification data) (240).

At step 242, the computing system 108 can process the updated CAD file and MBSE file (received at step 230) and the data corresponding to the one or more common V&V products (received at step 240) to identify and evaluate one or more requirements for certification. For example, the computing system can automatically process the CAD file and MBSE file to compute the weight and center of gravity for a physical manifestation of the digital prototype. The computing device can then compare these to the requirements for weight and center of gravity of aircraft identified within the data corresponding to "MIL HDBK 516c 5.5.2 (JSSG-2006)."

At step 244, based on the computing system's evaluation of the requirements identified within the data corresponding to "MIL HDBK 516c 5.5.2 (JSSG-2006)," the computing system 108 can generate and transmit a report to the user device 106A or API 106B. The report can summarize the results of the evaluation, including an indication of whether the identified requirements were satisfied. In some implementations, the report can also include one or more recommended actions for the user. The recommendations can be generated, for example, using the machine-learning engine 120 as previously described above in relation to FIG. 1.

At step 246, the user device 106A or the API 106B can receive the report, and the user 104 can review the report. For example, the report can be presented on a display of the user device 106A in order to be reviewed by the human user 104A and/or be received at the API 106B for processing by the artificial user 104B. In response to reviewing the report, the user 104 can operate the user device 106A or the API 106B to update the prototype design and/or transmit data representing one or more user instructions (248) to the computing system 108. As described previously, such user instructions can include instructions for the computing system 108 to re-evaluate an updated prototype design, use one or more different digital engineering tools 102 for the evaluation process, and/or modify the inputs to the digital engineering tools 102. At step 250, the computing system 108 can receive the one or more user instructions and perform one or more data manipulations in accordance with the one or more user instructions. In this way, the workflow 200 can enable the iterative design of a digital prototype using the interconnected digital engineering and certification ecosystem 100 to design and certify a product such as a UAV, drug, manufacturing process, etc. entirely within the digital world.

Figure 3:
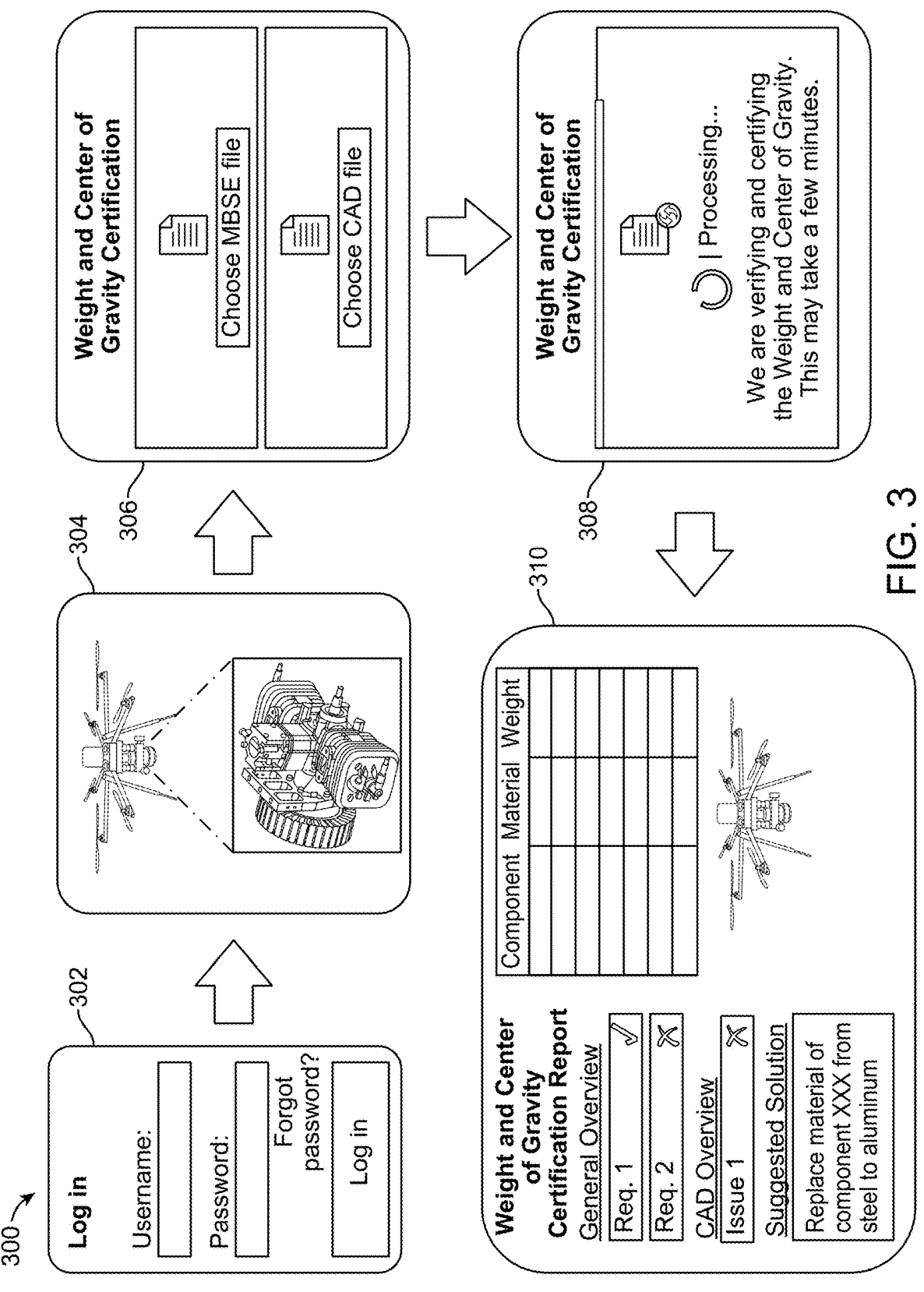
FIG. 3 shows a series of example displays shown on a user device corresponding to the example workflow of FIGS. 2A-2B.

In FIG. 3, a series of example displays 300 shown on the user device 106A is illustrated. It is noted that in implementations involving artificial users 104B that interface with the computing system via an API 106B, no displays are needed since artificial users 104B can directly process digital computer files received at the API 106B without further visualization. The series of example displays 300 can correspond to the example workflow 200 described in relation to FIGS. 2A-2B. Once again, these displays are not intended to be limiting, but are merely demonstrative of the kinds of user experiences that user 104 (and in particular, a human user 104A) may encounter while using the interconnected digital engineering and certification ecosystem 100 for digital product development. The series of example displays 300, as described herein, highlight the case of use of the ecosystem 100 and the avoided complexity of requiring a user to separately interface with individual digital engineering tools and manually review complex common V&V products to evaluate if a prototype of a product should be certified.

Display 302 shows a login screen that can be displayed on the user device 106A. The login screen can prompt the user 104 to input user credentials (e.g., username and password) to access the computing system 108 and the rest of the interconnected digital engineering and certification ecosystem 100. The user credentials associated with user 104 can serve a variety of functions. For example, as previously described, the user credentials can be associated with a skill level of the user, which can control what functionalities of the ecosystem 100 the user 104 can access. In some implementations, the user credentials can additionally or alternatively be associated with an affiliation of the user (e.g., with a particular company and/or organizational entity), which can govern the previously designed products and/or solutions that a user may search for and/or be suggested by the computing system 108. In general, user credentials can help ensure that the user 104 is only able to access information within the ecosystem 100 the user 104 is qualified and/or authorized to access.

Once the user 104 has logged in from the user device 106A, the user device 106A can be used to develop a digital prototype for a product. For example, display 304 shows a modeling screen the user 104 might see while developing a digital model of a UAV (e.g., using a CAD tool). Once the prototype has been developed, the user can upload prototype data, such as a CAD file and/or a MBSE file to the computing system 108 (e.g., as in step 202 and step 204 of the workflow 200). Accordingly, display 306 shows a screen that can prompt the user 104 to upload the MBSE file and the CAD file to the computing system 108.

Once the user has uploaded the MBSE file and the CAD file to the computing system 108, the computing system 108 can perform a number of steps to evaluate the prototype with respect to one or more requirements identified in a common V&V product and to generate a report summarizing the evaluation (e.g., steps 206, 207, 210, 212, 214, 216, 230, 232, 240, 242, and 244 of the workflow 200). In doing so, the computing system 108 may also communicate with the digital engineering tools 102 and repository of common V&V products 110, which can themselves perform operations to facilitate the evaluation of the prototype (e.g., steps 218, 220, 222, 224, 226, 228, 236, and 238 of the workflow 200). These steps take time to complete (e.g., ranging from a few seconds to several hours), during which the display 308 can be shown on a screen of the user device 106A, providing information about the current status of the evaluation of the prototype.

Once the evaluation of the prototype is complete, a generated report can be transmitted to the user device 106A from the computing system 108 (e.g., at step 244 of the workflow 200). Display 310 shows a screen of the user device 106A that presents the report to the user 104. The report can present information indicating whether or not one or more requirements identified in the common V&V product of interest have been satisfied and can present information about one or more issues that resulted in a failed requirement (e.g., a problematic component of the device). In some implementations, the presented information can also include more detailed data from the evaluation and/or a suggested solution for resolving the one or more issues to satisfy the requirements. The easily digestible format of the report presented on the display 310 can assist the user 104 with understanding the reasons why a prototype might fail one or more requirements and can provide the user 104 with actionable suggestions to improve the digital prototype. Even in implementations involving an artificial user 104B (where screen displays are not needed), a concise or standardized report in the form of a digital computer file sent to the API 106B can likewise assist the artificial user 104B with understanding the reasons why a prototype might fail one or more requirements and can provide the artificial user 104B with actionable suggestions to improve the digital prototype.

Figure 4:
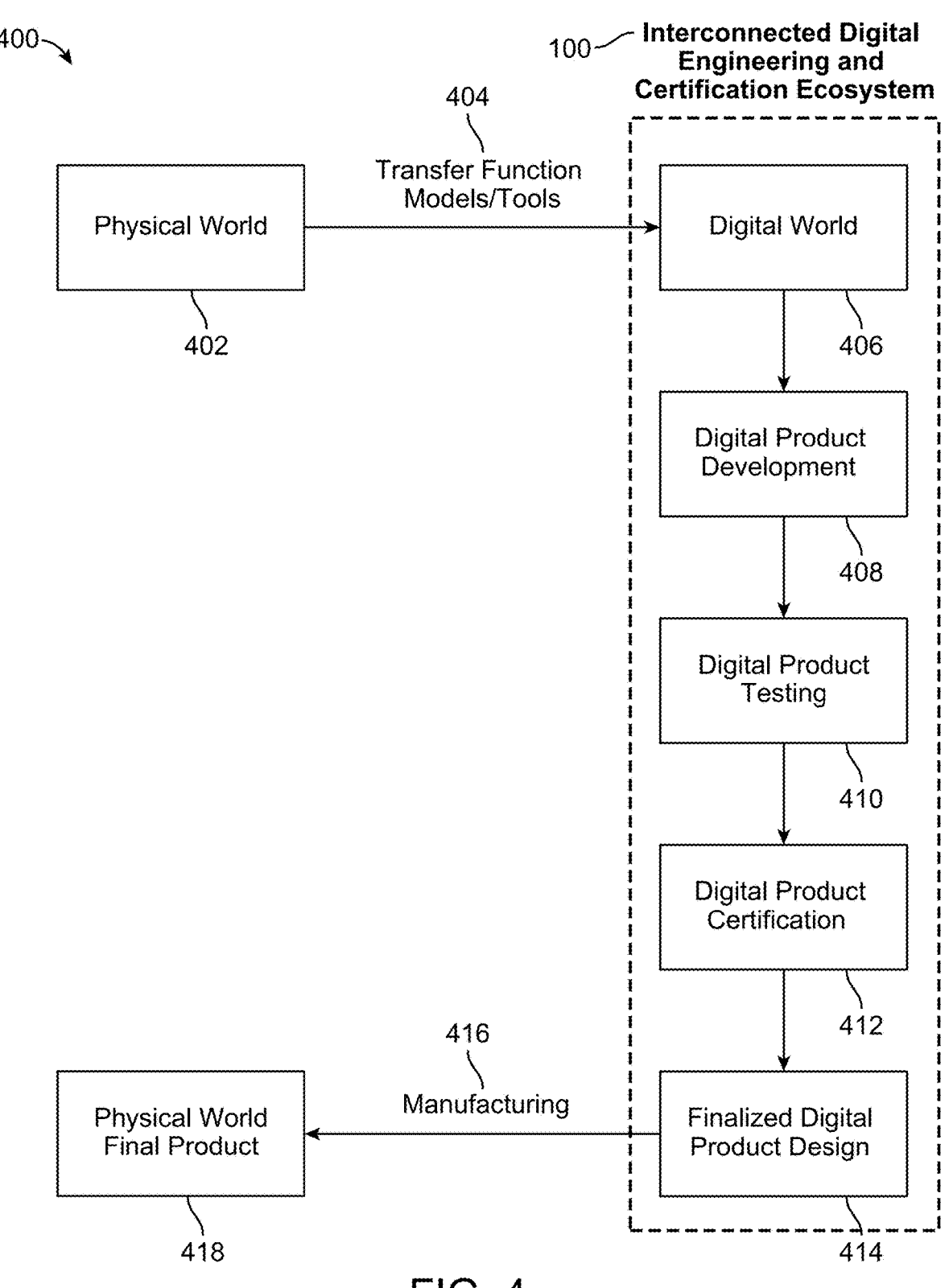
FIG. 4 is a flow chart showing an example product design process using an interconnected digital engineering and certification ecosystem.

In FIG. 4, a flow chart 400 is depicted, illustrating an example product design process using the interconnected digital engineering and certification ecosystem 100. By translating elements and characteristics such as laws of physics from the physical world 402 to a digital world 406, via transfer function models and tools 404, product development and certification can be enabled entirely (or nearly entirely or partially) within the ecosystem 100. It is noted that the entire physical world need not be perfectly replicated all at once, but in some cases, very specific subsets of the physical world can be described digitally by any number of models or simulations (e.g., a model describing turbulent flow of air between 200 and 600 knots, complemented by another model describing turbulent flow of air between 500 and 800 knots), which all together add up to a sufficient representation of the physical world so as to allow for certification of specific systems or products. An interconnected digital engineering and certification ecosystem (e.g., the ecosystem 100) can allow for each of these pieces to be added individually by many different people and many different entities without the need for coordination and with aligned incentives (e.g., enabled by protection of intellectual property, monetization of models or valuable digital representations of the physical world, etc.), to allow the digital representation of the physical world to be built in a modular and complementary manner, enabling each of the models or simulations to connect to one another and build off of one another. For example, digital product development 408, digital product testing 410, and digital product certification 412 can all occur within the ecosystem 100, taking place entirely within a digital realm or "metaverse" to produce a finalized digital product design 414. Following this product design process, the finalized digital product design need only be translated into the physical world (e.g., via manufacturing 416) to produce a physical world final product 418 at the very end of the product design process. This is in stark contrast to current product development and certification workflows, which may utilize digital engineering tools, but oftentimes still require the physical manufacturing, testing, and certification of prototypes throughout the iterative product development, product testing, and product certification process. Compared to such workflows, the product design process enabled by the interconnected digital engineering and certification ecosystem 100, can therefore yield significant savings of time, cost, materials, and environmental impact.

Figure 5:
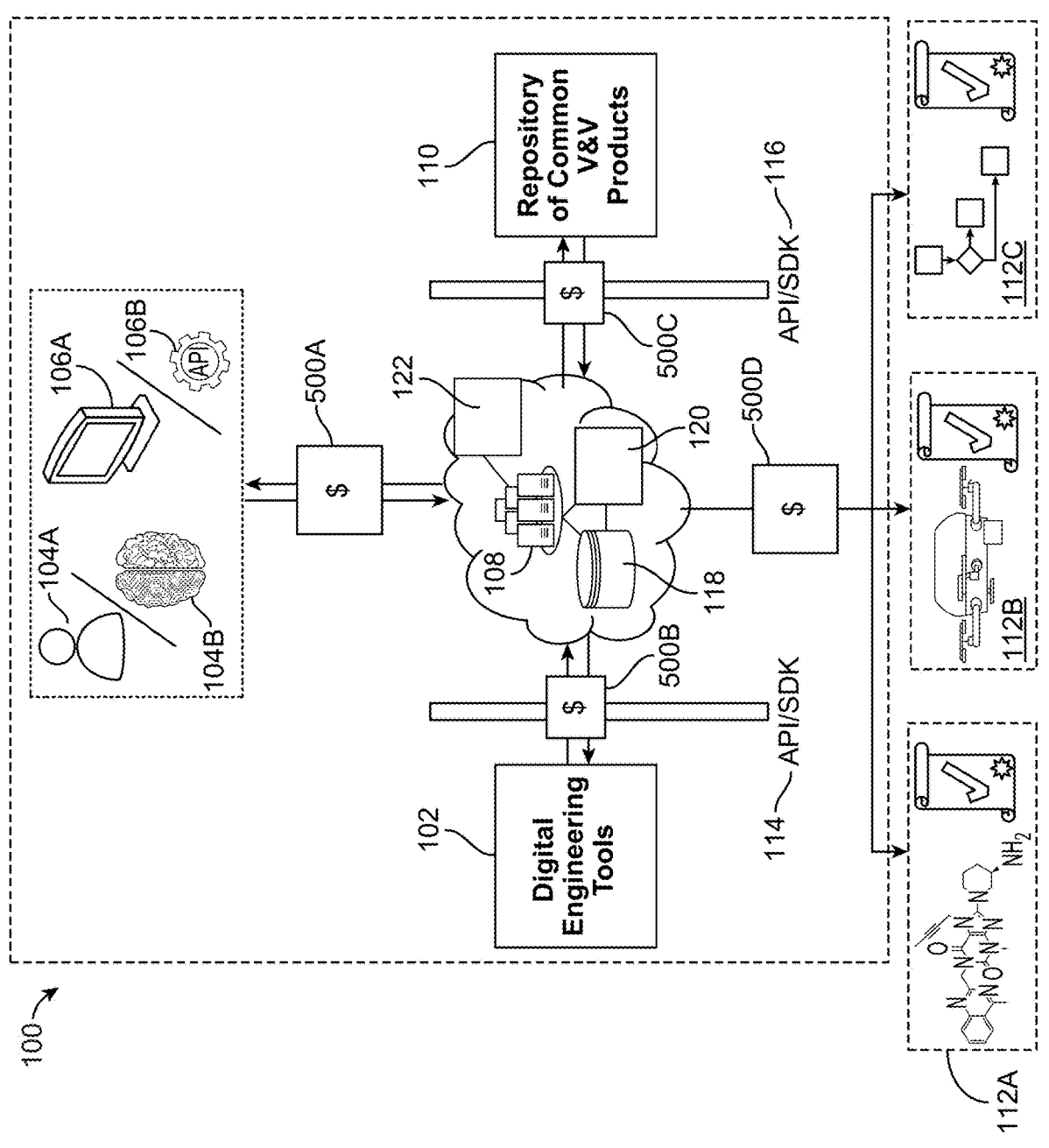
FIG. 5 is a diagram showing how an interconnected digital engineering and certification ecosystem can be monetized.

In FIG. 5, the interconnected digital engineering and certification ecosystem 100 presents various different opportunities for monetization (shown as blocks 500A-500D). In some implementations, interactions between the user 104 and the computing system 108 can include an opportunity for monetization 500A. For example, the user 104 can be charged to send instructions to the computing system 108 and/or the user 104 can be charged to download data from the computing system 106 (e.g., certification reports). Charges can be subscription-based (e.g., charging a monthly or annual fee to use the computing system 108), usage-based (e.g., charging the user 104 based on a number of interactions with the computing system 108, an amount of time spent interacting with the computing system 108, etc.), or mixed (e.g., using a freemium model).

In some implementations, interactions between the computing system 108 and the digital engineering tools 102 can include an opportunity for monetization 500B. For example, the user 104 can be charged for sending data between the computing system 108 and/or the digital engineering tools 102. In some implementations, the charges paid by the user 104 can be split between third party providers of the digital engineering tools 102 and a party that operates the computing system 108. In some implementations, the third party providers of the digital engineering tools 102 may themselves pay a fee to the operator of the computing system 108 to have their digital engineering tools be included in the ecosystem 100. Charges to the user 104 can be subscription-based (e.g., charging a monthly or annual fee to gain access to particular digital engineering tools 102), usage-based (e.g., charging the user 104 based on an amount of data transferred between the digital engineering tools 102 and the computing system 108, an amount of processing time required by the digital engineering tools 102, etc.), or mixed (e.g., using a freemium model).

In some implementations, interactions between the computing system 108 and the repository of common V&V products 110 can include an opportunity for monetization 500C. For example, the user 104 can be charged for sending data between the computing system 108 and/or the repository of common V&V products 110. In some implementations, the charges paid by the user 104 can be split between the authorities operating the repository of common V&V products 110 and a party that operates the computing system 108. Charges to the user 104 can be subscription-based (e.g., charging a monthly or annual fee to gain access to the repository of common V&V products 110), usage-based (e.g., charging the user 104 based on an amount of data transferred between the repository of common V&V products 110 and the computing system 108, a number of common V&V products requested, etc.), or mixed (e.g., using a freemium model).

In some implementations, the ultimate certification of the digitally certified products 112 by the computing system 108 can also include an opportunity for monetization 500D. For example, the user 104 can be charged a fee to perform a formal certification of the user's product. In addition or alternatively, the user 104 can be charged a fee to download a proof of certification.

Figure 18:
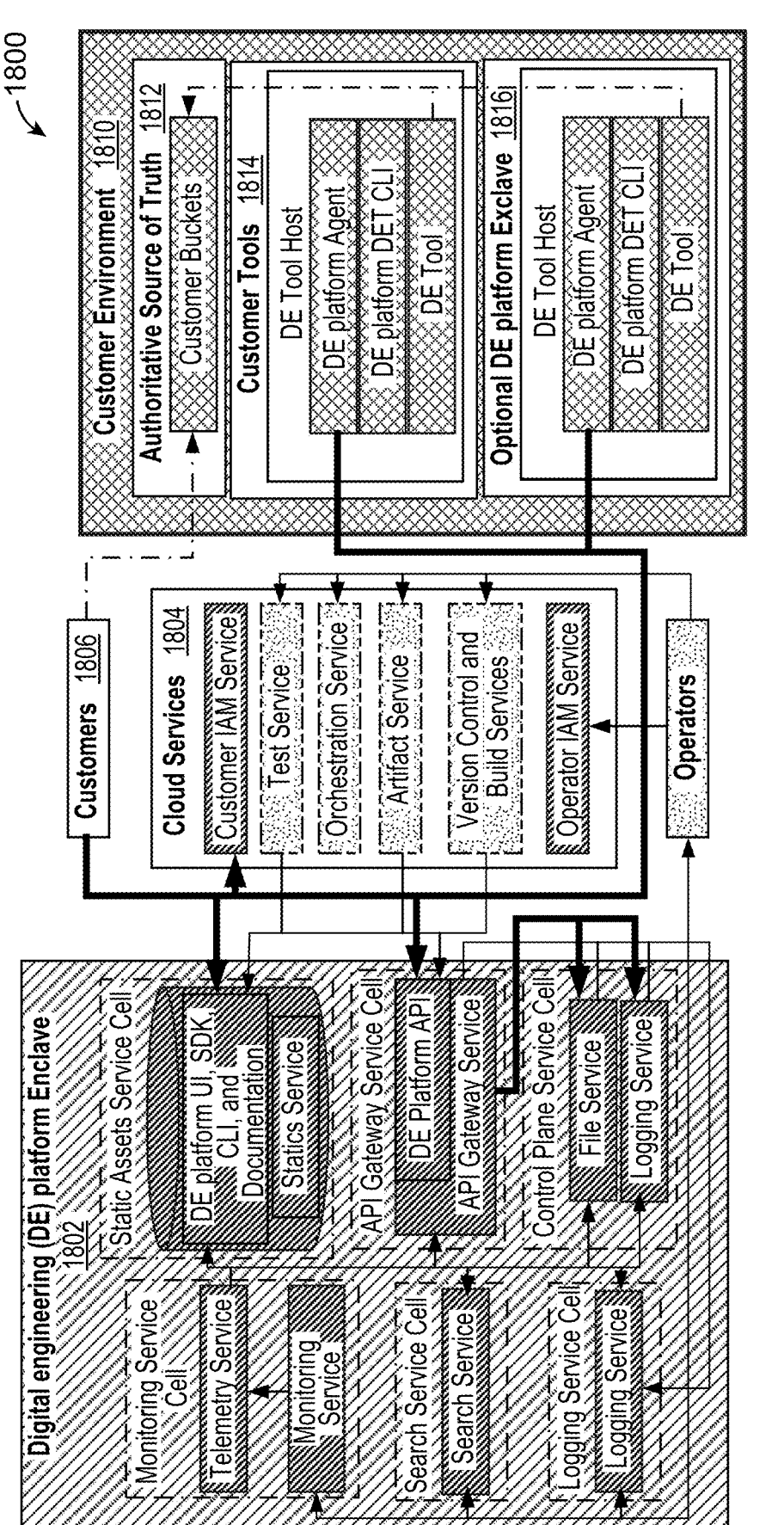
FIG. 18 is a diagram showing an example architecture for an interconnected digital engineering and certification ecosystem.
Figure 18:
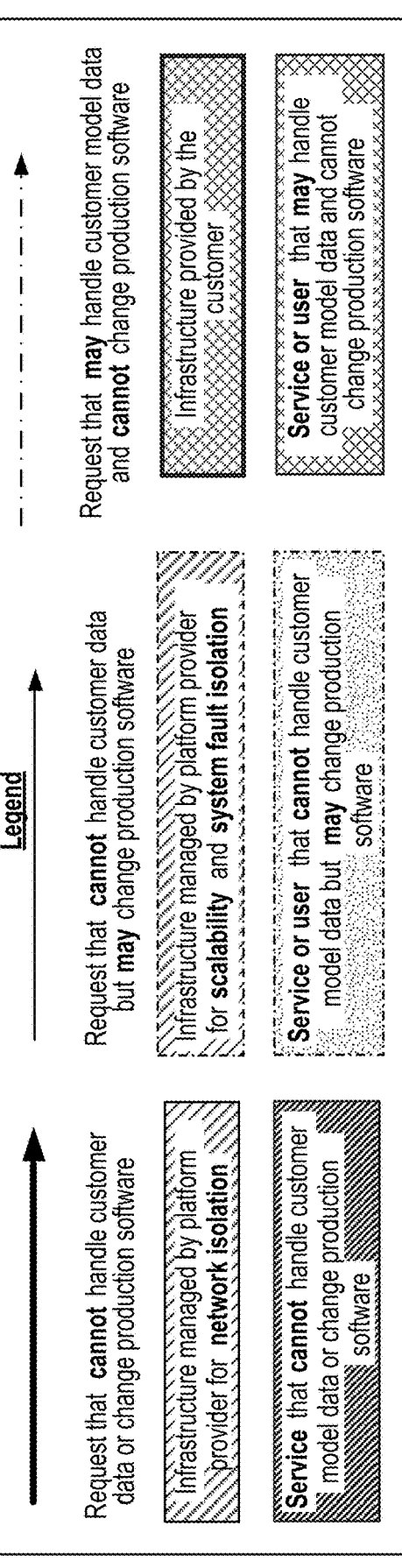

Referring now to FIG. 18, an example architecture for a digital engineering (DE) platform 1800 (such as the interconnected digital engineering and certification ecosystem 100) is shown. The example architecture for the digital engineering platform 1800 is designed in accordance with zero trust security principles and is further designed to support scalability as well as robust and resilient operations.

In one embodiment, the architecture of the digital engineering platform 1800 includes multiple components: a digital engineering (DE) platform enclave 1802, cloud services 1804, and a customer environment 1810. The customer environment 1810 optionally includes a DE platform exclave 1816.

The DE platform enclave 1802 can serve as a starting point for the services rendered by the platform 1800. The enclave 1802 can be visualized as the central command hub responsible for the management and functioning of the operations. For example, the enclave 1802 can be implemented using the computer system 108 of the interconnected digital engineering and certification ecosystem 100 described above. The DE platform enclave 1802 serves as the centralized command and control hub responsible for orchestrating and managing all platform operations. It is designed to integrate both zero trust security models and hyperscale capabilities, resulting in a secure and scalable processing environment tailored to individual customer needs. Zero trust security features include, but are not limited to, strict access control, algorithmic impartiality, and data isolation. The enclave 1802 also supports a machine learning engine (e.g., the machine learning engine 120) for real-time analytics, auto-scaling features for workload adaptability, and API-based interoperability with third-party services. Security and resource optimization are enhanced through multi-tenancy support, role-based access control, and data encryption both at rest and in transit. The digital engineering platform enclave 1802 can also include one or more of the features described below.

First, the digital engineering platform enclave 1802 can be designed in accordance with zero trust security principles. In particular, the DE platform enclave 1802 employs zero trust principles to ensure that no implicit trust is assumed between any elements, such as digital models, platform agents or individual users (e.g., users 104A, 104B) or their actions, within the system. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

The DE platform enclave 1802 can also be designed to maintain isolation and independence. A key aspect of the enclave's architecture is its focus on impartiality and isolation. The enclave 1802 disallows cryptographic dependencies from external enclaves and enforces strong isolation policies. The enclave's design also allows for both single-tenant and multi-tenant configurations, further strengthening data and process isolation between customers 1806 (e.g., users 104A, 104B). Additionally, the enclave 1802 is designed with decoupled resource sets, minimizing interdependencies and thereby promoting system efficiency and autonomy.

The DE platform enclave 1802 can further be designed for scalability and adaptability. The enclave 1802 is engineered to be both scalable and adaptable, aligning well with varying operational requirements. For example, the enclave 1802 can incorporate hyperscale-like properties in conjunction with zero trust principles to enable scalable growth and handle high-performance workloads effectively.

The DE platform enclave 1802 can further be designed for workflow adaptability, accommodated through strict access control mechanisms. The DE platform enclave 1802 is designed to accommodate varying customer workflows and DE models through its strict access control mechanisms. This configurability allows for a modular approach to integrating different functionalities, ranging from data ingestion to algorithm execution, without compromising on the zero trust security posture. The platform 1800's adaptability makes the platform 1800 highly versatile for a multitude of use-cases, while ensuring consistent performance and robust security.

The DE platform enclave 1802 can further be designed to enable analytics for robust platform operations. At the core of the enclave's operational efficiency is a machine learning engine (e.g., machine learning engine 120) capable of performing real-time analytics. This enhances decision-making and operational efficiency across the platform 1800. Auto-scaling mechanisms can also be included to enable dynamic resource allocation based on workload demand, further adding to the platform's responsiveness and efficiency.

In an example implementation, the DE platform enclave 1802 can include several components as shown in FIG. 18 and as described in further detail herein.

In the embodiment of the DE platform enclave 1802 shown in FIG. 18, the DE platform enclave 1802 includes a "Monitoring Service" and a "Telemetry Service" as part of a "Monitoring Service Cell." These components focus on maintaining, tracking and analyzing the performance of the platform 1800 to ensure optimal service delivery, including advanced machine learning capabilities for real-time analytics.

In the embodiment of the DE platform enclave 1802 shown in FIG. 18, the DE platform enclave 1802 also includes a "Static Assets Service Cell," which houses the user interface, SDKs, command line interface (CLI), and documentation for the platform 1800.

In the embodiment of the DE platform enclave 1802 shown in FIG. 18, the DE platform enclave 1802 further includes an "API Gateway Service Cell," which includes the DE platform API(s) (e.g., APIs 114, 116) and acts as a mediator for requests between the client applications (e.g., the digital engineering tools 102, the repository of common V&V products 110, etc.) and the platform services.

In the embodiment of the DE platform enclave 1802 shown in FIG. 18, the DE platform enclave 1802 further includes a "Search Service Cell." This component aids in the efficient retrieval of information from the DE platform 1800, adding to its overall functionality.

In the embodiment of the DE platform enclave 1802 shown in FIG. 18, the DE platform enclave 1802 further includes a "Logging Service Cell" and a "Control Plane Service Cell." These components are instrumental in recording and managing operational events and information flow within the platform 1800.

As shown in FIG. 18, the architecture of the digital engineering platform 1800 also includes cloud services 1804 that include services that cannot interact with customer data but can modify the software for the orchestration of digital engineering platform operations. In example implementations, several cloud resources provide support and foundational services to the platform. For example, in the embodiment of the DE platform 1800 shown in FIG. 18, the cloud services 1804 include a "Customer IAM Service," where "IAM" stands for "Identity and Access Management." The Identity and Access Management Service ensures secure and controlled access to the platform 1800.

In the embodiment of the DE platform 1800 shown in FIG. 18, the cloud services 1804 also include a "Test Service," which involves testing tools to validate platform operations.

In the embodiment of the DE platform 1800 shown in FIG. 18, the cloud services 1804 also include an "Orchestration Service," which controls and manages the lifecycle of containers on the platform 1800.

In the embodiment of the DE platform 1800 shown in FIG. 18, the cloud services 1804 also include an "Artifact Service" and "Version Control and Build Services." These cloud services are crucial in maintaining the evolution of projects, codes, and instances in the system, while also managing artifacts produced during the product development process.

As shown in FIG. 18, the architecture of the digital engineering platform 1800 also includes a customer environment 1810 with an "Authoritative Source of Truth" 1812, customer tools 1814, and an optional DE platform exclave 1816. The customer environment 1810 is the site where customer data resides and is processed in a zero trust manner by the digital engineering platform 1800. As described previously, the DE platform enclave 1802, in focusing on both zero trust principles and hyperscale-like properties, provides a robust and scalable environment for the secure processing of significant workloads, according to the customer's unique needs. In some examples, a DE platform exclave 1816, is situated within the customer environment 1810 in order to assist the customer(s) 1806 with their digital engineering tasks and operations.

When a customer 1806 (e.g., user 104A, 104B) intends to perform a digital engineering task using the digital engineering platform 1800 (e.g., interconnected digital engineering and certification ecosystem 100), typical operations include secure data ingestion and controlled data retrieval. Derivative data generated through the digital engineering operations, such as updated digital model files or revisions to digital model parameters, are stored only within the customer environment 1810, and the digital engineering platform 1800 may provide tools to access the metadata of the derivative data. Example implementations may include secure data ingestion, which utilizes zero trust principles to ensure customer data is securely uploaded to the customer environment 1810 through a pre-validated secure tunnel, such as Secure Socket Layer (SSL) tunnel. This can enable direct and secure file transfer to a designated cloud storage, such as an S3 bucket, within the customer environment 1810. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within the customer environment 1810 while adhering to zero trust security protocols. Example implementations may also include tokenization utility, in which a specialized Digital Engineering (DE) platform tool referred to as a "tokenizer" is deployed within the customer environment 1810 for secure management of derivative metadata, conforming to zero trust guidelines.

The customer environment 1810 interacts with other elements of the secure digital engineering (DE) platform 1800 and includes multiple features that handle data storage and secure interactions with the platform 1800. For example, one element of the customer environment 1810 is the "Authoritative Source of Truth" 1812, which is a principal repository for customer data, ensuring data integrity and accuracy. Nested within this are the "Customer Buckets" where data is securely stored with strict access controls, limiting data access to authorized users or processes through pre-authenticated URL links. This setup ensures uncompromising data security within the customer environment 1810 while providing smooth interaction with other elements of the DE platform 1800.

The customer environment 1810 also includes additional software tools (e.g., customer tools 1814) that can be utilized based on specific customer requirements. For example, the "DE Tool Host" is a component that handles the necessary data engineering applications for working with customer data. It includes the DET CLI (Digital Engineering Tools Command-Line Interface), enabling user-friendly command-line operation of DE tools (e.g., the digital engineering tools 102). The "DE platform Agent" ensures smooth communication and management between the customer environment 1810 and elements of the DE platform 1800. Furthermore, there can be another set of optional DE tools designed to assist customer-specific data engineering workflows.

In some cases, an optional feature known as a "DE Platform Exclave" 1816 can be employed within the customer environment 1810 for enhanced security. The Exclave 1816 operates within the customer's network, supervising data processing, and rigorously adhering to zero trust principles while delivering hyperscale-like platform performance. The Exclave 1816 contains a "DE Tool Host" that runs the DE tools and the agent necessary for operation.

Figure 6:
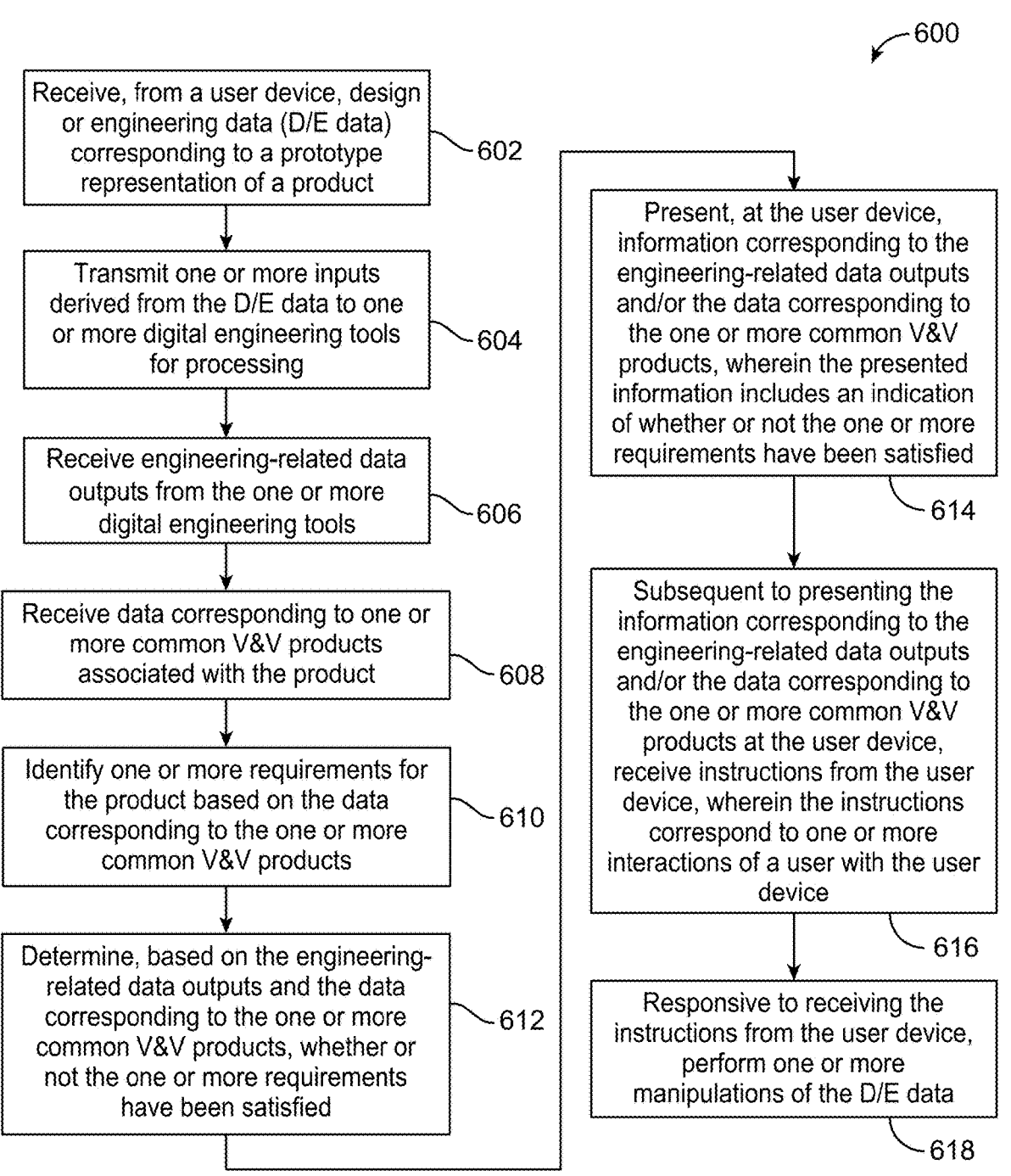
FIG. 6 is a flow chart showing a process for product development performed by a computing system of an interconnected digital engineering and certification ecosystem.

FIG. 6 illustrates an example process 600 for product development. In some implementations, the process 600 can be executed by a computing system (e.g., computing system 108) of an interconnected digital engineering and certification ecosystem (e.g., the ecosystem 100).

Operations of the process 600 include receiving, from a user device, design and/or engineering data (D/E data)

corresponding to a prototype representation of a product (602). For example, the user device can correspond to the user device 106A or the API 106B, and the D/E data can correspond to a MBSE file, a CAD file, and/or other digital files or information associated with a digital prototype, as described above. In some implementations, the product can be a UAV or another type of aircraft; car; boat; underwater vehicle; industrial robotic; spacecraft; satellite; structure; tool; physical device; mobile device; drug, chemical product or biologic; manufacturing process; or any other complex system (either physical or non-physical) that may be assessed against a common V&V product.

Operations of the process 600 also include transmitting one or more inputs derived from the D/E data to one or more digital engineering tools for processing (604). For example, the one or more digital engineering tools can correspond to the digital engineering tools 102 described above. In some implementations, at least a subset of the one or more digital engineering tools can include model-based systems engineering (MBSE) tools, augmented reality (AR) tools, computer aided design (CAD) tools, robotics simulation and programming tools, data analytics tools, modeling and simulation (M&S) tools, geographic Information System (GIS) tools for spatial analysis, product lifecycle management (PLM) tools, Internet of Things (IoT) platforms, virtual and augmented reality design tools, human-machine interface (HMI) design tools, and simulation engines. The digital engineering models can include requirements models, electronics models, test-plan models, cost-models, schedule models, software modeling, supply-chain models, manufacturing models, cyber security models, multi-attribute tradespace tools, finite element analysis models, computational fluid dynamics models, computational electromagnetics models, Noise, Vibration, and Harshness (NVH) simulation models, control system design and simulation models, structural analysis and optimization models, power system analysis and simulation models, thermal analysis and simulation models, failure analysis and prediction models, digital twin models, artificial intelligence and machine learning models, environmental impact models, mission effects models, or other similar digital engineering tools that may be recognized as engineering design tools by a person of ordinary skill in the relevant field.

Operations of the process 600 also include receiving engineering-related data outputs from the one or more digital engineering tools (606). For example, the engineering-related data outputs can correspond to the results of models, tests, and/or simulations performed by the data engineering tools 102, as described above.

Operations of the process 600 also include receiving data corresponding to one or more common V&V products associated with the product (608). For example, the one or more common V&V products can be digitized regulatory and/or certification standards and can correspond to the common V&V products 110A-110J stored in the repository of common V&V products 110 described above. In some implementations, the data corresponding to the one or more common V&V products can be received from the user device (e.g., via a user upload). In some implementations, the data corresponding to the one or more common V&V products can be received from a regulatory and/or certification authority (e.g., via a repository of common V&V products hosted or maintained by the regulatory and/or certification authority).

Operations of the process 600 also include identifying one or more requirements for the product based on the data corresponding to the one or more common V&V products (610). For example, the one or more requirements can correspond to requirements that must be satisfied in order to certify a product in accordance with a particular common V&V product.

Operations of the process 600 also include determining, based on the engineering-related data outputs and the data corresponding to the one or more common V&V products, whether the one or more requirements have been satisfied (612). In some implementations, rather than making a binary determination, the operations of the process 600 can include determining whether or not the one or more requirements are likely to be satisfied by the prototype representation of the product (e.g., based on an estimated probability). In some implementations, determining whether the one or more requirements have been satisfied (or are likely to be satisfied) based on the engineering-related data outputs can include determining, with or without human input, whether the one or more requirements have been satisfied.

Operations of the process 600 also include presenting, at the user device, information corresponding to the engineering-related data outputs and/or the data corresponding to the one or more common V&V products, wherein the presented information includes an indication of whether the one or more requirements have been satisfied (614). In some implementations, the presented information can include an indication of a probability of whether the one or more requirements would be satisfied by the prototype representation of the product. For example, the information can be presented at the user device in the form of a report, as shown in the display 310 of FIG. 3 and as described above. In some implementations, the presented information can further include a recommended action the user of the user device can take to satisfy the one or more requirements. In such implementations, the recommended action can include a suggestion to use a particular digital engineering tool of the one or more digital engineering tools, a suggestion to modify the one or more inputs transmitted to the one or more digital engineering tools, a suggestion to modify one or more components of the prototype representation of the product, a suggestion to replace one or more components of the prototype representation of the product with a previously designed solution, and/or a suggestion of a wholly or partially new design generated by the system (e.g., using the machine learning engine 120).

Operations of the process also include, subsequent to presenting the information corresponding to the engineering-related data outputs and/or the data corresponding to the one or more common V&V products at the user device, receiving instructions from the user device, wherein the instructions correspond to one or more interactions of a user with the user device (616).

Operations of the process also include being responsive to receiving the instructions from the user device, performing one or more manipulations of the D/E data (618). In some implementations, performing the one or more manipulations of the D/E data can include modifying the D/E data and/or deriving modified inputs from the D/E data for transmission to the one or more digital engineering tools.

Additional operations of the process 600 can include the following. In some implementations, the process 600 can include storing, on a storage device, usage data representing the received data corresponding to the one or more common V&V products, the received D/E data, the engineering-related data outputs from the one or more digital engineering tools, the indication of whether the one or more requirements have been satisfied (or are likely to be satisfied), the one or more interactions of the user with the user device, and/or the one or more manipulations of the D/E data. The process 600 can also include incorporating applications and services (e.g., the applications and services 122) that automate or partially automate determinations of whether the one or more requirements have been satisfied or partially satisfied. The process 600 can also include incorporating at least a portion of the usage data in a training dataset, and training a machine-learning model based on the training dataset. In some implementations, the machine learning model can be configured to receive, as input, information relating to another product being designed by another user, and output a suggestion for the another user to use a particular digital engineering tool of the one or more digital engineering tools, a suggestion to modify one or more inputs transmitted to the one or more digital engineering tools by the another user, a suggestion to modify one or more components of another prototype representation associated with the another user, and/or a suggestion to replace one or more components of the another prototype representation with a previously designed solution. In some implementations, the process 600 can also include using the stored usage data for one or more sensitivity analyses. In some implementations, the process 600 can also include using the stored usage data to improve the performance of applications and services (e.g., the applications and services 122).

In some implementations, additional operations of the process 600 can include checking one or more credentials of the user prior to performing the one or more manipulations of the D/E data, and determining, based on the one or more credentials, that the user is qualified or authorized to perform the one or more manipulations of the D/E data.

The interconnected digital engineering and certification ecosystem can be implemented with methods and approaches that take a zero trust approach with the users interacting with the system. Moreover, the interconnected digital engineering and certification ecosystem can apply a zero trust approach with the computer networks through which the users interact and extend the zero trust approach methodology to the access and computation of the data related to the individual digital models, tools, or MBSE files used by the users as part of the V&V product purposes.

In some examples, the policies of the security architecture can include model storage policy, model access policy, attribute-based access control, handling of read vs. write queries, traceability and auditability, and a model trust policy, etc. The implementation details are outlined in examples described throughout the specification. For instance, this can include restricting model access to specific API functions, authenticating users and models at endpoints, allowing customers (e.g., model owners or model developers) to set additional access control policies, implementing data restrictions and encryptions, recording endpoint transactions in a secure database, and incorporating digital watermarks for traceability and auditability, etc. The goal of implementing the security architecture is to ensure the right authenticated user has access to the right authenticated model and to assess model truth and user credibility.

Figure 7:
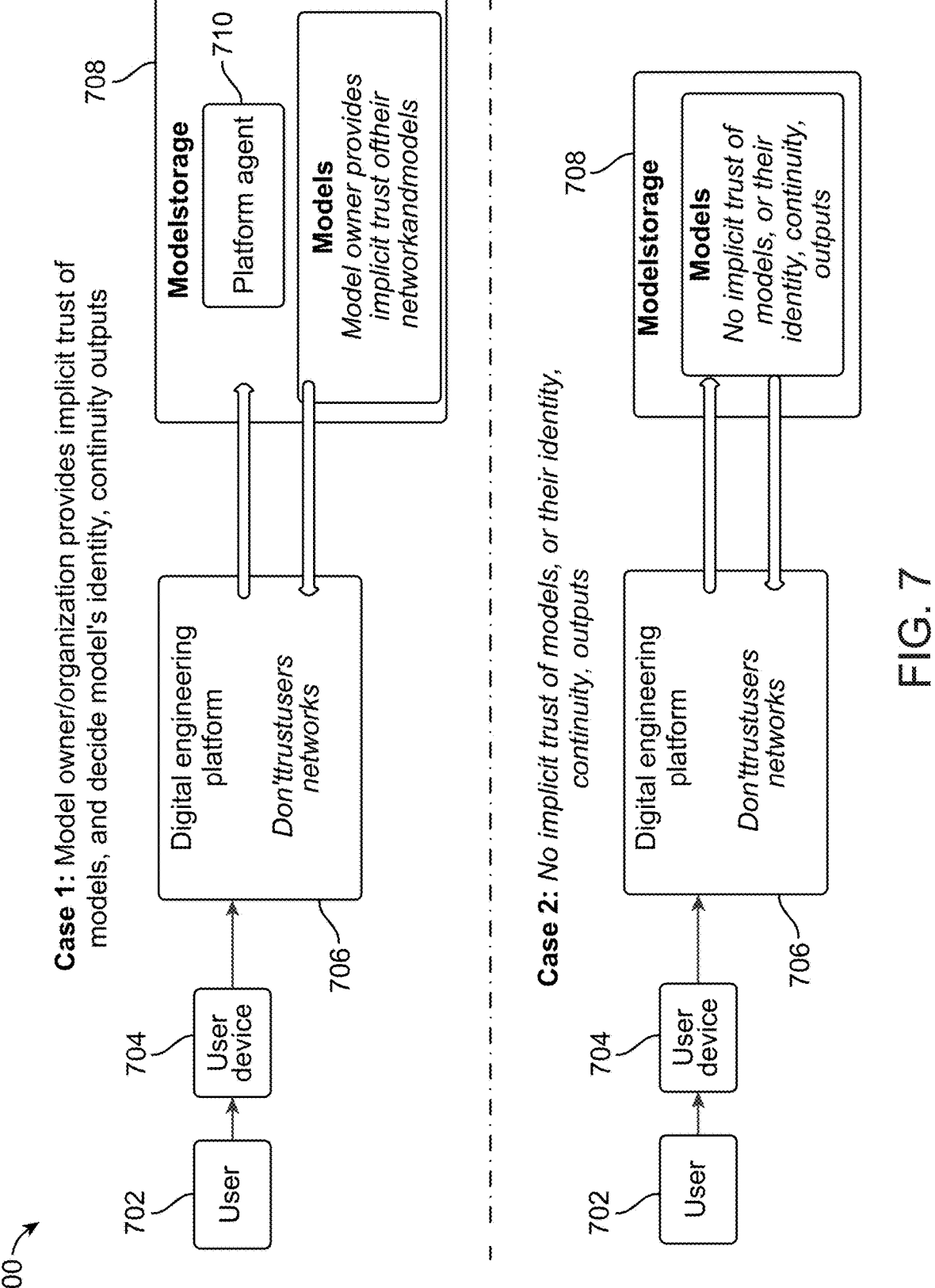
FIG. 7 is a diagram illustrating example embodiments of zero trust where models stay within a customer environment or within a secure storage, unaffiliated to any single customer.

Zero trust for models in the digital engineering and certification ecosystem, as illustrated in FIG. 7, can differ in terms of the location of model storage. In some implementations, models can stay within the customer environment and can be associated with a specific customer. In some implementations, models are stored in a secure, unaffiliated storage separate from any single customer. This allows for a more secure, centralized and more openly accessible storage of models, but also means there are no assurances about the specific model, its location, its current state and prior history, or the accuracy of its performance and outputs.

In some implementations, the digital engineering and certification ecosystem 700 illustrated in FIG. 7 can be employed by the computing system 108. In the digital engineering and certification ecosystem 700, the computing system 108 can enforce model storage policy. Specifically, the model storage policy can ensure digital models, such as digital engineering models, stay within customer environments (e.g., as shown in case 1) or in a secure storage environment (e.g., as shown in case 2) separate from the platform. More specifically, the model storage policy can include private model storage 708 linked to the digital engineering and certification ecosystem 700.

In some implementations, the computing system 108 can enforce a model access policy with various criteria. Specifically, the computing system 108 can restrict access to model data to a specific subset of API functions through a model wrapper. More specifically, the computing system 108 can restrict access to model data by enabling users to be authenticated at endpoints for model wrappers. The user 702 can be authenticated at endpoints 704 (e.g., user devices, using attribute-based access control). These attribute-based access controls can include, for example, username, password, email, and security keys, etc. Moreover, customers (e.g., model owners) or users 702 who seek to access model data can provide additional model access control policies implemented at the endpoint device 704. These control policies can include, for example, read functions and write functions. The model access policy can provide security related to digitally watermarking the models, such as with digitally signed endpoint transactions.

In some implementations, the computing system 108 can enforce a data restrictions policy. With the data restrictions policy, a customer can configure a specific security policy, and implement encryptions and zero-knowledge succinct non-interactive argument of knowledge (zk-snarks), as applicable. The customer can configure the computing system 108 to implement a desired security, encryption, and zk-snarks policy, as desirable for accessing the model data. For no implicit trust of models, the computing system 108 can offer similar configuration policies for its users.

In some implementations, the computing system 108 can enforce a traceability and auditability policy. With the traceability and auditability policy, the computing system 108 can record endpoint transactions in a standard format. In some examples, the recorded endpoint transactions can be stored within a secure database. In some examples, the recorded endpoint transactions can be stored within a private blockchain. In some examples, the recorded endpoint transactions can be stored within both a secure database and a private blockchain. Moreover, the traceability and auditability policy enables the computing system 108 to perform threat detection, perform threat mitigation, and offer threat alerts. These threat level features enable the computing system 108 to offer customers updates should any threats be detected against their models, for example.

Additionally, as mentioned, the models can be digitally watermarked by the computing system 108. The various digital watermarks can include a human visible watermark, such as a Joint Photographic Experts Group (JPEG); a digitally signed hash value; one or more blockchains that store non-fungible tokens (NFTs); and/or GPT-Zero for how files have been modified and/or constructed. Other types of digital watermarks are also possible.

The digital engineering and certification ecosystem 700 illustrates various cases related to model trust. In some implementations, the digital engineering and certification ecosystem 700 illustrates a first case, in which a model owner or model organization provides implicit trust of models and decides a model's identity and continuity outputs. In the first case, a user 702 (e.g., a third party user) can interact with a user device 704 to access their respective model data from the digital engineering platform 706. The digital engineering platform 706 may not trust users' networks. Upon receiving the request, the digital engineering platform 706 can access the model storage 708 and access the respective models.

To access the respective models, the owners can provide implicit trust for models. The implicit trust for the models can be used within a customer environment and offer continuity outputs. The owners of the models (i.e., "model owners") can own the ground truth for models. The model owners can perform transactions on the models, such as performing transactions that are read queries that comply with the model owner's access restrictions for data and functions. Moreover, the model owners can perform transactions on the models that include writing to a model. The digital engineering platform 706 can receive the transaction and perform the requested transaction. For example, when a write transaction is performed, the digital engineering platform 706 can instruct the platform agent 710 to create a copy or fork of the model within the customer environment and apply the written transaction to the forked copy. The model owner can then decide whether to accept the edits made to the forked copy or reject the forked copy. Moreover, in the accord, the model owner can decide which models are valid and choose specific tools to validate the model itself.

In some implementations, the digital engineering and certification ecosystem 700 illustrates a second case in which there is no implicit trust of models, their identity, and continuity outputs. Similar to the first case, a user 702 (e.g., a third party user) can interact with a user device 704 to access their respective model data from the digital engineering platform 706. The digital engineering platform 706 may not trust users' networks. Upon receiving the request, the digital engineering platform 706 can access the model storage 708 and access the respective models. However, the model storage 708 may not include implicit trust of models or their identity and continuity outputs.

In the second case, the model storage 708 with no implicit trust stores models in secure storage. Specifically, the model storage 708 can store multiple secure model identifiers. The multiple secure model identifiers can include model identifiers and pointers to model addresses in a secure storage. In some examples, the model ID and pointers to model addresses can be stored in individual elements of a blockchain, and/or tokenized and stored in the individual elements of the blockchain. In this manner, should an unauthorized user gain access to the model storage with no implicit trust, the unauthorized user would not have access to the model data because of its storage in a separate and secure area. For continuity, the digital engineering platform 706 can approve endpoint transactions after the prior history of a model's V&V transactions are verified. In this manner, the digital engineering platform 706 can ensure that a subsequent transaction, such as a write function which may change the model, does not break a previously validated model state.

In some implementations, the model's transaction history can be stored within various databases. In some examples, the model's transaction history can be stored in a secure database of edit history with the associated cryptographic hashes. In some examples, the model's transaction history can be stored in a tokenized manner in a private transaction blockchain.

For enforcing the accord aspect, the digital engineering platform can seek consensus among a distributed set of models or DE tools for validation. Consensus mechanisms can enable a group of nodes, which include different digital engineering (DE) tools to evaluate or verify a specific digital model or multiple models within open-access storage, to agree on the output from the specific model. The consensus mechanisms may include PoS or POR approaches, and ensure that all nodes in a network of open-access storage digital engineering models have the same view of the specific model's data, even in the presence of faulty or malicious nodes. The DE tools in different nodes may perform similar verification or evaluation operations on the specific model. In a zero trust policy for models, there is zero trust for these DE tools as well. No single DE tool's evaluation is relied upon and the consensus across a range of nodes with different DE tools' evaluations is instead used to seek accord. Other implementations of consensus mechanisms can ensure the models known to the network are the same, verified, and known sets able to be queried and updated. A different consensus mechanism may use an additional layer of verification and validation in the digital engineering sense to act as another voting metric within the system. In such a consensus approach, models must pass requirement thresholds specified in documentation or other metrics to meet. Once those are achieved in simulation space, models are assigned a score or weight, providing them a voting weight. In other implementations, the accord output for a model can also be managed as an entry in the model transaction database or as a fungible token within a transaction of a blockchain. Other examples are also possible.

In order to ensure the secure sharing of models in a digital engineering platform, the system for secure model sharing should meet audit and assurance requirements. In some examples, the digital engineering platform 706 can perform traceability by tracing any specific change to the system or specific model, such as changes performed by a model owner or other users. In some examples, the digital engineering platform 706 can perform monitoring and prevention functions. These functions can include maintaining an always-alert security posture for the system, such as detecting attacks, thwarting attacks, detecting threats, and providing alerts to users indicative of threats and/or attacks. Moreover, the digital engineering platform seeks to comply with NIST 800-171 and NIST 800-53.

In some implementations, the digital engineering platform 706 can share models and access to models with users who authenticate with the platform. In some cases, a user 702 can authenticate with the digital engineering platform 706 by providing their respective credentials (i.e., username and password). The digital engineering platform 706 can authenticate the user 702 upon determining their provided credentials match to stored credentials. In response to authenticating the user 702, the digital engineering platform 706 can provide the authenticated user 702 with access to the integrated development environment (IDE) that stores the various models. The IDE may store one model, thousands of models, or more. In some examples, the user 702 can access a particular model as a whole file. These models can include, for example, M&S tools, CAD tools, MBSE tools, AR tools, PLM tools, simulation engines, requirements models, electronics models, test-plan models, cost-models, schedule models, software modeling, supply-chain models, manufacturing models, cyber security models, multi-attribute trade-space tools, and mission effects models. Other models to be accessed are also available. In some implementations, each of the digital models can include one or more digital artifacts that can be accessed and/or operated upon by an authenticated user.

In some implementations, the digital engineering platform 706 can provide an authenticated user 702 access to multiple IDEs. In some examples, an IDE can be associated with a particular theme. A first IDE can include models related to finance, a second IDE can include models related to manufacturing, and so on, to name some examples. The digital engineering platform can provide the authenticated user 702 with access to one IDE, a subset of IDEs, or all of the IDEs, according to designated criteria. Specifically, the digital engineering platform 706 can provide the authenticated user with access to one or more IDEs based on their desired use.

In some implementations, the digital engineering platform 706 can provide an authenticated user 702 with access to a subset of functionalities of the models within the IDEs. For example, the digital engineering platform 706 can provide the authenticated user 702 with restricted or limited access to a limited functionality (e.g., "a slice") of the models in various IDEs or limited APIs using a wrapper of a specific model or multiple models. For example, the digital engineering platform 706 can enable the user 702 to access a first functionality or first slice of a model in a first IDE, a second functionality or second slice of a model in a second IDE, and a third functionality or third slice of a model in a third IDE. In this example, the digital engineering platform 706 can restrict the user's access to other functionalities in each of the models of the first IDE, the second IDE, and the third IDE. In some examples, the digital engineering platform 706 can enable the authenticated user 702 with access to subsets of slices in various IDEs. In this manner, the authenticated user 702 only has access to the slices afforded by the digital engineering platform in each of the various IDEs. As such, the digital engineering platform 706 can enable the authenticated user 702 to have access to any combination of slices in each of the multiple IDEs.

Figure 8:
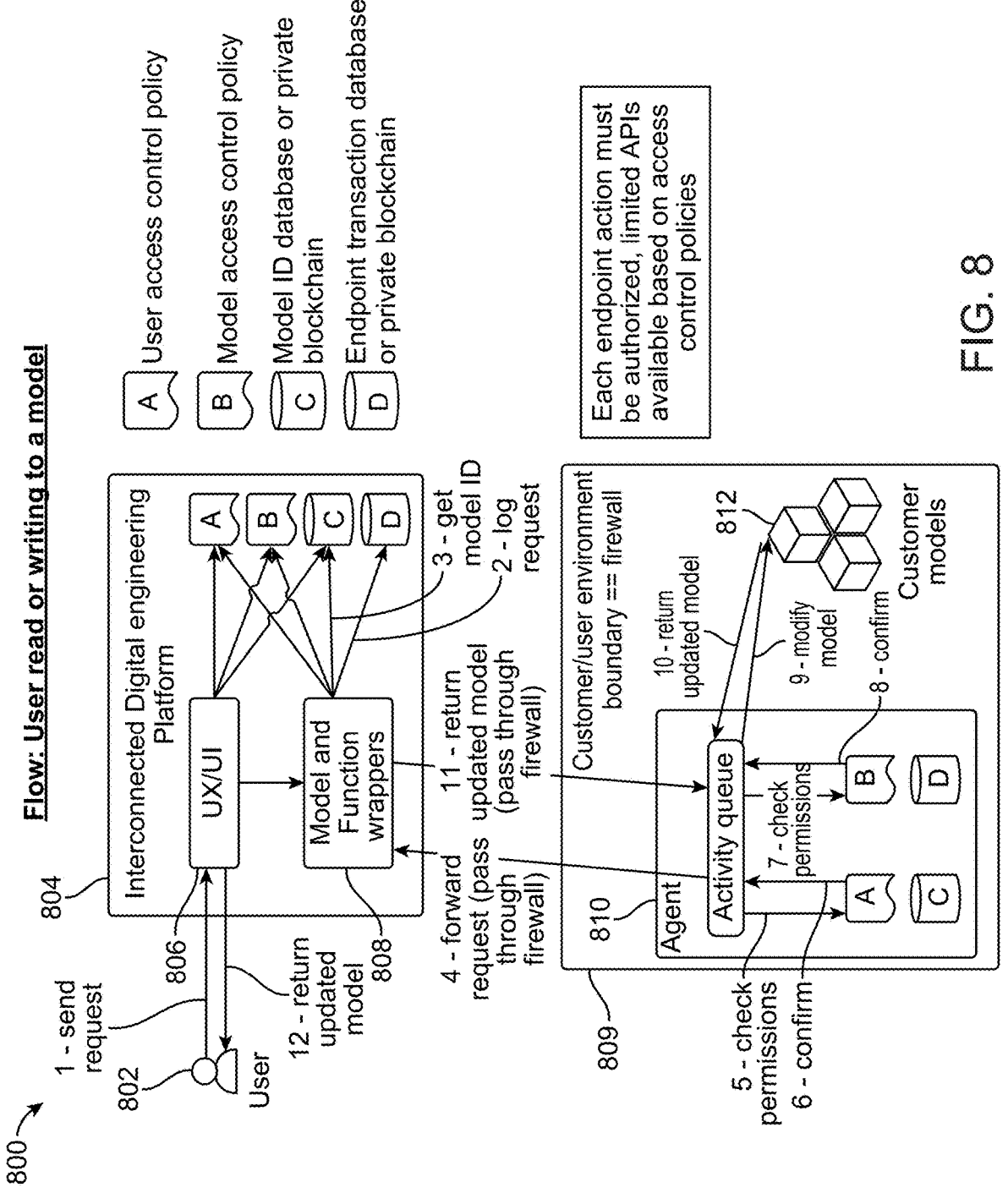
FIG. 8 is a diagram illustrating the sequence of actions to request access to a digital model within a customer's secure computing environment.

The various implementations of the computing environment illustrated in FIG. 8 differ in the location of the computing environment relative to the customer's computing environment 809. In some implementations, the computing environment can be separate from the customer's computing environment 809. In some implementations, an agent 810 of the customer's computing environment 809 can be instanced behind the customer's firewall. This can allow for more secure access and faster overall computations to the digital models 812 within the customer's computing environment 809, as the agent 810 can operate within the customer's firewall and access controls. However, having the computing environment separate from the customer's computing environment 809 can allow for more scalability and flexibility in accessing the digital models.

In some implementations, the digital engineering and certification ecosystem 800 of FIG. 8 illustrates a user 802 interacting with an interconnected digital engineering platform 804. The interconnected digital engineering platform 804 can communicate with a customer's computing environment 809 behind a firewall. Particularly, companies may safeguard their networks and limit the information they share outside their network by way of a firewall. This particular feature of limiting access to a company network can be extended to include the feature of model sharing.

When networks are not trusted, model linked information can be effectively shared across networks behind a firewall, for example. In some implementations, the models 812 can remain stored within customer companies' networks 809 and not be extracted from those networks. The model owners can own and maintain the ground truth of their models without removing models from behind the firewall, for example. Similarly, another benefit of the digital engineering and certification ecosystem 800 is that model wrappers 808 can link to a specific subset of functionality or a slice of the models within the company's own network. In this manner, an authenticated user 802 seeking access to a slice can receive output from the API or the slice of the models from behind the company's network, without the model leaving the company's network. Moreover, the model owners can define permissions for slices of their models.

As illustrated in the digital engineering and certification ecosystem 800, a user 802 can send a request to the interconnected digital engineering platform 804. The user experience (UX) or user interface (UI) component 806 can receive the request and log the request. Specifically, the UX/UI component 806 can log the request in an endpoint transaction database or a private blockchain. The endpoint transaction data or the private blockchain may be located within the interconnected digital engineering platform 804 or external to the interconnected digital engineering platform 804, such as in a cloud network. Following the log of the request, the model and function wrappers 808 can communicate with the UX/UI component 806 to analyze which model the request is seeking by extracting data indicative of the model from the request. The model and function wrappers 808 can access a model ID from a model ID database or private blockchain using the extracted data indicative of the model from the request. The model ID database or private blockchain can store data that includes multiple model IDs, a location of the model, and other data that indexes the model IDS with the location of the model, to name some examples. The private blockchain that stores the data that includes the multiple model IDS and other information can be separate from the private blockchain that stores the log of the request from the user. In some examples, the private blockchains may be similar.

In response to receiving the model ID from the model ID database or private blockchain, the model and function wrappers 808 can transmit a forward request through a firewall or other network component to the customer's environment network 809. The customer's environment network 809 can include an agent 810 that monitors activity requests. The agent 810 can receive the forward request from the model and function wrappers 808 of the interconnected digital engineering platform 804 and verify the request's permission, indicating that it can access the data of the models within the customer's environment network 809. The agent 810 can verify the request's permissions with a database that stores user access control policy information. Verifying the request's permissions includes verifying the user is allowed access to the data stored in the one or more models 812 of the customer's environment network 809. If denied access, the agent 810 can provide a denial to the model and function wrappers 808. If allowed access, the agent 810 can verify the request's permissions with a database that stores model access control policy. If denied access, the agent 810 can provide a denial to the model and function wrappers.

If allowed access, the agent 810 can perform an action on the one or more customer models 812 within the customer's environment network 809. In some implementations, the action can include a read action, a write action, or some other type of action. In response to performing the action, the agent 810 can return an updated model or data indicative of an updated model through the firewall and to the model and function wrappers 808 of the interconnected digital engineering platform 804. In response, the model and function wrappers 808 can provide the data indicative of the updated model to the UX/UI component 806, and subsequently provide the same data to the user 802 via their endpoint device or user device. Other examples are also possible.

In some implementations, the digital engineering and certification ecosystem 800 ensures the models stay within the customer environment (model implicit trust) or in a secure stage (no model implicit trust). Specifically, the digital engineering and certification ecosystem 800 offers various data security protections. Specifically, the digital engineering and certification ecosystem 800 can track and authorize user access at endpoints or user devices. The tracking and authorization can be performed with attribute based access control (ABAC). For example, the interconnected digital engineering platform 804 can track and authenticate user profiles and enable access restrictions, which can be implemented by a central policy server stored at the interconnected digital engineering platform or external to the platform. In some examples, the central policy server can be updated by an endpoint transaction database or a private blockchain, to name a few examples.

In some implementations, the interconnected digital engineering platform 804 can record transactions at endpoints. Specifically, the interconnected digital engineering platform 804 can standardize transaction records at the endpoint. Moreover, the platform 804 can store various information or metadata related to the transaction records such as model owner organization, model owner ID, user ID, access rights of user, device ID, device location according to IP number and geographic location identifiers, an ID for the model and function wrappers, transaction commands related to the model and function wrappers calls, a time associated with each transaction command, and a value associated with the transaction. Other examples can include a function ID; a type of method to be called; a start time of transaction; an end time of transaction; a duration; the parameters of the call made by the model and function wrappers; the success of the call (e.g., either "TRUE" or "FALSE"); CPU cost time in money, time, and cycles; and GPU cost time in money, time, and cycles. Other examples are also possible.

In some implementations, the interconnected digital engineering platform 804 can store transaction history using cryptographic hashing. Specifically, the interconnected digital engineering platform 804 can tokenize the prior transactions and store the tokenized prior transactions on a private blockchain or an external private blockchain on a cloud network. In this manner, the interconnected digital engineering platform 804 can securely track and analyze end transactions from users who interact with the interconnected digital engineering platform 804 over time.

In some implementations, a user 802 can access the interconnected digital engineering platform 804 through their end device. Specifically, a user 802 can access the platform via their end device connecting the platform's user experience. Once connected, the user 802 can transmit the request to access a model, multiple models, or a particular slice of the model. As mentioned, the interconnected digital engineering platform 804 can record the access request in the endpoint transaction database or a private blockchain via the model and function wrappers 808 or an API. Moreover, the interconnected digital engineering platform 804 can fetch the model information (e.g., a model ID and other data)

from the model ID database or private blockchain via the API. Then, the model and function wrappers 808 can forward the access request to the agent in the model owner's environment or customer owner's environment 809. The customer owner's environment 809 may be positioned behind one or more firewalls.

The firewall can either accept or deny the access request provided by the model and function wrappers 808. If the firewall accepts the access request, the request is forward to the agent 810 of the customer owner's environment 809. The agent 810 can verify the access request permissions with the user access policy server and the model access control policy. In response, the agent 810 can return the requested model to the interconnected digital engineering platform 804 via the model and function wrappers 808. If applicable, the firewall may either accept or deny the agent's access to provide the requested model. If accepted, the firewall can provide the requested model or data indicative of the requested model to the model and function wrappers 808. In response, the model and function wrappers 808 can display a model wrapper to the user 802 via their end device.

Figure 9:
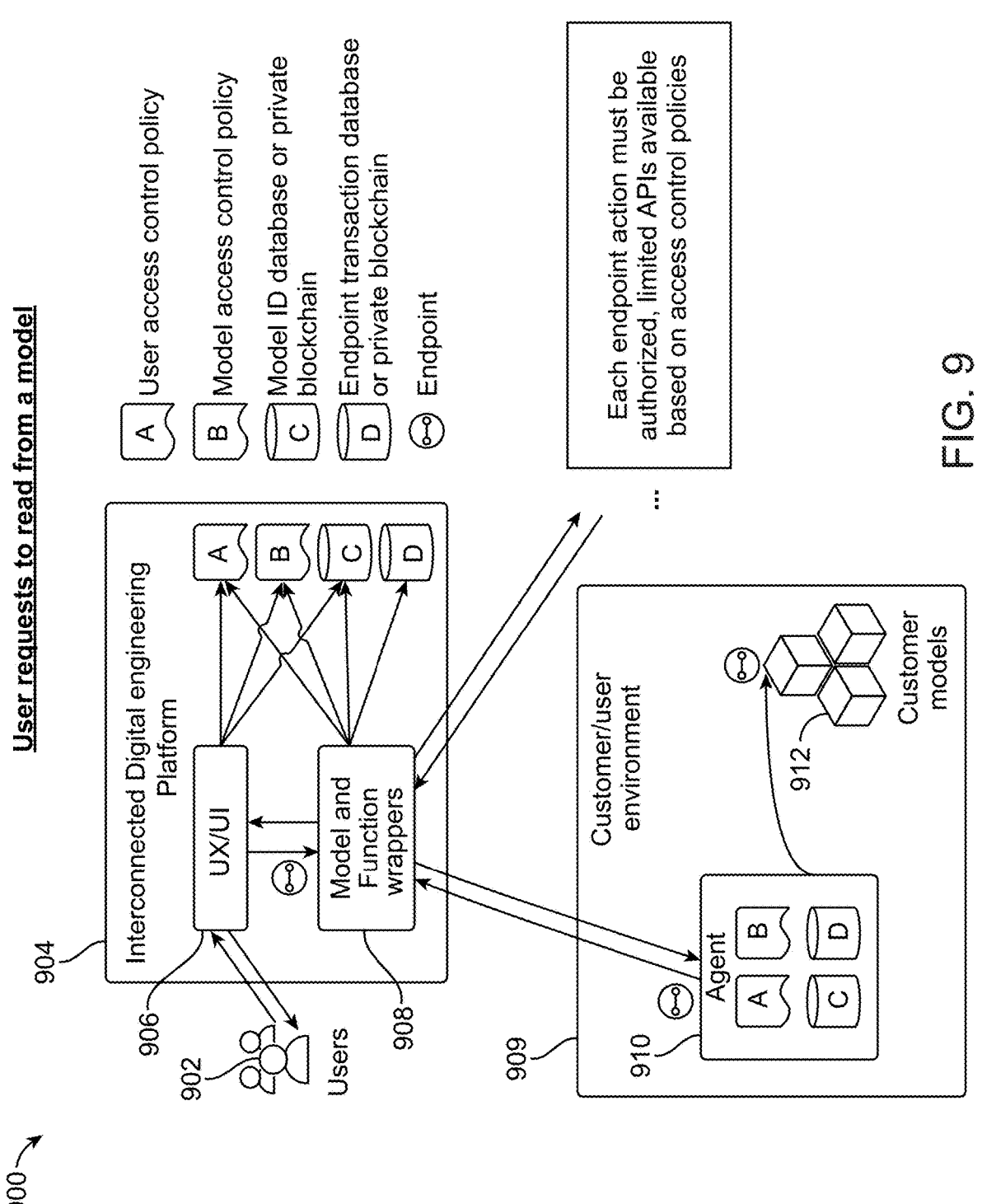

FIG. 9 illustrates the digital engineering and certification ecosystem 900 where a read operation is performed. FIG. 10 illustrates the digital engineering and certification ecosystem 1000 where a write operation is performed. Generally, the difference between the read and write query implementations can be viewed in their ability to alter the state of the model. For example, read queries do not alter the model. Write queries, on the other hand, can alter the model. To ensure the security of the model, the implementation for write queries can involve creating a copy of the model and allowing for open access, while read queries are parsed through wrappers and authorized at the endpoint. The output data from both queries can be sent in full, redacted, using zero-knowledge approaches, or with digital watermarks. These security implementation methods aim to balance the needs for access to the model with the need to protect the model's state and data. FIG. 9 can include similar components to those illustrated in other figures described in this specification.

In the digital engineering and certification ecosystem 900 where the read operation is performed, the read operation can link to models within the customer environment. In some implementations, a user 902 can access the interconnected digital engineering platform 904 through their end device. Specifically, a user 902 can access the platform 904 via their end device connecting the platform's user experience. Once connected, the user 902 can transmit the request to access a model, multiple models, or a particular slice of the model. As mentioned, the interconnected digital engineering platform 904 can record the access request in the endpoint transaction database or a private blockchain via the model and function wrappers 908 or an API. Moreover, the interconnected digital engineering platform 904 can fetch the model information (e.g., a model ID and other data) from the model ID database or private blockchain via the API. Then, the model and function wrappers 908 can forward the access request to the agent 910 in the model owner's environment or customer owner's environment 909, to access one or more stored models 912 in the customer owner's environment 909. The customer owner's environment 909 may be positioned behind one or more firewalls.

The firewall can either accept or deny the access request provided by the model and function wrappers 908. If the firewall accepts the access request, the request is forward to the agent 910 of the customer owner's environment 909. The agent 910 can verify the access request permissions with the user access policy server and the model access control policy, and retrieve data from the requested model 912. In response, the agent 910 can return the requested model or data indicative of the requested model to the interconnected digital engineering platform 904 via the model and function wrappers 908. If applicable, the firewall may either accept or deny the agent's access to provide the requested model. If accepted, the firewall can provide the requested model or data indicative of the requested model to the model and function wrappers 908. In response, the model and function wrappers 908 can display a model wrapper to the user 902 via their end device.

As illustrated in FIG. 10, in the digital engineering and certification ecosystem 1000 where the write operation is performed, the write operation is performed by creating copies or forking copies without changing the source material of the model. The process performed for the write operation in the digital engineering and certification ecosystem 1000 is similar to the process performed for the read operation, but with various differences. In some implementations, a user 1002 can access the interconnected digital engineering platform 1004 through their end device. Specifically, a user 1002 can access the platform 1004 via their end device connecting to the platform's user experience (e.g., the UX/UI component 1006). Once connected, the user 1002 can transmit the request to access a model, multiple models, or a particular slice of the model. As mentioned, the interconnected digital engineering platform 1004 can record the access request in the endpoint transaction database or a private blockchain via the model and function wrappers 1008 or an API. Moreover, the interconnected digital engineering platform 1004 can fetch the model information (e.g., a model ID and other data) from the model ID database or private blockchain via the API. Then, the model and function wrappers 1008 can forward the access request to the agent 1010 in the model owner's environment or customer owner's environment 1009. The customer owner's environment 1009 may be positioned behind one or more firewalls.

The firewall can either accept or deny the access request provided by the model and function wrappers 1008. If the firewall accepts the access request, the request is forwarded to the agent 1010 of the customer owner's environment 1009. The agent 1010 can verify the access request permissions with the user access policy server and the model access control policy. In response, the agent 1010 can create a fork of the request model and apply changes (e.g., modifications) to the forked model 1014 according to the request. In some examples, creating a fork of the requested model can include creating one or more copies of the model and creating copies of the model of varying formats. The forked model 1014 can be a copy of the model 1012 stored in the customer owner's environment 1009. At this point, the model owner can review changes made to the forked model 1014 and determine whether to accept or reject the changes made to the forked model 1014. If the model owner accepts the changes, the stored model 1012 can be updated. If the model owner rejects the changes, no changes are performed on the stored model 1012, which ultimately preserves the integrity of the stored model 1012.

In response, the agent 1010 can return the model updates to the interconnected digital engineering platform 1004 via the model and function wrappers 1008. If applicable, the firewall may either accept or deny the agent's access to provide the model updates. If accepted, the firewall can provide the model updates or data indicative of the model updates to the model and function wrappers 1008. In response, the model and function wrappers, 1008 can display an updated model wrapper to the user 1002 via their end device.

In some implementations, the digital engineering and certification ecosystem 1000 illustrates various processes for creating forks from original digital models, which are then subject to approval or rejection by the model owner. In some implementations, the digital engineering and certification ecosystem 1000 provides a permissions-based approach for managing access and modifications within Digital Engineering (DE) models, focusing on the roles of read, write, and ownership. By utilizing a permission model, the owner can generate specific forks and invite designated collaborators on the front end, who have pre-assigned permissions to read, write, or own the fork, to participate in the development process.

In some implementations, by incorporating a permission's model in the digital engineering and certification ecosystem 1000, the ecosystem facilitates the production of "redacted" versions of models. With the redacted versions of a model, the owner creates a derivative model that contains selected data points. Here, collaborators are granted roles-read, write, or owner—to establish a structured, governed environment for data handling. Writers of the digital engineering model are authorized to amend the model, promoting a collaborative and regulated modification process with attribute-based access control. Nonetheless, incorporating modification from model 2 into the original model is at the sole discretion of the model owner, which is a critical step for preserving the primary model's integrity and reliance. As a result, the digital engineering and certification ecosystem 1000 includes model merging through both manual intervention by authorized users or through implementation of a set of rule based scripts.

In some implementations, the design and intended functionality of the permissions model system is incorporated into the interconnected digital engineering platform 1004. This implementation is designed to safeguard the digital model's integrity and security prior to performing write operations. The conceptual design allows for manual or external integration of updates from the secondary model into the original, offering flexibility for adaptation and future improvements. Accordingly, by incorporating the permissions based model, the digital engineering and certification ecosystem 1000 aims to enhance controlled, collaborative management and evolution of digital models.

In some implementations, the storage of the models 1012 can further advance the data security policy. Specifically, the model storage 1012 can include a public database or a private database linked to the interconnected digital engineering platform. The data security policy can advance various policies. These policies can include model identity, model continuity, and model accord. Model identity can include the identity of the model, such as a model identifier. The model identifier can be stored within a secure database, such as using cryptographic hashing or tokenized on a blockchain network. The blockchain network can store a model identifier or a pointer to an address that stores addresses to various models. The model continuity can relate to tracking and analyzing endpoint transactions or standardized endpoint transaction metadata for continuity. The tracking and analyzing of endpoint transactions can be stored with cryptographic hashing or by tokenizing the transaction record on a private blockchain. Additionally, new transactions may be confirmed and added to the private blockchain if the prior track record of V&V is not broken. Lastly, the model accord can include analyzing models with multiple DE tools and utilizing the ZK-snarks accord.

Figure 12:
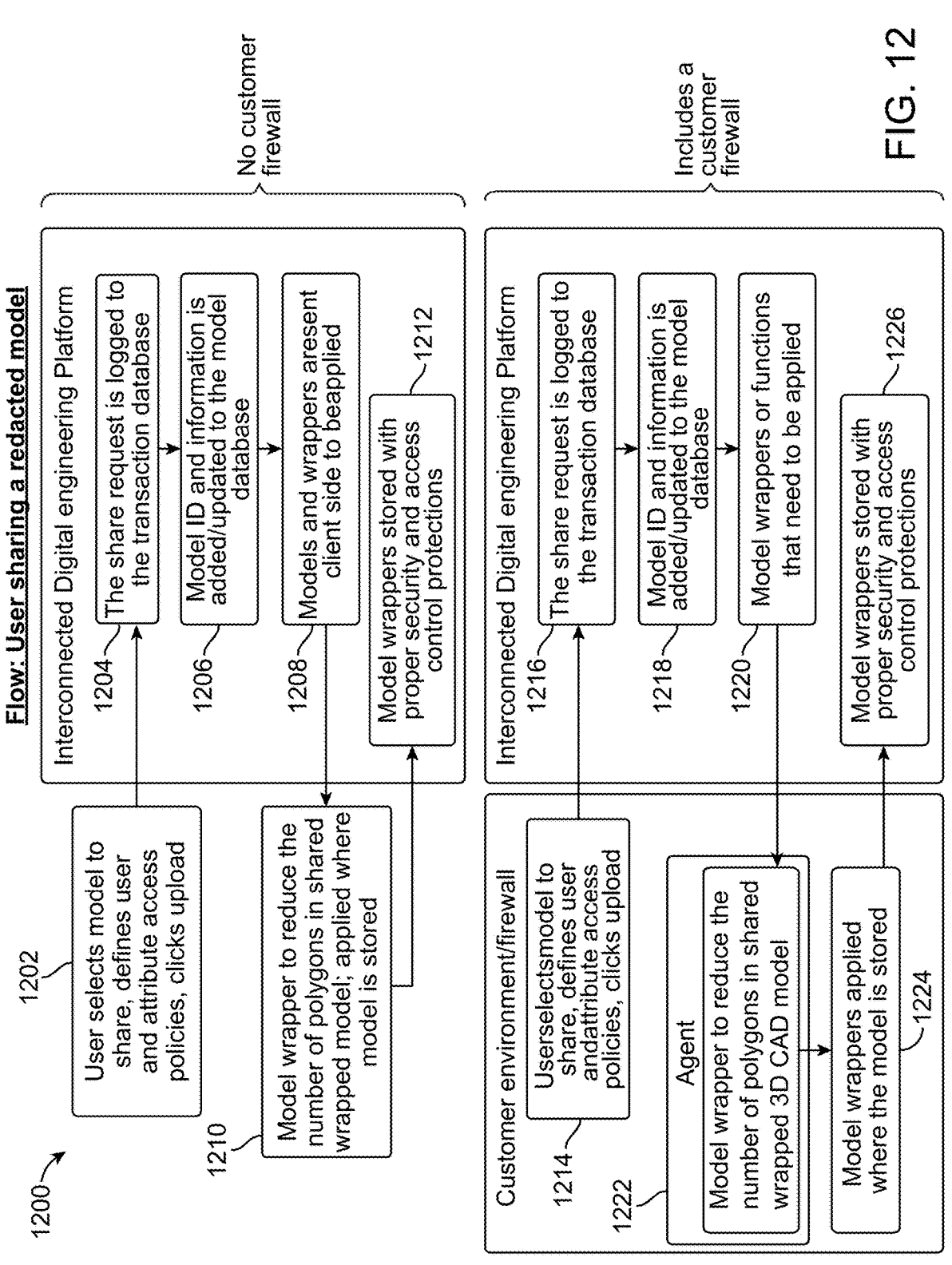

The differences between the security implementations for sharing a digital model and sharing a redacted part of a digital model, as shown in FIGS. 11 and 12, are in the amount of data being shared. In the first implementation, as shown in FIG. 11, the entire digital model is shared. In the second implementation, as shown FIG. 12, only a redacted portion of the model is shared (i.e., a subset of the model attributes). Both implementations involve authentication of the user and the endpoint, parsing the request through wrappers, and authorizing the request at the endpoint. The output data can further be digitally watermarked for traceability. The choice between sharing the entire model or only a redacted portion can depend on the specific security and privacy needs of the data being used by the model, as well as the user's level of access and their intended authorized use for the data requested from the model.

FIG. 11 illustrates different implementations for sharing a model in the digital engineering and certification ecosystem 1100. The first implementation illustrates model sharing without a customer firewall. The second implementation illustrates model sharing with the customer firewall. In the first implementation, initially, the user can select a model to share, define user and attribute access policies related to the model to share, and upload the model to the interconnected digital engineering platform (1102). The interconnected digital engineering platform can log the received share request to the transaction database (1104). In response, the interconnected digital engineering platform can add and/or update the model ID and information associated with the model to the database (1106). Afterwards, the interconnected digital engineering platform can send the models and wrappers to the client device to be applied (1108). The client device can apply the model wrappers where the model is stored, at the discretion of the user (1110). In some examples, cloud-based security techniques can be unlocked by enabling model wrapping or model splicing at the edge device. When models or model-like files are maintained at the edge device, such as a client device, these models or model like files can be viewed and/or modified through the model splicing in a secure manner on the edge device. In response, the interconnected digital engineering platform can store the model wrappers with the proper security and access control protections (1112). In some implementations, if the digital engineering and certification ecosystem 1100 includes the use of a permission model, the user can be granted access or denied access to one or more digital engineering models at this stage.

In the second implementation, the user can select a model to share, define user and attribute access policies related to the model to share, and upload the model to the interconnected digital engineering platform (1114). In some cases, if the interconnected digital engineering platform includes a permissions model, the permissions model can authorize the user's access at this stage before the user is able to select a model to share, define user and attribute access policies related to the model to share, and upload the model to the interconnected digital engineering platform. The interconnected digital engineering platform can log the received share request to the transaction database (1116). In response, the interconnected digital engineering platform can add and/or update the model ID and information associated with the model to the database (1118). Afterwards, the interconnected digital engineering platform can send the models and wrappers to a digital engineering agent behind the firewall of the customer environment to be applied (1120). The digital engineering agent can apply the model wrappers and functions (1122). Outside the digital engineering agent, the customer environment can apply the model wrappers and functions where the model is stored, such as a particular IDE (1124). In response, the interconnected digital engineering platform can receive the model wrappers through the firewall and store the model wrappers with the proper security and access control protections (1126).

FIG. 12 illustrates different implementations for sharing a redacted model in the digital engineering and certification ecosystem 1200. The first implementation illustrates redacted model sharing without a customer firewall. The second implementation illustrates redacted model sharing with the customer firewall. The first implementation of the digital engineering and certification ecosystem 1200 (1202 through 1212) is similar to the first implementation of the digital engineering and certification ecosystem 1100 (1102 through 1112). Likewise, the second implementation of the digital engineering and certification ecosystem 1200 (1214-1226) is similar to the second implementation of the digital engineering and certification ecosystem 1100 (1114-1126).

However, the first implementation of the ecosystem 1200 differs from the first implementation of the ecosystem 1100 at the client side. Specifically, the client can utilize the model wrapper to reduce the number of polygons in the shared wrapper model and apply the reduced or redacted shared model where the original model is stored (1210). Then, the interconnected digital engineering platform can receive the model wrappers and store the model wrappers with the proper security and access control protections (1212). Similarly, the second implementation of the ecosystem 1200 differs from the second implementation of the ecosystem 1100 at the customer environment behind the firewall. Specifically, the digital engineering agent can apply the model wrappers and functions to reduce the number of polygons in the shared wrapped model, creating a reduced shared model (1222). Outside the digital engineering agent, the customer environment can apply the model wrappers and functions where the model is stored, such as a particular IDE (1224). In response, the interconnected digital engineering platform can receive the model wrappers through the firewall and store the model wrappers with the proper security and access control protections (1226).

In some examples, reducing the number of polygons can include reducing a polygon count on a polygonal mesh representation of a CAD model. Reducing the polygon count on the polygonal mesh representation of the CAD model can blur or obfuscate the CAD model or having a sparse mesh model or a dense mesh model. In some implementations, the digital agent and/or interconnected digital engineering platform can perform various methods of redaction. For example, one method of redaction can include reducing the polygons in mesh representations that have a certain attribute type, such as geometry or material properties, or allowing access to specific model attributes. These redaction controls can be nested and configured by a model owner. For example, the redaction controls can be wrapped to only include properties, and the owner can specify that the shine property be not revealed.

Figure 14:
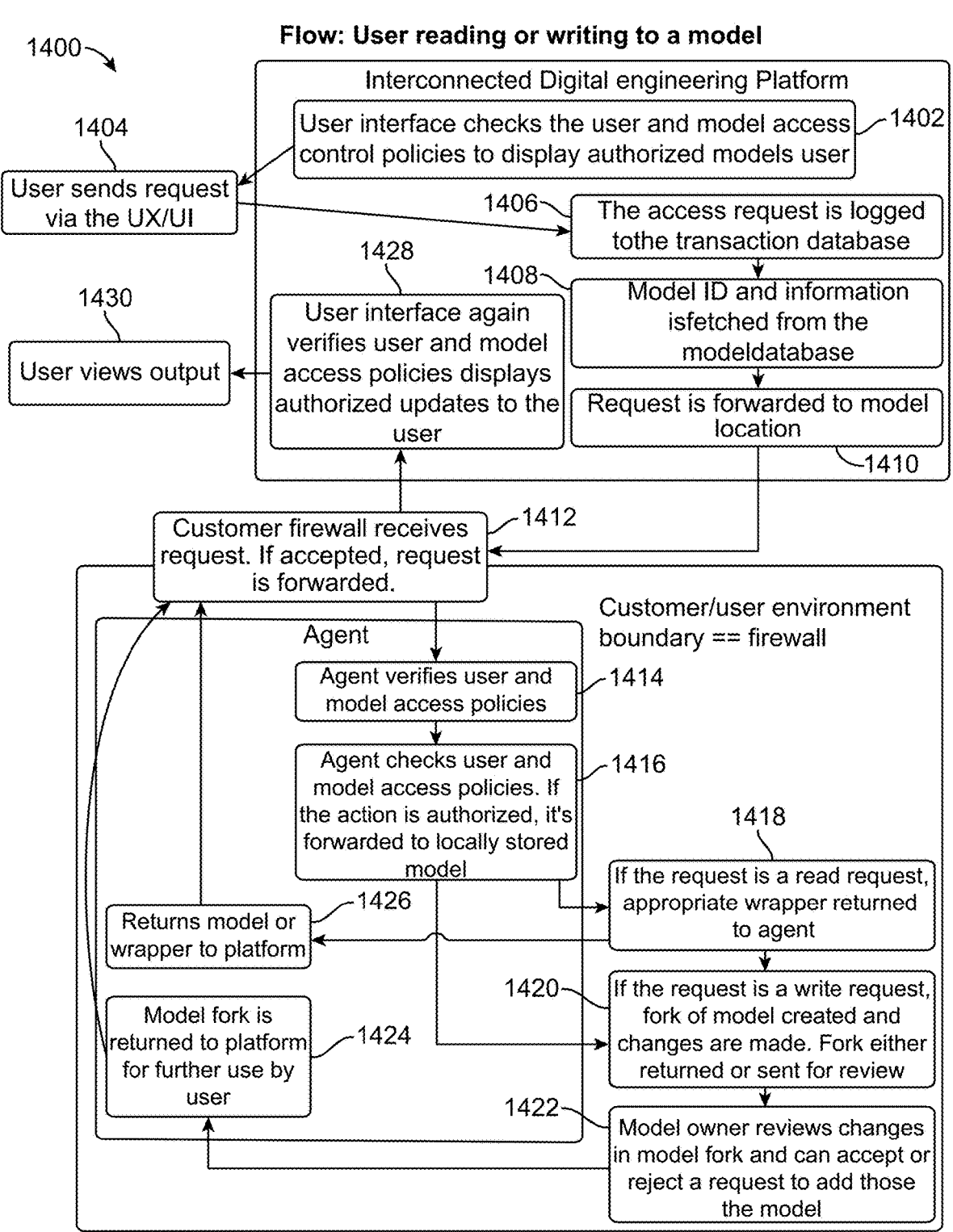

The differences between the two implementations shown in FIGS. 13 and 14 are in the visual representation of the digital engineering ecosystem's components and the user's computing environment. Both flow charts show the sequence of processes involved when a user interacts with a digital model, but the visual representation of these components and environments differ in each implementation. This difference in representation provides additional clarity on the relationship between the components and the user's computing environment in the overall zero trust security of models. These flow charts can be viewed in conjunction with FIG. 8 for a full understanding of the various elements involved in the security implementation.

The processes illustrated in FIGS. 13 and 14 can be performed by a digital computing system such as the digital computing system 108, an interconnected digital engineering platform, a customer firewall, a digital engineering agent, one or more customer models stored in a customer environment, and other components described throughout the specification. FIG. 13 illustrates processes 1300 related to a user reading and writing to a model. FIG. 14 illustrates another implementation of processes 1400 related to a user reading and writing to a model.

In some implementations, the digital computing system 108 that performs the process related to FIG. 13 may provide permissions enforcement. The permissions enforcement can be performed by the permissions model described with respect to FIG. 10.

In process 1300, the interconnected digital engineering platform can provide a user interface to an end device of a user. The user interface can check the user and model access control policies to display authorized models to the user (1302). The user interface can receive interactions from the user and provide data indicative of the interactions to the interconnected digital engineering platform (1304). For example, the user interface can receive user requests to access one or more models. In response, the user interface can provide the user requests to the interconnected digital engineering platform. The interconnected digital engineering platform can log the user request or access request to a transaction database (1306).

In some implementations, the interconnected digital engineering platform can fetch a model identifier and model information from a model database (1308). Specifically, the interconnected digital engineering platform can extract data indicating the type of model being requested and can fetch the model identifier and model information using the extracted data indicating the type of model being requested from the model database as an index, for example. In response to retrieving the model identifier and the model information from the model database, the interconnected digital engineering platform can forward the user request with the model identifier and the model information to the location of the model (1310).

As illustrated in FIG. 13, the interconnected digital engineering platform can forward or transmit the user request with the model identifier and the model information to the location of the model, which may be behind a company or customer firewall, an API gateway, a messaging service, a network blocking function, or another type of network system that reviews accepting or declining network traffic. The company or customer firewall can receive the forwarded request from the interconnected digital engineering platform (1312). The firewall can decide whether to accept the forwarded request and forward the request to a digital engineering agent behind the firewall or reject the forward request. When the firewall accepts the forwarded request, the agent receives the forwarded request and verifies the request against user and model access policies (1314). For example, the agent can verify the permissions of the user request against the user access control policy and against the model access control policy. If the agent verifies that the user request is authorized, then the agent can forward the received quest to the locally stored model (1316). If the agent determines the user request is not authorized against one or more of the user access control policies or model access control policies, then the agent can discard or reject the user request.

In some implementations, the agent can determine a type of the user request if the user request verifies against the user access control policy and the model access control policy. For example, the agent can determine that the user request is a read request or a write request. If the agent determines the user request is a read request, then the agent can access an appropriate wrapper or API for the requested model (1318). Alternatively, if the agent determines the user request is a write request, the agent can fork or create a copy of the requested model (1320). The agent can apply the requested written changes to the forked or copy of the requested model, so the stored model preserves its data. In response to the written changes being applied to the forked copy, the agent can return the forked copy to the model owner (1322). The model owner can review the changes in the forked copy and decide whether to accept or reject the changes. If the model owner decides to accept the changes, then the changes of the forked copy can be applied to the stored model. If the model owner decides to reject the changes, then the agent can discard the forked copy.

In some implementations, the agent can perform the aforementioned actions on each of the stored customer models. In some cases, the agent can perform the read or write actions on each of the stored customer models in the customer environment. In some cases, the agent can perform the read or write actions on each of the stored customer models outside of the customer environment.

In response to performing the read action, write action, or both, the agent can return the model to the customer firewall. Specifically, after the agent performs a read operation, the agent can return the model or wrapper of the model to the interconnected digital engineering platform through the customer firewall (1324). Similarly, after the agent performs a write operation, the agent can return the forked model or copy of the model with the written edits applied to the interconnected digital engineering platform through the customer firewall (1326). If both operations are requested for in the user request, then the agent can provide both the model or wrapper and the forked model to the interconnected digital engineering platform through the customer firewall.

In some implementations, the customer firewall can receive the data from the agent (1328). Specifically, the customer firewall can receive the response to the user request from the agent. The response to the user request can include, for example, the model or wrapper of the model, the copy of the forked model, or both. The customer firewall can determine whether to accept or reject the response to the user request. If the customer firewall rejects the request, then the customer firewall can disregard the response. If the customer firewall accepts the request, then the customer firewall can provide the response to the user request to the interconnected digital engineering platform.

In some implementations, the interconnected digital engineering platform can receive the response to the user request from the customer firewall (1330). The interconnected digital engineering platform can provide the response to the user request to a user interface to an end device or end point of a user that transmitted the user request. Prior to displaying the response to the user request to a user interface of the end device, the interconnected digital engineering platform can verify the user is the authenticated user for viewing these results. The verification can be performed by comparing the credentials of the user to the user access policies and the model access policies. In response to verification against the policies being successfully authenticated, the interconnected digital engineering platform can display the response to the user request to the user interface of the end device of the authenticated user. This process can repeat for each user request transmitted by the user to the interconnected digital engineering platform.

In some implementations, the interconnected digital engineering platform can be positioned within or behind a customer firewall. In this implementation, the processes performed by the interconnected digital engineering platform with respect to FIG. 13 can be performed within the customer firewall. Other examples and placement of the interconnected digital engineering platform are also possible.

In some cases, the interconnected digital engineering platform can utilize a permissions model that enforces a user to authenticate before using the platform. For example, the permissions model may be performed at the user interface, at the backend, or at another stage in the process described with respect to FIG. 13. In some implementations, the permissions model can enforce permissions based access to various digital models within the interconnected digital engineering platform.

For example, the permission model includes mechanisms to calculate accesses and render permissions decisions using a relation based access control (ReBAC) system. An ReBAC system can define an authorization paradigm where a subject's mission to access a particular resource is defined by the presence of relationships between those subjects and resources. Generally, authorization in ReBAC systems is performed by traversing the directed graph of relations, using nodes and edges of the directed graph in a Resource Description Framework (RDF) format. In some examples, ReBAC systems allow hierarchies of relationships, and some allow complex definitions that include algebraic operators on relationships such as union, intersection, and difference.

A permissions database can track relationships between resources in the interconnected digital engineering platform. For example, a user may have the relationship "editor" to a specific model or a file may have the relationship "output metadata" to a specific digital engineering job. When an actor, such as a human or a computer, seeks to access a resource, e.g., a particular digital engineering model, a policy document is evaluated by the permissions system at the time of access. At evaluation time, the permissions system traverses the relational graph linking an actor and a resource of the ReBAC system, and then maps that graph to the policy document to issue a decision with respect to a specific action, e.g., allow permission or deny permission.

FIG. 13 illustrates the process 1300 occurring in the user interface, e.g., initiating at 1302. In some implementations, the process 1300, and specifically, the permissions checking, can be performed in the backend, e.g., the digital engineering platform. For example, the permissions checking can occur in the backend after the user submits their request and the request attempt is logged in the transaction database (1306). If the user does not have the appropriate permissions to access the digital engineering platform and the permissions authentication fails, the process 1300 ends. Alternatively, if the user has the appropriate permissions at 1306, the process 1300 continues to 1308.

Utilizing a permissions model to check user permissions in the backend and not in the frontend at the user interface can further enhance zero trust security for digital models. For example, a user interface is directly exposed to the user, enabling malicious users potentially able to subvert the interface to skip any permissions checks there. Moreover, a malicious user may choose to interact directly with the backend and bypass the user interface and its check entirely. Accordingly, the user interface may present security flaws that preclude secure permissions enforcement. As such, only by enforcing permissions in the backend can the digital engineering interconnected platform ensure that users only take secure actions that they are allowed to take. For example, by performing the permissions check after logging of transactions, e.g., after 1306, the digital engineering platform can log failed/unauthorized transactions, and in some implementations, include a threat detection step using a machine learning model trained on access logs of user transactions.

In some implementations, the digital engineering platform's use of access and transaction log provide a critical part of the zero trust security approach. Engineering processes critically depend on provenance to meet legal, regulatory, and other compliance requirements and ensure the correctness and completeness of digital engineering process outputs. For example, it is not enough to know that a design was approved as meeting a requirement; but what is to be known is who approved the design and when they approved the design. Full and complete access and transaction logs provide this vital provenance data—these logs enable precise reconstructions of every modification, change, approval, evaluation, and other action taken on a design, allowing for full tracing of who was responsible for what aspects of the result and when they did their work.

Similarly, full and complete logs of failed access are a vital tool for investigating possible malfeasance, detecting security breaches, and otherwise ensuring that information protection and dissemination policies are being correctly adhered to and enforced. For example, a user reviewing the access logs can determine whether a user has "gone rogue" or attempted to sabotage a project, determine whether a compromised account is making many unusual or unexpected requests, or determine whether policies related to the use of the digital models are being followed appropriately.

As described below with respect to FIG. 15, storing access and transaction logs on blockchain or distributed ledger can offer further benefits. For example, one such benefit includes allowing third parties with access to the blockchain to perform the same verification and auditing processes as described above. As described below with respect to FIG. 16, comprehensive logs are especially important in multi-enclave/multi-tenant environments as in such a context, no one organization or tenant may have visibility across the entire digital engineering process. Access logs can reveal and allow for the synthesis of a complete view by tracking actions on a model across all enclaves and all tenants, allowing for end-to-end auditing, compliance checking, etc., of a digital engineering product.

FIG. 14 illustrates another implementation of processes 1400 related to a user reading and writing to a model. In process 1400, the interconnected digital engineering platform can verify the authenticity of the user against the user and model access control policies to ensure the user is authenticated to review authorized model information (1402). In response to successful authentication, the user can send a user request from their respective end device to the UX/UI component at the interconnected digital engineering platform (1404). The interconnected digital engineering platform can receive the user request and log the access request in a transaction database (1406). Then, the interconnected digital engineering platform can extract model identifying information from the user request, and use the extracted model identifying information to identify model ID and model information from a model database (1408). The model database may be connected locally to the interconnected digital engineering platform or connected over the internet to the interconnected digital engineering platform.

In response to accessing the model ID and model information from the model database, the interconnected digital engineering platform can forward the user request to the location of the requested model (1410). The interconnected digital engineering platform can use the model ID and model information as a destination address for identifying the location of the requested model. In some cases, the model ID and model information can be forwarded with the user request to the model location.

In some implementations, the model location may be located behind a customer firewall in a customer environment. The customer firewall can receive the user request and determine whether to accept or reject the user request (1412). If the customer firewall accepts the user request, the customer firewall can forward the user request to the digital engineering agent behind the firewall. The digital engineering agent can receive the forwarded user request and verify the access of the user request against user access policies and model access policies (1414). If the digital engineering agent determines the user access request is verified against the user access policies and the model access policies, then the digital engineering agent can forward the user request to the requested model (1416).

In some implementations, the digital engineering agent can determine the type of action to be performed from the user request. If the digital engineering agent determines the type of action is a write request, then the digital engineering agent can create a copy or fork of the requested model and apply the write request changes to the forked model (1420). The forked copy with the written changes can then either overwrite the stored model or send it for review to the model owner. The model owner can either accept the written changes, which are then applied to the stored model, or reject the written changes, in which the digital engineering agent can discard the forked copy (1422). The digital engineering agent can then return the forked model to the interconnected digital engineering platform (1424).

If the digital engineering agent determines the type of action is a read request, then the digital engineering agent can access an API or model wrapper for the requested model (1418). The digital engineering agent can return the API or the model wrapper to the model owner for their review to access data from the model (1426). Moreover, the digital engineering agent can return either the model or the API to the interconnected digital engineering platform.

The customer firewall can receive either the forked copy of the model or the model wrapper (i.e., the response to the user request) and determine whether to pass the response to the user request through to the interconnected digital engineering platform (1412). If the customer firewall determines to pass the response to the user request through to the interconnected digital engineering platform, the interconnected digital engineering platform can receive the response and verify the user has access to the model data again (1428). This additional security step ensures the interconnected digital engineering platform verifies the authenticity of the user reviewing the response to the user request, who may be different from the user who transmitted the user request.

In response to successfully authenticating the user to view the response to the request, the interconnected digital engineering platform can display the response to the user request (1430). The response to the user request may be displayed in various manners. For example, the response can be displayed via a user interface at an end device, via a user interface at a display connected to the interconnected digital engineering platform, or provided as a message to the end device via email, text, or audio message, for example.

In some implementations, the interconnected digital engineering platform can apply digital watermarks to one or more digital models in the secure digital engineering ecosystem. The digital watermarks can include using, for example, endpoint data, cryptography, blockchain tokenization, human and machine-readable watermarks, hiding the watermark within the model, creating a unique digital signature, incorporating DRM technologies, etc. Other methods for digital watermarking can include, for example, steganography which can add watermarks by hiding information within the model. The interconnected digital engineering platform can employ adding digital watermarks to digital models to provide extra protection and traceability for digital models. In some examples, the digital engineering agent can digitally watermark each of the stored digital models. Moreover, the model owner can provide instructions that indicate to the digital engineering agent and/or the interconnected digital engineering platform which of the stored models to apply with digital watermarking.

In some examples, the digital watermark can include a platform specific pattern for edits to a model. In others, the digital watermark can include an addition to the model's file header which includes the signed cryptographic hash of the latest recorded transaction against the stored model, which does not change how the model can be used by other systems but provides a digital indication that the model has been transacted upon within the interconnected digital engineering platform. The digital watermarking process can be described with reference to any of the systems described throughout the specification. The digital watermarking process can be useful in situations where the digital model or data from the digital model leaks outside the digital engineering and certification ecosystem. For example, the digital watermark of the leaked model or data can be viewed to identify where the leakage originated and/or the last transaction that occurred with the leaked model and/or data. As such, the digital watermarking can provide a safeguarding for traceability purposes.

FIG. 15 illustrates various flowcharts 1501 and 1502 for digital engineering and certification actions using models in a zero trust manner. The models can be hosted in secure storage, isolated from any specific customer or user. The zero trust security implementation involves authentication, authorization, data security, and secure communication between the customer's computing environment and the model storage. To achieve zero trust, the policies for authentication can include a secure, tamper-proof record of the model ID and location, model authorizations based on an authentic and tamper-proof record of transactions, and model output validations using consensus mechanisms to validate the models in the absence of a ground truth. FIG. 15 illustrates two different processes for securing the digital models in a zero trust manner, flowchart 1501 and flowchart 1502. In the processes related to flowchart 1501, securing the digital models in the zero trust manner can be performed using secure databases that are centralized or distributed. In the processes related to flowchart 1502, securing the digital models in the zero trust manner can be performed using techniques related to blockchain technologies. The processes 1501 and 1502 can be performed by the interconnected digital engineering platform, for example.

In the process 1501, a secure off-chain storage for models is created (1502). The off-chain storage can be network storage, cloud storage, or local storage, to name a few examples. Moreover, a distributed database linked to the interconnected digital engineering platform can be created to store a series of pointers or memory addresses related to the models stored in the off-chain storage (1504). In some implementations, a designer of the system can create a secure database. The secure database can be connected to the interconnected digital platform.

In some implementations, the secure database can store data related to each model and actions performed on the model. Specifically, the secure database can store a pointer to each model, transaction history associated with each model, and one or more cryptographic hashes of address history associated with each model. The secure database can be accessed to identify a location for each model.

The interconnected digital engineering platform can track endpoint executions associated with a model (1506). Specifically, each transaction received by the interconnected digital engineering platform can be recorded in the transaction database. In this manner, each transaction can be reviewed at any point in time, such as by a model owner to view all transactions applied to a respective model. A consensus mechanism across the distributed databases can be used to validate the chain executions, such as on a blockchain. The consensus mechanisms may include PoS or POR approaches, and ensure that all nodes in a network of open-access storage digital engineering models have the same view of the specific model's transactions, even in the presence of faulty or malicious nodes. The digital engineering tools in different nodes may perform similar verification or evaluation operations on the specific model and consensus across a range of nodes with different DE tools' evaluations is instead used to validate the chain executions.

In some implementations, users can link to or connect to the interconnected digital engineering platform via their end device (1508). The user can communicate with the interconnected digital engineering platform. In some cases, the user can communicate with the interconnected digital engineering platform to determine and validate actions that occurred against a respective model. Specifically, the user can communicate with the interconnected digital engineering platform by checking whether a file hash produced matches a result of similar transactions recorded on the database. For example, the cryptographic hash of the digital model or model-type file should match the hash stored in the endpoint transaction database, such as via a string compare, math compare, or other function, which is the cryptographic hash of the output of the corresponding transaction. If the hashes match the transactions performed on the respective model, then the user can ensure that the actions on the respective model are validated. Once the system verifies and validates a model, the corresponding transaction on that model is automatically certified and added to a transaction database (1510). This process ensures any transactions performed against a respective model are secured and authenticated.

In the process 1502, a secure off-chain storage for models is created (1512). The off-chain storage can be network storage, cloud storage, or local storage, to name a few examples. Moreover, a blockchain is created and linked to the interconnected digital engineering platform. The blockchain can be created to store a series of pointers or memory addresses related to the models stored in the off-chain storage. In some implementations, a designer of the system can create the blockchain.

A blockchain can include a list of records, which are called blocks, and which are linked. Each block contains a pointer as a link to a previous block. Multiple parties can record transactions in the blockchain or verify previous transactions of others. The blockchain is sometimes referred to as a ledger. For example, cryptocurrency transactions and other transactions for a period may be stored in a block that is then added to the tail of a previously created blockchain, thereby extending the blockchain. The blockchain can be held privately (e.g., in a centralized manner) or held publicly in a less than centralized manner.

In some implementations, the interconnected digital engineering platform can mint an non-fungible token, an NFT, representing a pointer to a digital model in a database. The model identity includes the model ID, its associated metadata and the address location for the model on a secure storage. These details about model identity are cryptographically hashed and added as entries to a block on a blockchain. Adding such a block is also called minting a token for the model identity. The token is non-fungible because the model identity will need to be unchanged.

In some implementations, the interconnected digital engineering platform can mint an NFT representing a pointer to the model in a database after a transaction execution (1514). When edits or modifications are made to a model, the endpoint metadata of the transactions are stored in the endpoint transaction database or minted as separate tokens that are linked to the source model's non-fungible identity token on the blockchain. For each model minted on its identity blockchain, there are associated transaction blockchains that confirm valid edit operations on the model and verifications or validations completed by the model. In order to add a new edit operation to the transaction blockchain, the system will verify against prior history of V&V. The digital engineering tools in different nodes may perform similar verification or evaluation operations on the specific model and consensus across a range of nodes with different DE tools' evaluations is instead used to validate the model's transactions.

For example, the interconnected digital platform mints an NFT by converting the model transaction into a crypto-transaction or a digital asset recorded on a blockchain. The crypto-transaction or the digital asset can be stored in a distributed ledger or decentralized database that cannot be edited, modified, or deleted, but only viewed. In this manner, any transaction executions performed on the model can be recorded in a block on the blockchain (1516). The interconnected digital engineering platform can utilize consensus mechanisms to validate transactions on the distributed database or block chain. The consensus mechanisms may include PoS or PoR approaches, and ensure that all nodes in a network of open-access storage digital models have the same view of the specific model's transactions, even in the presence of faulty or malicious nodes. The digital engineering tools in different nodes may perform similar verification or evaluation operations on the specific model and consensus across a range of nodes with different DE tools' evaluations is instead used to validate the model's transactions.

In some implementations, customers can link to or connect to the interconnected digital engineering platform (1518). Specifically, the customers can link to the interconnected digital engineering platform to view recorded transactions on the blockchain. The customers can validate transactions for a model on the blockchain. The customer can validate the transactions by checking whether file hashes produced for the transactions match the result of similar transactions recorded on the blockchain. For example, the cryptographic hash of the digital model or model-type file should match the hash stored in the endpoint transaction database, which is the cryptographic hash of the output of the corresponding transaction. In some implementations, customers can monitor recorded transactions using their forked copy. Once the interconnected digital engineering platform verifies and validates a model, the interconnected digital engineering platform can automatically certify the transaction and mint a new NFT representing the model after the validated transaction occurred (1520). The NFT can be immutable and present a record of transactions to the models or models, which represent contributions a user has made to the model. It can also contain ancillary information about the model, such as performance or other related metrics.

In some implementations, any change or update to a model creates a copy of the NFT so the two versions can exist on their own in the interconnected digital engineering platform. In technical blockchain parlance, this is called sharding the NFT. More specifically, sharding the NFT means to split the NFT into multiple shared NFTs or multiple fractional NFTs (1522). In some implementations, the new shard may have different associated metrics due to the additional validated transactions. For example, if the updates to the model improve performance in some dimension, then metrics associated with the new model NFT shard can increase. If the new sharded NFT is unrelated, then this may not be related to the metrics. At this point, the gains are reassessed and validated.

The implementation of zero trust security can extend to access and collaboration with multiple models in a computing environment, as shown in FIG. 16, such as a digital engineering and certification ecosystem. Users 1602 can access the interconnected digital engineering platform 1604 through the UX/UI component 1606. The model and function wrappers 1608 can forward the request of the users 1602 to the customer's networking environment 1609, which may be behind a firewall. The agent 1610 can receive the request within the customer's networking environment 1609. In some implementations, the system 1600 can ensure secure execution of complex workflows where outputs from one function on a secured model 1612-1 can be used as inputs to another function on another secured model 1612-2, and so on. This process can occur within the customer environment 1609 and/or behind a customer firewall. In some cases, this process can occur across multiple customer environments. This process of cascading multiple models can facilitate collaboration between multiple stakeholders on complex projects with multiple models, and removes the dependency of a user interrupting the workflow to facilitate each step one at a time. The zero trust mechanism is applied consistently and modularly at each step to each model involved in the set of functions in the environment.

In some implementations, the digital engineering and certification ecosystem can be implemented and tested using industry-accepted penetration testing ("pentesting") protocols. Pentesting is a security exercise where a cyber-security expert or a cyber-security tool is deployed in an attempt to find and exploit vulnerabilities in a computer system, namely the digital engineering and certification ecosystem. The purpose of the pentesting is to identify any weak spots in a system's defenses which attackers may be able to exploit. For instance, pentesting approaches consist of live testing including evaluation against standard (COTS) hacking tools and scanners, purpose built ("bespoke") hacking tools, human expert exploration, and validation of security properties.

While the process of pentesting can vary widely in the details, as results from earlier in the process can be used to guide later steps, the overall approach can resemble the following sequence or process. In some cases, many of the steps of this process will be performed repeatedly and simultaneously with other steps. First, the pentesting team can execute a series of automated hacking tools and scanners against the digital engineering and certification ecosystem. These tools are generally COTS tools, those some penetration test teams augment these COTS tools with internally-developed tools. Second, the pentesting team can evaluate the results of the automated tools and scanners in order to select particular areas of the platform for further evaluation. This may include areas that can expose potential vulnerabilities to the digital engineering and certification ecosystem. Third, the pentesting team will explore and deeply probe the areas of the platform selected in step two with manual exploitation and by developing and running purpose-built, e.g., bespoke, automated tools. Fourth, the pentesting team can manually or automatically evaluate, validate, and verify all potential issues discovered in the previous steps of the pentesting process.

In some cases, the first step can be performed by an automated process, while the second and fourth steps can be performed by a manual process, and the third step can be performed by a mix of manual and automatic processes. Accordingly, the first step may be performed quickly, e.g. seconds, minutes, or hours. However, the remaining steps may be completed in hours, days, or weeks.

In general, each of the potential issues, whether discovered manually or by automated tools during the pentesting can be identified. Specifically, each of the potential issues can be manually validated and verified by the pentesting team before being formally reported as vulnerabilities. Potential vulnerabilities that have not been or cannot be verified, e.g., due to constraints of time, project priorities, technical limitations, or contractual limitations, can be clearly marked when reported. The implementations described throughout this disclosure has been pentested to verify and validate the platform's zero trust security policy.

In some implementations, the digital engineering and certification ecosystem can detect that an unauthorized user, e.g., an unauthorized computing system, is attempting to access its computing system and responding to the attempt to prevent the unauthorized user from gaining access to the digital engineering and certification ecosystem. The digital engineering and certification ecosystem is configured to deploy countermeasures when the ecosystem detects communication with an unauthorized computing system. Typically, the ecosystem instead performs a simulation of operations of the ecosystem responsive to commands received from the unauthorized computing system. The ecosystem can send simulated parameters values to the unauthorized computing system. The ecosystem can monitor, characterize, and/or store (e.g., locally and/or in a cloud computing system) data representing behavior of the unauthorized computing system. In this way, data about the attempted cyberattack are stored and analyzed by the ecosystem or other authorized computing systems and the ecosystem operations are uninterrupted. The process for deploying countermeasures, performing simulations, monitoring, characterizing, and storing data representative of the unauthorized computing system, among others, when the ecosystem detects communication with an unauthorized computing system, is similarly described in U.S. patent application Ser. No. 17/903,730, the disclosure of which is hereby incorporated by reference in its entirety, with additional features and variation as described herein.

In some implementations, the digital engineering platform's security features includes the use of machine learning models to assist in adversarial threat detection. Zero trust security for digital engineering models or digital models can involve authorizing individual user queries to their relevant digital models based on least privilege, for example. The digital engineering platform can store usage data, network traffic data, and access logs, and utilize this stored information to assist in the adversarial threat detection.

In some implementations, the interconnected digital engineering and certification platform can utilize machine learning (ML) based threat detection models to address security vulnerabilities. These ML based threat detection models can use a binary classification methodology to handle network traffic metadata, effectively categorizing network traffic into normal and potential threat instances. In some implementations, the ML based threat detection model can utilize other diverse classification models. These other models can include anomaly detection models, for example.

The input to the ML based threat detection models can include network traffic data captured directly from a service mesh integral to the digital engineering platform. The network traffic data can include, for example, volume, metadata, data rates, and timing related to communications between the digital engineering tool agents and the digital engineering platform, as well as transactions involving frontend users. The data can be input, for example, as network traffic values and other data types. However, any data that emanates from intermediaries bypassing the digital engineering platform or attributes to customer data storage can be excluded from the model's purview. Committed to safeguarding privacy and maintaining impeccable security standards, the model ensures that sensitive metadata is either encrypted beyond decipherability or entirely omitted.

In some implementations, the output from the ML based threat detection models can include binary classifications. These models can produce binary classifications that demarcate either normal or threat level classification. In some implementations, the output from the ML based threat detection models can include values that range in severity from normal level classification to threat level classifications. The digital engineering platform can compare the output value to a threshold value. If the output value satisfies the threshold value, then the digital engineering platform can deem that a threat is detected.

Moreover, the ML based threat detection models can further compartmentalize the threat class into specific types of threats. This added segmentation comes with the caveat of potentially reduced accuracy due to the complexity involved in detailed threat categorization. The specific types of threats can include, for example, low risk, elevated risk, or high risk. Each of these types of threats can also correlate to different actions that the digital engineering platform can take to address to the identified threat.

To hone the model's predictive prowess, the digital engineering platform can generate training datasets to further train and enhance the ML based threat detection models' capabilities. The training datasets can be supplemented with synthetic attack data or other comprehensive databases, such as CIDDS-001 or UNSW-NB15. These data types enable the digital engineering platform to effectively broaden the spectrum of identifiable features and optimizing the model's threat detection capabilities. The digital engineering platform can train the ML based threat detection model and further improve the accuracy of these models based on user feedback.

In some implementations, the ML based threat detection model can operate by collecting and analyzing network traffic metadata from the digital engineering platform's cloud network. For example, the digital engineering platform can craft unique classifiers and detectors leveraging the aforementioned input characteristics. Simultaneously or substantially simultaneously, the ML based threat detection model can cater to advanced operation modes, conducting in-depth analyses of the latent space or utilizing the output as input for subsequent ML based threat detection models. This dexterity enhances the models' flexibility, usability, and security quotient. Moreover, the ML models on the platform can themselves be subject to rigorous testing consistent with industry standards.

Figure 17:
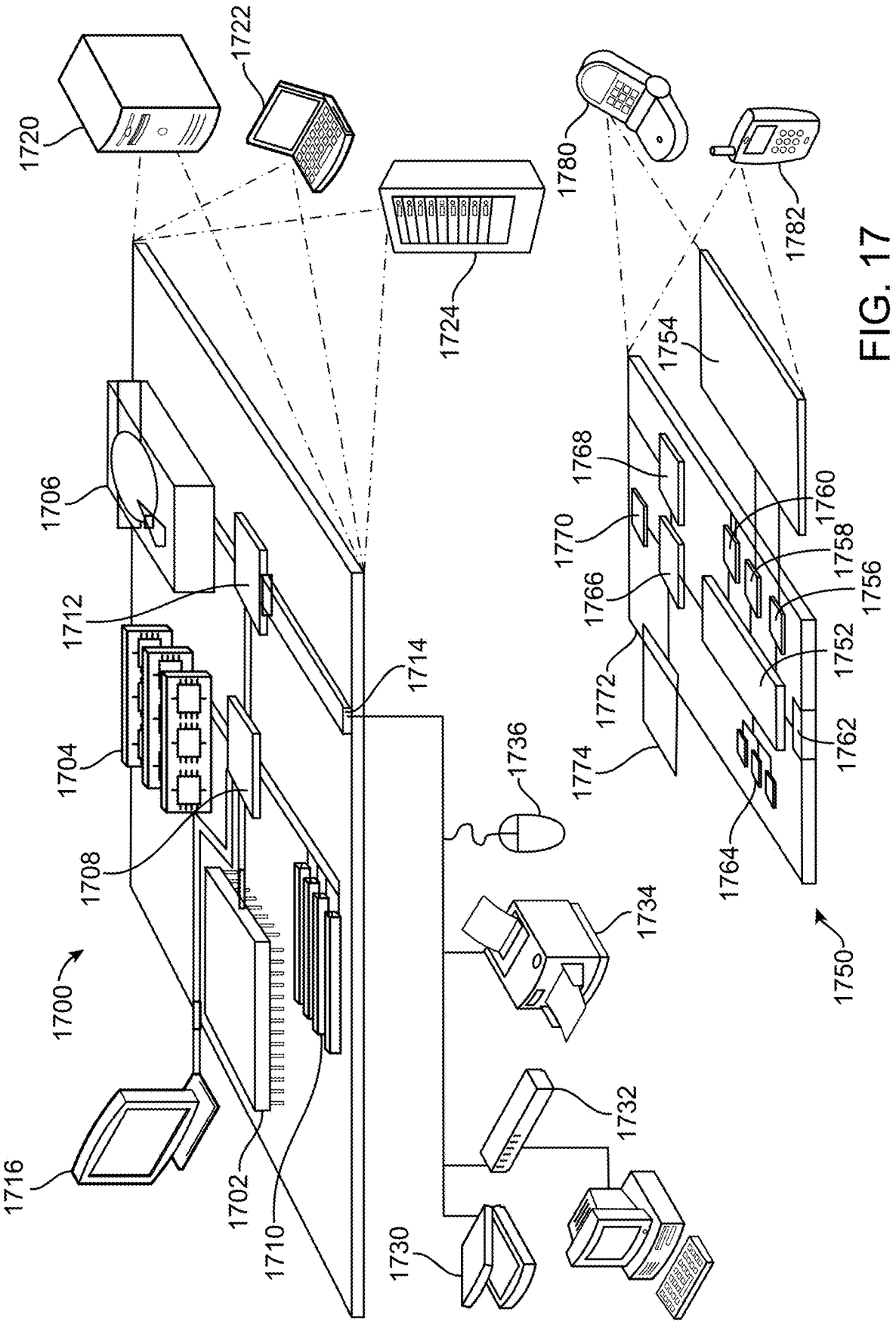
FIG. 17 is a diagram illustrating an example of a computing environment.

FIG. 17 shows an example of a computing device 1700 and a mobile computing device 1750 that are employed to execute implementations of the present disclosure. The computing device 1700 is intended to represent various forms of digital computers, such as laptops, desktops, workstations, personal digital assistants, servers, blade servers, mainframes, and other appropriate computers. The mobile computing device 1750 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 1700 and/or the mobile computing device 1750 can form at least a portion of the user device 106A or API 106B and the computing system 108 described above. As described previously, in some implementations, the computing system 108 can be a distributed computing system that includes multiple computing devices such as the computing device 1700 and/or the mobile computing device 1750. In other implementations the computing system 108 can comprise a single computing device. In some implementations, the API 106B can be implemented on the computing device 1700 and/or the mobile computing device 1750 to relay a digital computer file to a non-human, artificial user 104B (e.g., an artificial intelligence and/or an algorithmic user), which may itself be implemented on the computing device 1700 and/or the mobile computing device 1750 (or on a separate instance of the computing device 1700 and/or the mobile computing device 1750).

The computing device 1700 includes a processor 1702, a memory 1704, a storage device 1707, a high-speed interface 1708, and a low-speed interface 1712. In some implementations, the high-speed interface 1708 connects to the memory 1704 and multiple high-speed expansion ports 1710. In some implementations, the low-speed interface 1712 connects to a low-speed expansion port 1714 and the storage device 1706. Each of the processor 1702, the memory 1704, the storage device 1706, the high-speed interface 1708, the high-speed expansion ports 1710, and the low-speed interface 1712, are interconnected using various buses, and may be mounted on a common motherboard or in other manners as appropriate. The processor 1702 can process instructions for execution within the computing device 1700, including instructions stored in the memory 1704 and/or on the storage device 1706 to display graphical information for a graphical user interface (GUI) on an external input/output device, such as a display 1716 coupled to the high-speed interface 1708. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1704 stores information within the computing device 1700. In some implementations, the memory 1704 is a volatile memory unit or units. In some implementations, the memory 1704 is a non-volatile memory unit or units. The memory 1704 may also be another form of a computer-readable medium, such as a magnetic or optical disk.

The storage device 1706 is capable of providing mass storage for the computing device 1700. In some implementations, the storage device 1706 may be or include a computer-readable medium, such as a floppy disk device, a hard disk device, an optical disk device, a tape device, a flash memory, or other similar solid-state memory device, or an array of devices including devices in a storage area network or other configurations. Instructions can be stored in an information carrier. The instructions, when executed by one or more processing devices, such as processor 1702, perform one or more methods, such as those described above. The instructions can also be stored by one or more storage devices, such as computer-readable or machine-readable mediums, such as the memory 1704, the storage device 1706, or memory on the processor 1702.

The high-speed interface 1708 manages bandwidth-intensive operations for the computing device 1700, while the low-speed interface 1712 manages lower bandwidth-intensive operations. Such allocation of functions is an example only. In some implementations, the high-speed interface 1708 is coupled to the memory 1704, the display 1716 (e.g., through a graphics processor or accelerator), and the high-speed expansion ports 1710, which may accept various expansion cards. In the implementation, the low-speed interface 1712 is coupled to the storage device 1706 and the low-speed expansion port 1714. The low-speed expansion port 1714, which may include various communication ports (e.g., Universal Serial Bus (USB), Bluetooth, Ethernet, wireless Ethernet) may be coupled to one or more input/output devices. Such input/output devices may include a scanner 1730, a printing device 1734, or a keyboard or mouse 1736. The input/output devices may also be coupled to the low-speed expansion port 1714 through a network adapter 1732. Such network input/output devices may include, for example, a switch or router.

The computing device 1700 may be implemented in a number of different forms, as shown in FIG. 17. For example, it may be implemented as a standard server 1720, or multiple times in a group of such servers. In addition, it may be implemented in a personal computer such as a laptop computer 1722. It may also be implemented as part of a rack server system 1724, high performance computing enclave, or quantum and/or non-silicon based computing system. Alternatively, components from the computing device 1700 may be combined with other components in a mobile device, such as a mobile computing device 1750. Each of such devices may contain one or more of the computing device 1700 and the mobile computing device 1750, and an entire system may be made up of multiple computing devices communicating with each other.

The mobile computing device 1750 includes a processor 1752; a memory 1764; an input/output device, such as a display 1754; a communication interface 1766; and a transceiver 1768; among other components. The mobile computing device 1750 may also be provided with a storage device, such as a micro-drive or other device, to provide additional storage. Each of the processor 1752, the memory 1764, the display 1754, the communication interface 1766, and the transceiver 1768, are interconnected using various buses, and several of the components may be mounted on a common motherboard or in other manners as appropriate. In some implementations, the mobile computing device 1750 may include a camera device(s).

The processor 1752 can execute instructions within the mobile computing device 1750, including instructions stored in the memory 1764. The processor 1752 may be implemented as a chipset of chips that include separate and multiple analog and digital processors. For example, the processor 1752 may be a Complex Instruction Set Computers (CISC) processor, a Reduced Instruction Set Computer (RISC) processor, or a Minimal Instruction Set Computer (MISC) processor. The processor 1752 may provide, for example, for coordination of the other components of the mobile computing device 1750, such as control of user interfaces (UIs), applications run by the mobile computing device 1750, and/or wireless communication by the mobile computing device 1750.

The processor 1752 may communicate with a user through a control interface 1758 and a display interface 1756 coupled to the display 1754. The display 1754 may be, for example, a Thin-Film-Transistor Liquid Crystal Display (TFT LCD) display, an Organic Light Emitting Diode (OLED) display, or other appropriate display technology. The display interface 1756 may include appropriate circuitry for driving the display 1754 to present graphical and other information to a user. The control interface 1758 may receive commands from a user and convert them for submission to the processor 1752. In addition, an external interface 1762 may provide communication with the processor 1752, so as to enable near area communication of the mobile computing device 1750 with other devices. The external interface 1762 may provide, for example, for wired communication in some implementations, or for wireless communication in other implementations, and multiple interfaces may also be used.

The memory 1764 stores information within the mobile computing device 1750. The memory 1764 can be implemented as one or more of a computer-readable medium or media, a volatile memory unit or units, or a non-volatile memory unit or units. An expansion memory 1774 may also be provided and connected to the mobile computing device 1750 through an expansion interface 1772, which may include, for example, a Single in Line Memory Module (SIMM) card interface. The expansion memory 1774 may provide extra storage space for the mobile computing device 1750, or may also store applications or other information for the mobile computing device 1750. Specifically, the expansion memory 1774 may include instructions to carry out or supplement the processes described above, and may also include secure information. Thus, for example, the expansion memory 1774 may be provided as a security module for the mobile computing device 1750, and may be programmed with instructions that permit secure use of the mobile computing device 1750. In addition, secure applications may be provided via the SIMM cards, along with additional information, such as placing identifying information on the SIMM card in a non-hackable manner.

The memory may include, for example, flash memory, and/or non-volatile random access memory (NVRAM), as discussed below. In some implementations, instructions are stored in an information carrier. The instructions, when executed by one or more processing devices, such as processor 1752, perform one or more methods, such as those described above. The instructions can also be stored by one or more storage devices, such as one or more computer-readable or machine-readable mediums, such as the memory 1764, the expansion memory 1774, or memory on the processor 1752. In some implementations, the instructions can be received in a propagated signal, such as over the transceiver 1768 or the external interface 1762.

The mobile computing device 1750 may communicate wirelessly through the communication interface 1766, which may include digital signal processing circuitry where necessary. The communication interface 1766 may provide for communications under various modes or protocols, such as Global System for Mobile (GSM) communications voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS). Such communication may occur, for example, through the transceiver 1768 using a radio frequency. In addition, short-range communication, such as using Bluetooth or Wi-Fi, may occur. In addition, a Global Positioning System (GPS) receiver module 1770 may provide additional navigation- and location-related wireless data to the mobile computing device 1750, which may be used as appropriate by applications running on the mobile computing device 1750.

The mobile computing device 1750 may also communicate audibly using an audio codec 1760, which may receive spoken information from a user and convert it to usable digital information. The audio codec 1760 may likewise generate audible sound for a user, such as through a speaker (e.g., in a handset of the mobile computing device 1750). Such sound may include sound from voice telephone calls, may include recorded sound (e.g., voice messages, music files, etc.), and may also include sound generated by applications operating on the mobile computing device 1750.

The mobile computing device 1750 may be implemented in a number of different forms, as shown in FIG. 17. For example, it may be implemented as a phone device 1780, a personal digital assistant 1782, and/or a tablet device (not shown). The mobile computing device 1750 may also be implemented as a component of a smart-phone, AR device, or other similar mobile device.

Computing device 1700 and/or 1750 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. A computer-implemented method comprising:
 receiving, by a digital platform and from a user device, a request to access one or more models, the request comprising a location of the one or more models;
 determining, by the digital platform, that a user of the user device that transmitted the request is authorized to access the one or more requested models;
 in response to determining that the user is authorized to access the one or more requested models, transmitting, by the digital platform and to the location of the one or more models, a transaction request that causes execution of one or more operations using the one or more requested models;
 providing, by the digital platform and to the user device, data representative of a result of the execution of the one or more caused operations;
 maintaining, by the digital platform, an auditing record of data related to the received request from the user device, the transaction request transmitted by the digital platform, and the data representative of the result of the one or more caused operations performed using the one or more requested models; and
 providing, by the digital platform and to the user device of the user, data stored in the auditing record.

2. The computer-implemented method of claim 1, wherein maintaining the auditing record further comprises maintaining, by the digital platform, the auditing record of metadata, the metadata comprising one or more other transactions performed against the one or more requested models.

3. The computer-implemented method of claim 2, wherein the metadata comprises, for each of the one or more other transactions, a model owner identifier (ID), a user ID, access rights of a corresponding user, a device ID, a time for performing a corresponding transaction, data representing a network, a task ID, and a tool ID.

4. The computer-implemented method of claim 1, further comprising:
 analyzing, by the digital platform and from the auditing record, a series of transactions for completing a previous request;
 determining, by the digital platform, one or more criteria for the series of transactions to satisfy completing the previous request;
 determining, by the digital platform, the series of transactions do not satisfy the one or more criteria for completing the previous request;
 in response to determining the series of transactions do not satisfy the one or more criteria, generating, by the digital platform, one or more recommendations for modifying the series of transactions in order to satisfy the criteria for completing the request; and
 transmitting, by the digital platform and to the user device of the user, the one or more recommendations for the user to review for a subsequent request.

5. The computer-implemented method of claim 1, wherein transmitting, by the digital platform and to the location of the one or more requested models, the transaction request comprises transmitting, by the digital platform and to a cloud network that stores the location of the one or more requested models, the transaction request that causes execution of the one or more operations using the one or more requested models.

6. The computer-implemented method of claim 1, wherein transmitting, by the digital platform and to the location of the one or more models, the transaction request comprises transmitting, by the digital platform and to a digital agent, the transaction request that causes the digital agent to perform the one or more operations using the one or more requested models.

7. The computer-implemented method of claim 6, further comprising:
 storing, by the digital agent, one or more digital tools in a tools database, the one or more digital tools comprise model-based systems engineering (MBSE) tools, augmented reality (AR) tools, computer aided design (CAD) tools, data analytics tools, modeling and simulation (M&S) tools, and product lifecycle management (PLM) tools; and storing the one or more models, the one or more models comprise simulation engines, requirements models, electronics models, test-plan models, cost-models, schedule models, software modeling, supply-chain models, manufacturing models, cyber security models, multi-attribute trade-space tools, and mission effects models.

8. The computer-implemented method of claim 7, further comprising monitoring, by the digital platform, a usage of one or more digital tools over a period of time.

9. The computer-implemented method of claim 7, wherein the digital platform and the digital agent communicate in a bi-directional manner through one or more firewalls.

10. The computer-implemented method of claim 9, wherein transmitting the transaction request that causes the digital agent to perform the one or more operations using the one or more requested models comprises transmitting the transaction request that causes the digital agent to copy the one or more requested models and subsequently perform a write action against the copied version of the one or more requested models without modifying an original version of the one or more requested models.

11. The computer-implemented method of claim 1, wherein the one or more operations comprises at least one of reading data from the one or more models, writing data to the one or more models, accessing one or more digital artifacts out of the one or more models, or accessing the one or more models.

12. The computer-implemented method of claim 1, further comprising:

determining, by the digital platform, whether the user that transmitted the request is authorized to access the one or more requested models, wherein determining comprises:

obtaining, by the digital platform, one or more credentials of the user prior to receiving the request to access the one or more requested models; and determining, by the digital platform, that the user is authorized to access the digital platform using the one or more obtained credentials applied against a permission model.

13. The computer-implemented method of claim 1, further comprising:

determining, by the digital platform, a type of the one or more operations to perform against the one or more requested models;

in response to determining the type of the one or more operations to perform against the one or more requested models, transmitting, by the digital platform and to the location of the one or more requested models, the transaction request;

receiving, by the digital platform, a splicer that provides access to one or more functions of the one or more requested models; and providing, by the digital platform and to a user interface, the received splicer for user interaction to the one or more functions of the one or more requested models.

14. The computer-implemented method of claim 13, wherein the received splicer is configured to restrict user access to a subset of functionalities of the one or more requested models.

15. The computer-implemented method of claim 13, wherein the received splicer is configured to redact a portion of the one or more requested models.

16. The computer-implemented method of claim 13, wherein the received splicer is configured to secure a subset of functionalities of the one or more requested models on the user device.

17. The computer-implemented method of claim 1, further comprising:

extracting, from the received request and by the digital platform, data that identifies the one or more requested models the user seeks to access; and retrieving, by the digital platform, the location of the one or more requested models based on the extracted data from the received request.

18. The computer-implemented method of claim 1, wherein maintaining the auditable record of the data further comprises:

storing, by the digital platform, data related to the transaction request and the data representative of the result of the one or more operations performed using the one or more requested models; and auditing, by the digital platform, the stored data for at least one of a security breach, data quality control, or improving the one or more operations performed using the one or more models.

19. A system comprising:

one or more computers and one or more storage devices storing instructions that are operable, when executed by the one or more computers, to cause the one or more computers to perform operations comprising:

receiving, by a digital platform and from a user device, a request to access one or more models, the request comprising a location of the one or more models;

determining, by the digital platform, that a user of the user device that transmitted the request is authorized to access the one or more requested models;

in response to determining that the user is authorized to access the one or more requested models, transmitting, by the digital platform and to the location of the one or more models, a transaction request that causes execution of one or more operations using the one or more requested models;

providing, by the digital platform and to the user device, data representative of a result of the execution of the one or more caused operations;

maintaining, by the digital platform, an auditing record of data related to the received request from the user device, the transaction request transmitted by the digital platform, and the data representative of the result of the one or more caused operations performed using the one or more requested models; and providing, by the digital platform and to the user device of the user, data stored in the auditing record.

20. A non-transitory computer-readable medium storing software comprising instructions executable by one or more computers which, upon such execution, cause the one or more computers to perform operations comprising:

receiving, by a digital platform and from a user device, a request to access one or more models, the request comprising a location of the one or more models;

determining, by the digital platform, that a user of the user device that transmitted the request is authorized to access the one or more requested models;

in response to determining that the user is authorized to access the one or more requested models, transmitting, by the digital platform and to the location of the one or more models, a transaction request that causes execution of one or more operations using the one or more requested models;

providing, by the digital platform and to the user device, data representative of a result of the execution of the one or more caused operations;

maintaining, by the digital platform, an auditing record of data related to the received request from the user device, the transaction request transmitted by the digital platform, and the data representative of the result of the one or more caused operations performed using the one or more requested models; and providing, by the digital platform and to the user device of the user, data stored in the auditing record.

* * * * *